United States Patent [19]

Berardi et al.

[11] 4,209,840
[45] Jun. 24, 1980

[54] DATA PROCESSING PROTOCOL SYSTEM

[75] Inventors: James A. Berardi, Highland Park; Darrell Chelcun, Boling Brook; Lawrence J. Dressel, Bartlett; Bruce D. Westphal, Fox Fiver Grove, all of Ill.

[73] Assignee: Honeywell Inc., Minneapolis, Minn.

[21] Appl. No.: 919,899

[22] Filed: Jun. 28, 1978

[51] Int. Cl.² ............................................. G06F 3/00
[52] U.S. Cl. ............................................. 364/200
[58] Field of Search ............... 364/200 MS File, 900; 179/15 AL, 15 BA

[56] References Cited

U.S. PATENT DOCUMENTS

| | | | |
|---|---|---|---|
| 3,336,582 | 8/1967 | Beausoleil et al. | 364/200 |
| 3,602,900 | 8/1971 | Delaigue et al. | 364/200 |
| 3,633,169 | 1/1972 | Bickford | 364/200 |
| 3,639,904 | 2/1972 | Arulpragasam | 179/15 AL |
| 3,688,273 | 8/1972 | Narang | 364/200 |
| 3,697,959 | 10/1972 | Abramson et al. | 179/15 AL |
| 3,755,789 | 8/1973 | Collins | 364/200 |
| 3,806,885 | 4/1974 | Moore | 364/200 |
| 3,879,710 | 4/1975 | Maxemchuk et al. | 364/200 |
| 3,919,483 | 11/1975 | Gindi et al. | 179/15 AL |

Primary Examiner—Leo H. Boudreau
Attorney, Agent, or Firm—Trevor B. Joike

[57] ABSTRACT

A protocol system for data processing equipment, particularly equipment used in building automation monitoring and control systems for air-conditioning control and monitoring of fire and security points is disclosed having a plurality of stations connected to a data bus, each station having an apparatus for monitoring the traffic on the data bus, calculating its turn to transmit or time slot during which it is permitted to transmit data on the bus and updating its calculated turn or time slot after each station designated to transmit in a turn or time slot after each station designated to transmit in a turn before it has transmitted data. Although each station has a designated time slot during which it may transmit, each time slot is of variable duration depending upon the extent of data to be transmitted. Thus, each station must be capable of calculating its time slot after each previous station has either transmitted or failed to transmit, and this station must calculate its own time slot accurately even though each previous station has transmitted for a variable length of time.

15 Claims, 26 Drawing Figures

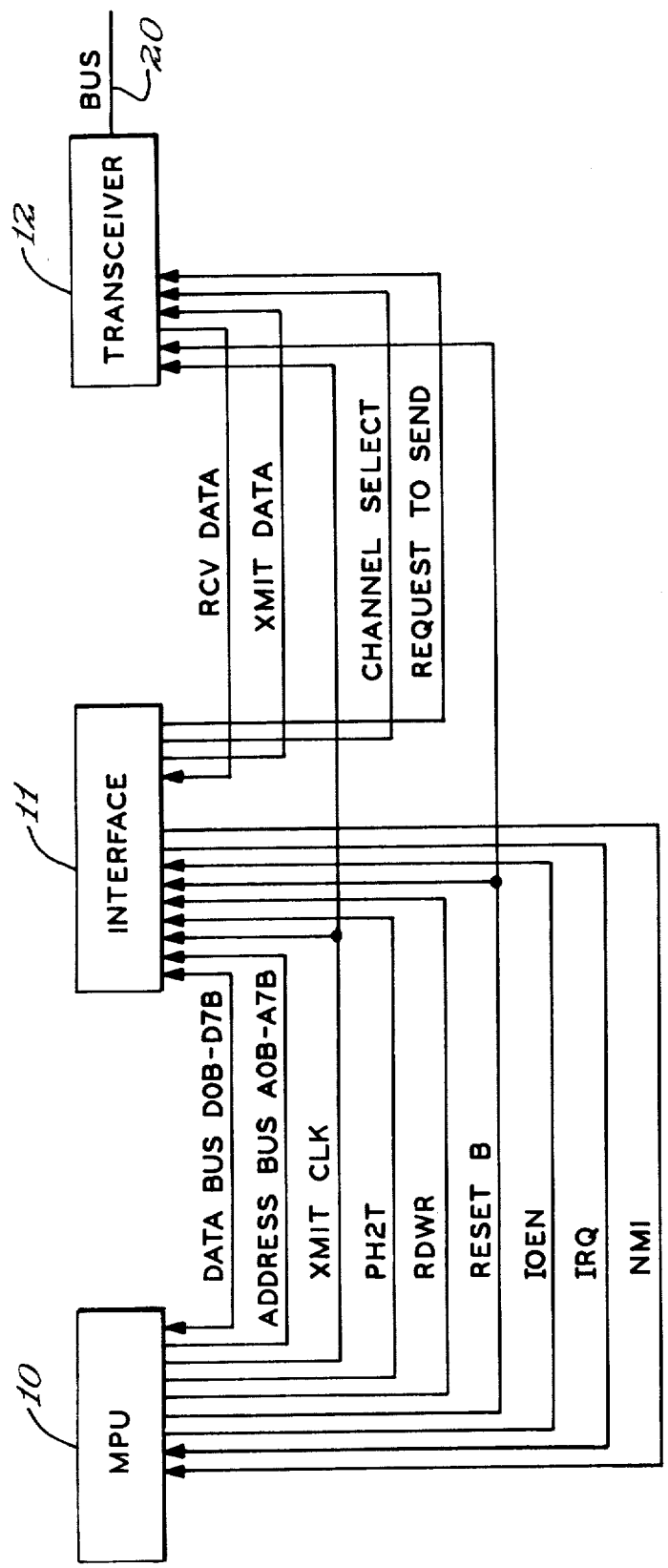

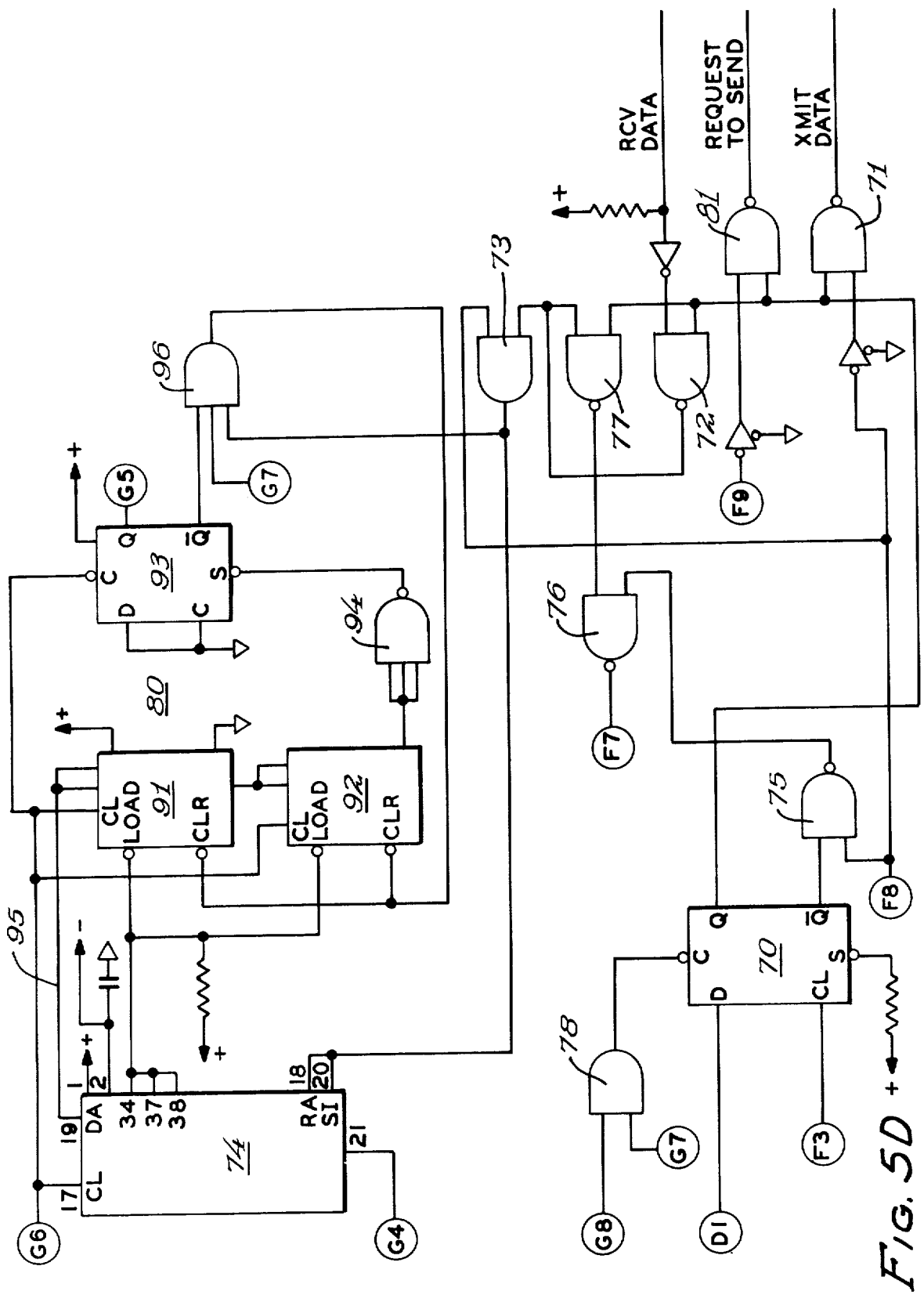

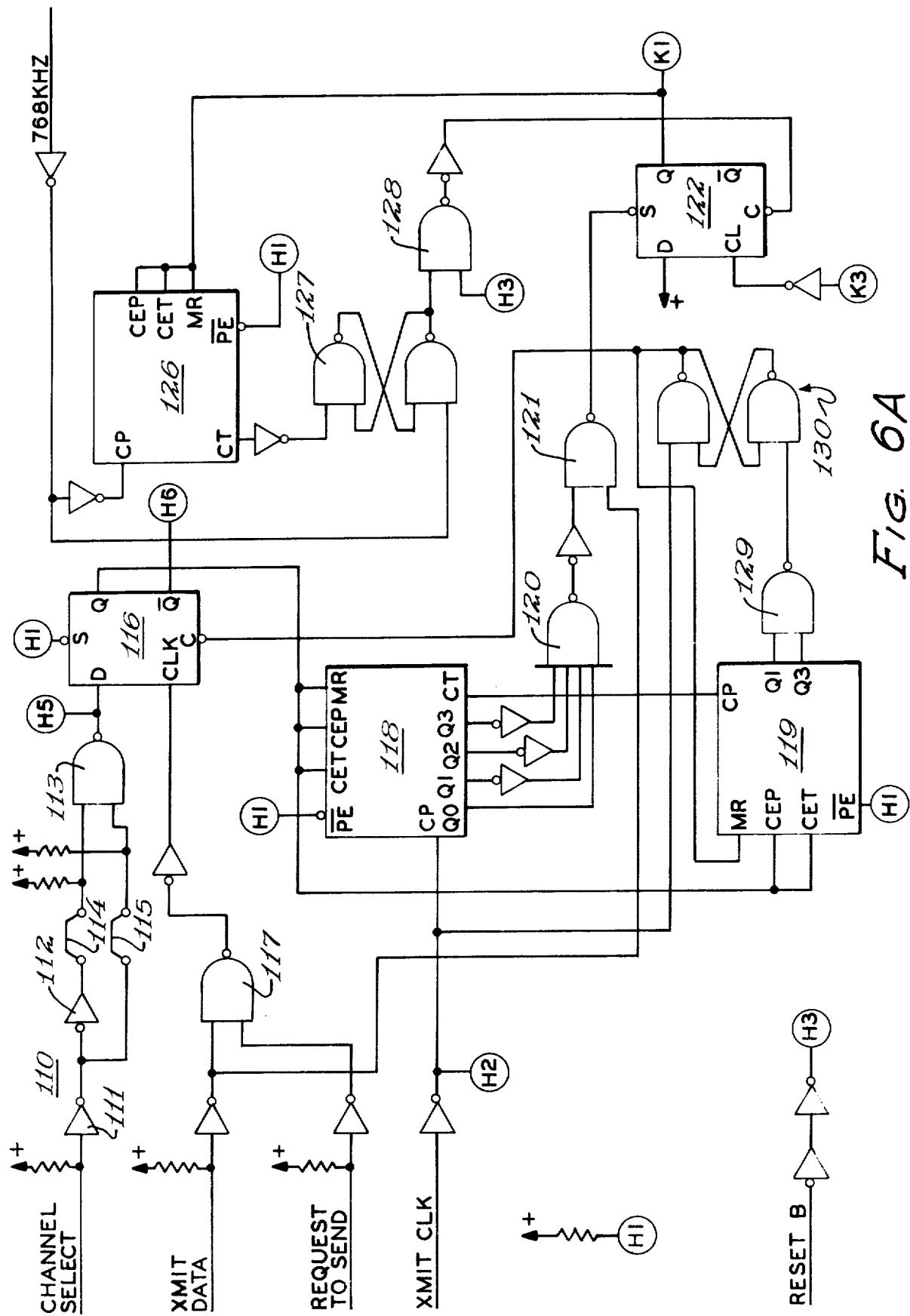

DATA PROCESSING PROTOCOL SYSTEM

BACKGROUND OF THE INVENTION

This invention is related to a protocol system wherein each station connected to a data bus of a data processing system must calculate its time to transmit turn during which it may begin transmitting data on the bus. This data processing equipment may be used for building automation, monitoring and control for fire and security management, airconditioning control, or the like.

Prior art data processing systems, for example those systems used for controlling or supervising the environment or fire and security points within a building, having a central panel for providing alarm or status indications of the various points within a building, originally provided a separate wire running from the panel to each supervised point. In today's large buildings, however, the cost of wiring in this manner can be prohibitive. Therefore, the prior art replaced these plurality of wires by a single transmission channel running from the central processing unit to the remote points being monitored.

The central processing unit is capable of scanning the status of the various remote points and controlling various operations at the remote point by addressing, in turn, each remote point and requiring each remote point to take some action. This action may be to report back its present status, such as temperature, pressure or humidity, or to perform some operation such as starting or stopping a fan, opening a damper or the like. By using one or more of these multiplexed transmission channels, the cost of installation of these monitoring systems is greatly reduced.

In such systems, the central processing unit typically consisted of a computer connected to one or more such channels running to the various remote points in a building. The size of the computer which was used in the central processing unit depends upon the number of remote points to be monitored and controlled. Because of flexibility and convenience, it has become necessary to configure such systems in such a manner that they can be expanded and can be interconnected for complex, large or multiple building facilities.

The present system comprises a plurality of remote stations each connected to a data bus. Each remote station may have a microprocessor or other type of computer connected through various circuits to the data bus and also connected to peripheral devices such as displays, supervised and control points, or the like.

Since the remote stations connected to the data bus may be physically separated by several miles, data communications between them is in serial form to permit transmission over common and inexpensive mediums or buses, such as phone lines and triaxial cables. Serial data transmission on a "party line" requires a protocol to prevent more than one device from transmitting at a time and to identify the transmitting device. This communication protocol is accomplished through a disclosed Transmission Protocol residing in each remote station.

A bus controller is not necessary since each remote station is capable of transmitting and receiving data independently of a controller. However, a bus monitor is utilized to make sure that the remote stations are transmitting in their proper turns. Functionally, each remote station continuously monitors all "party line" bus traffic. Based on present and past transmissions, each module "knows" its turn or time slot to transmit and transmits only at that time.

SUMMARY OF THE INVENTION

A protocol system is disclosed in a data processing system having a plurality of stations for determining the turn in which each station can transmit data on a common data or communication bus. Each station comprises a receive means for receiving messages from a communication bus, a receive interrupt circuit for generating interrupt each time a message is received, a quiet interrupt circuit for generating a quiet interrupt after counting a predetermined amount of time after a message has appeared on the data bus or, in other words, while no data is being transmitted on the data bus, and a calculation apparatus responsive to these interrupts for calculating its turn (or time slot) to begin transmitting on the data bus. When the computer has determined that it is now time to transmit data, the computer will enter a transmit routine if it has data to transmit.

BRIEF DESCRIPTION OF THE DRAWINGS

These and other features and advantages will become more apparent from a detailed consideration of the invention when taken in conjunction with the drawings in which:

FIG. 4 shows the connecting lines between the various elements of one of the remote stations shown in FIG. 1;

FIGS. 5A–5D show in detail the interface circuit shown in FIGS. 1 and 4;

FIGS. 6A–6E show the transceiver circuit shown in block form in FIGS. 1 and 4;

DETAILED DESCRIPTION OF THE INVENTION

Figure 1:
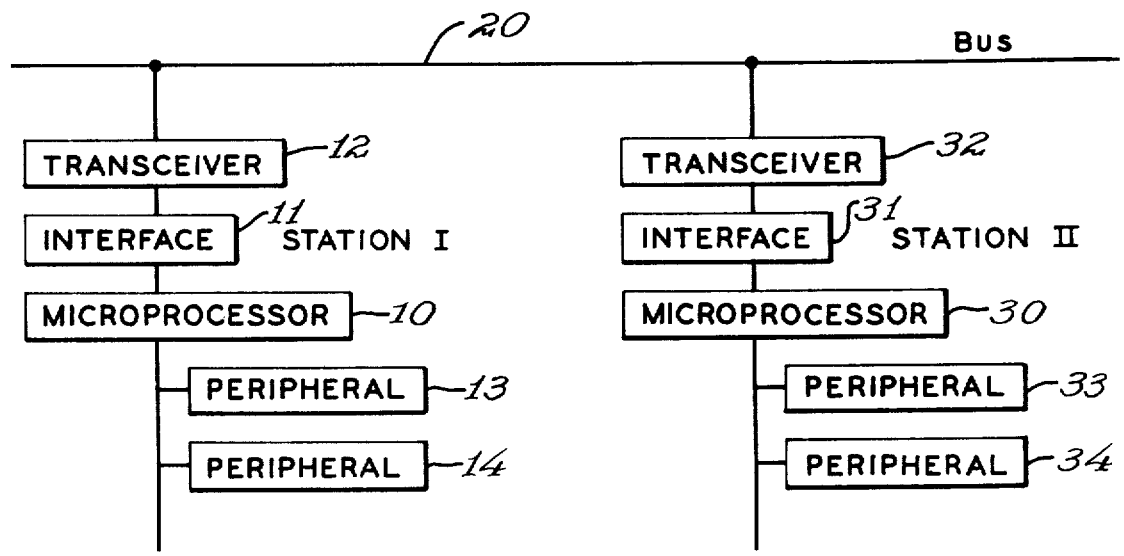
FIG. 1 is a generalized block diagram of the present invention showing two remote stations connected to a common data bus.

In FIG. 1, Station I comprises microprocessor 10 connected to common data or communication bus 20 through interface circuit 11 and transceiver circuit 12. In addition, the microprocessor may also be connected to peripheral devices 13 and 14. These peripheral devices may take the form of CRT or printer displays, supervisory or control points in building automation or fire and security systems, or the like.

Station II is also connected to common data bus 20 and comprises microprocessor 30 connected to data bus 20 through interface circuit 31 and transceiver circuit 32. In addition, microprocessor 30 may be connected to peripheral devices 33 and 34.

Based on present and past transmissions, each station on the common communication bus "knows" its turn or sequential time slot during which it can transmit data, and transmits only at that precise turn or time slot. Thus, no two remote stations can talk on the bus at the same time unless a system error has occurred. If a remote station does not transmit when its turn to transmit occurs, a system error results. A remote station's individual time slot during which only it can transmit is calculated based on the sender's address of the remote station presently transmitting. Thus, a time slot does not depend upon time so much as it does upon priority. After each transmission is begun, each remote station recalculates its own time slot based upon the present sender's address and its own address. The number of total time slots for this system is fixed but does not have to equal the number of remote stations connected to the data bus. For example, in the present system the total number of time slots may be 127 and the maximum number of remote stations may be 99. Thus, a remote station may have assigned to it a real time slot (1-99) during which it can transmit any type of message and a pseudo time slot (100-127) during which it may transmit specified types of messages only.

Each station connected to the data bus contains its own precision oscillator which controls the station's Baud rate. Since the Baud rate for each station is the same, each station is synchronized with each other within one bit width.

After a station transmits and assuming it is not assigned to a pseudo time slot, it sets a countdown counter to 256 which is twice the 127 slots plus 2. The extra 2 counts results in a count of 4 being necessary to switch from time slot 127 to time slot 1 since there is no time slot 0. After station 48 transmits its address, station 50 calculates its time to transmit count by subtracting 48 from 50 and multiplying by 2, or 4. Each station also generates interrupts after predetermined lengths of time started after no data is on the data bus. If station 49 fails to transmit, station 50 will transmit after 4, [2(50-48)], interrupts. If station 49 transmits, station 50 now sets its counter at 2(50-49) or 2. After two quiet interrupts decrementing its counter to 0, station 50 may now transmit. Once station 50 transmits, it sets its counter to 256; but if it has a pseudo time slot, e.g. 101, it sets its counter at 2(50-101) or 102, calculations being done in the binary system. A station which has assigned to it both a real time slot and a pseudo time slot will have a real address and a pseudo address so that it may put into its countdown count a count which depends upon the address of the last transmitter, and its own real address or pseudo address depending upon whether its real time slot or pseudo time slot is coming up next.

Figure 2:
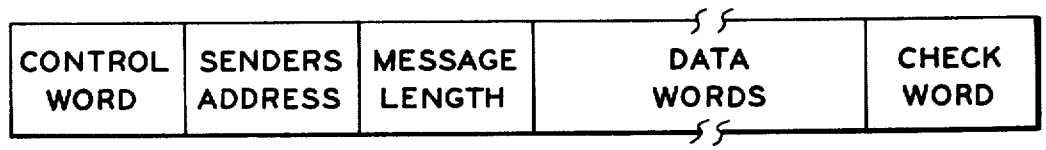
FIG. 2 shows a typical message, comprising a plurality of words, which can be transmitted from one station to another.
Figure 11:
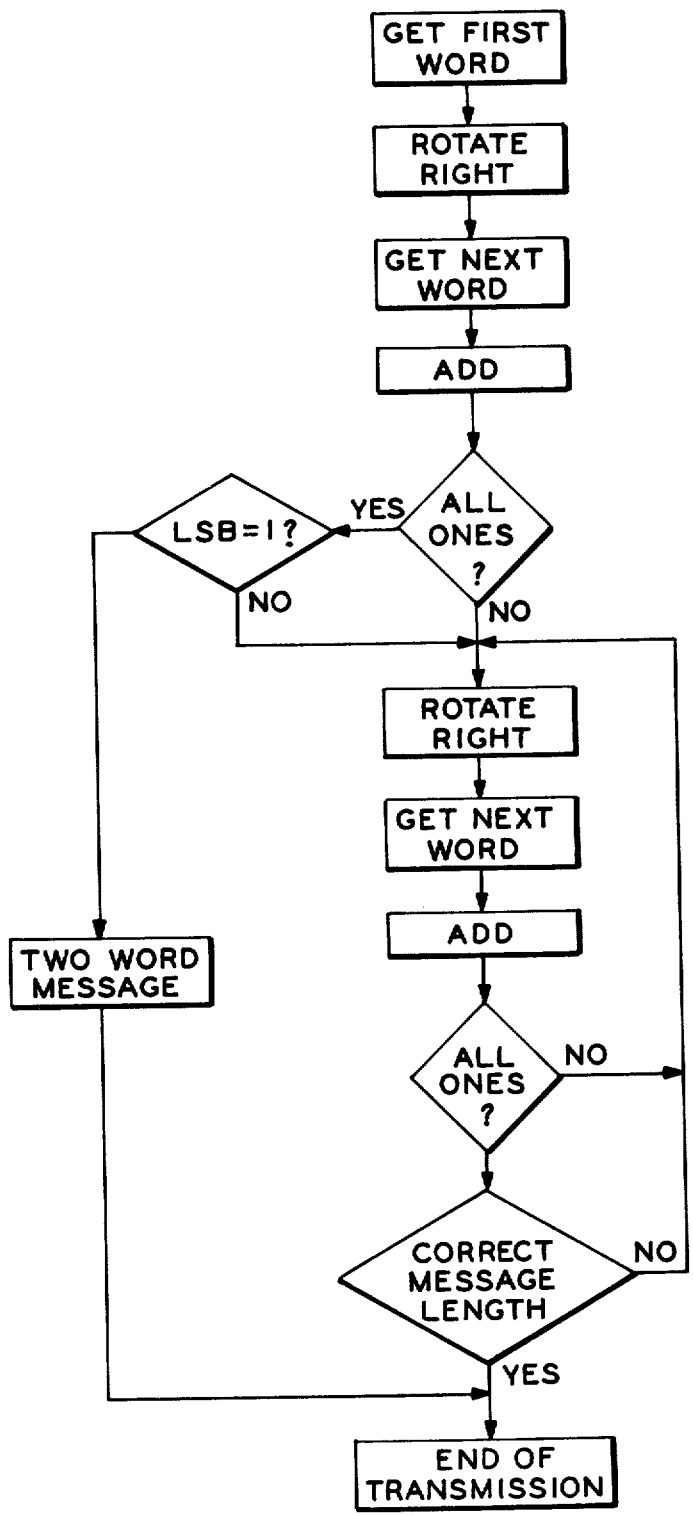
FIG. 11 shows the routine used for forming the check word shown in FIG. 2.

FIG. 2 shows the message format for the present protocol system. Each message which is transmitted on the data bus must comprise at least two words, the control word and the sender's address. If more than two words are transmitted by a remote station, the message must then comprise a message length word which indicates the total number of words in a message, the data words and finally a check word. The check word must satisfy the algorithm shown in FIG. 11. As each word is transmitted, the algorithm of FIG. 11 is performed. After all words except the check word have been transmitted, the last or remaining calculated result from the algorithm is complemented and sent out as the check word. When the check word algorithm has been performed and is satisfied, the number of words which were used by the algorithm is compared to the number of words indicated in the message length word. If there is no agreement, a transmission error has occurred and appropriate action is taken. If there is agreement, an end of message has been detected and there has been no error.

Every station must transmit a message. If the station has no data to transmit, then it transmits an "I'm OK" message comprising the control word and its address. If a message is not transmitted by a station during its time slot, an error has occurred. A bus monitor is used in the system and it is the function of the bus monitor to detect these kinds of errors. Each remote station is capable of transmitting a global message which is a message directed to all other stations. Each station is also capable of transmitting direct messages to a specific station. The control word indicates the type of message which is being sent. In a two word "I'm OK" message, the two words must satisfy the check word algorithm even though a check word is not transmitted. Satisfying the check word algorithm is obtained by appropriately constructing the control word.

Figure 3:
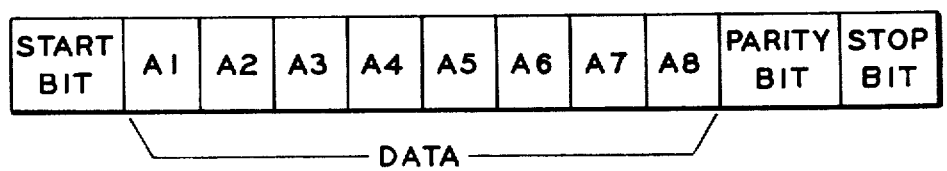
FIG. 3 shows the typical construction for each word in the message of FIG. 2.

Each word in a message takes the format of FIG. 3. It is comprised of a start bit, either data bits, a parity bit and a stop bit.

FIG. 4 shows a typical remote station such as Stations I and II of FIG. 1. In FIG. 4, the station comprises microprocessor 10 connected to interface 11 which in turn is connected to transceiver 12 and then to data bus 20. Microprocessor 10 and interface 11 are interconnected by eight data lines, D0B-D7B. Interface 11 is also connected to microprocessing unit 10 by an address bus comprising eight address lines, A0B-A7B. Microprocessing unit 10 contains a system clock, not shown, which generates the transmit clock signal, XMIT CLK, to interface 11 and transceiver 12 and PH2T and IOEN signals to interface 11. Also, microprocessing unit 10 generates a read-write signal, RDWR, to interface 11 and a RESET B signal, which is a reset signal generated upon power up, to both interface 11 and transceiver 12. Interface 11 generates interrupt signals IRQ and NMI to microprocessing unit 10. Data which is received from bus 20 by transceiver 12 is transmitted to interface 11 over receive data line, RCV DATA, which is then transmitted by interface 11 to microprocessing unit 10 over data bus lines D0B-D7B. Data to be transmitted from a station to another station on data bus 20 is transmitted by microprocessing unit 10 over data bus D0B-D7B to interface circuit 11 in parallel form and then by interface 11 to transceiver 12 over the XMIT DATA line in serial form and then on to bus 20. If redundant buses are used, the microprocessor through its address bus A0B-A7B will select through interface 11 the specific channel which it wishes to transmit data over. Consequently, a CHANNEL SELECT line runs from interface 11 to transceiver 12. When microprocessing unit 10 wishes to transmit data over the bus 20, it uses the address bus A0B-A7B to interface 11 and then the REQUEST TO SEND line from interface 11 to transceiver 12 to initiate the transceiver 12 to begin transmitting the data from interface 11 to bus 20.

As shown in FIG. 1, the microprocessor is connected not only to interface 11 but to peripheral devices 13 and 14. Thus, each device, i.e., interface 11 and peripherals 13 and 14, has a unique address assigned to it. When the microprocessing unit wishes to transmit data over bus 20, it addresses the interface 11 over the address bus A0B-A7B. Data between the microprocessing unit 10 and interface 11 is transmitted in parallel form over data bus D0B–D7B. Data is transmitted between interface 11 and transceiver 12 in serial form over either line RCV DATA or XMIT DATA. Data is transmitted over the data bus 20 in serial form.

Interface 11 is shown in more detail in FIGS. 5A–5D. FIGS. 5A–5D are interconnected at points designated by a letter number such as D7 or F1. In addition, the terminals which connect interface 11 to microprocessing unit 10 and to transceiver 12 use the symbology shown in FIG. 4.

Figure 5A:
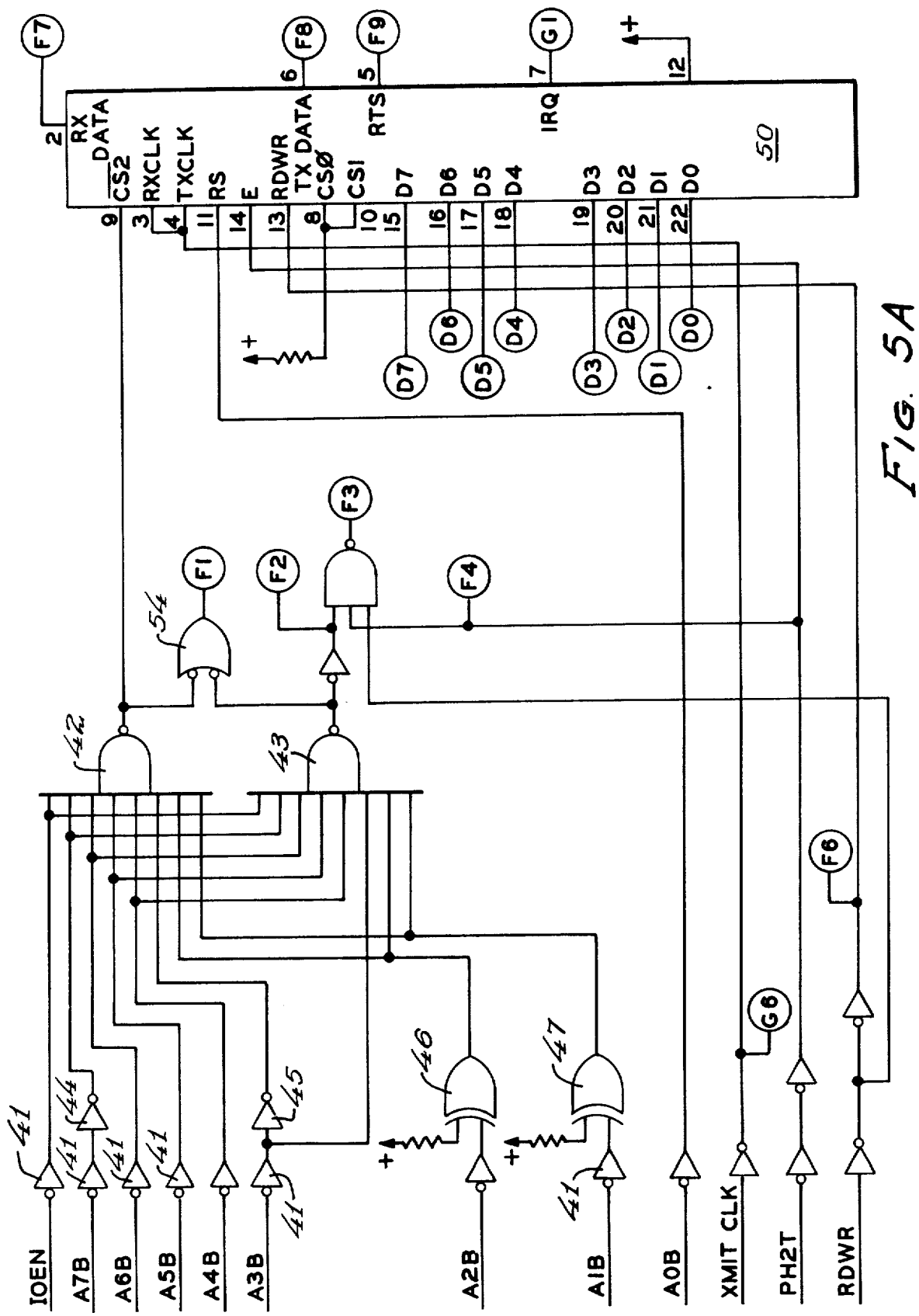

The interface circuit has an address known to the microprocessor and may be addressed by the microprocessor over address line A0B–A7B shown in FIG. 5A. These address lines are connected through buffer-inverters 41 to various inputs of NAND gate comparators 42 and 43. Specifically, each address line is connected to each NAND gate 42 and 43. In addition to buffer-inverter 41, address line A7B is connected through inverter 44 to both NAND gates 42 and 43. With respect to address line A3B, the output of buffer-inverter 41 is connected to NAND gate 43 directly and is also connected through inverter 45 to NAND gate 42. In addition to buffer-inverters 41, address lines A1B and A2B are connected through EXCLUSIVE OR gates 46 and 47 to each NAND gate 42 and 43. Each EXCLUSIVE OR gate 46 and 47 has a second input connected to a positive voltage bias. Address line A0B is not connected to NAND gates 42 and 43 but, instead, is directly connected to the RS terminal of an asynchronous communication interface adaptor (ACIA) 50 which may be of the type MC6850 manufactured by Motorola. The pin numbers of ACIA 50 have been shown to show how it is connected to the circuit. ACIA 50 is a register which is connected to send or receive data by being appropriately addressed by the microprocessing unit over address lines A0B–A7B. In addition, clock line IOEN is connected through a buffer-inverter 41 to both NAND gates 42 and 43. The arrangement of inverters 44 and 45 together with EXCLUSIVE OR gates 46 and 47 determine the particular address of interface 11 shown in FIGS. 5A–5D.

Figure 5B:
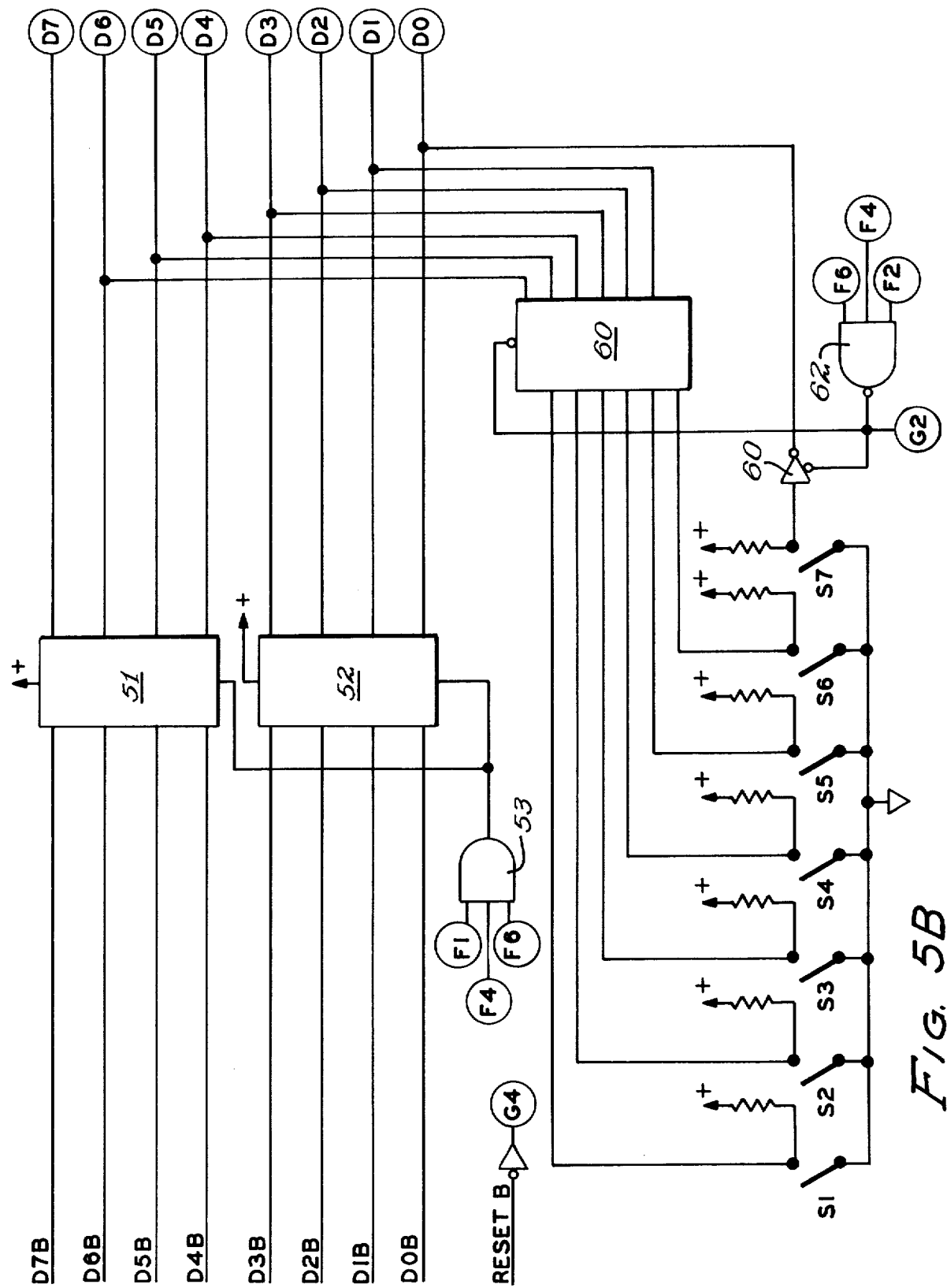

FIG. 5B shows the manner in which the data terminals D0–D7 of ACIA 50 can be connected to the data bus lines D0B–D7B. Data can be supplied to ACIA 50 over data bus lines D0B–D7B and then to data terminals D0–D7 of ACIA 50 for transmission over terminal F8 and then to the transceiver circuit 12 or may be received from transceiver circuit 12 at input terminal F7 of ACIA 50 for supply over terminals D0–D7 to data bus lines D0B–D7B and then to microprocessing unit 10. Data bus lines D0B–D7B and data terminals D0–D7 of ACIA 50 are interconnected by tri-state buffers 51 and 52 which are bi-directional devices having the type number 8T26. These devices 51 and 52 are conditioned to allow data to pass therethrough in either direction dependent upon the state of AND gate 53 which receives an input at F1 from notted input OR gate 54 which generates an output at F1 whenever interface 11 receives an appropriate address signal from microprocessing unit 10. In addition, AND gate 53 must receive a signal from terminal F4 which receives the PH2T clock signal from microprocessing unit 10 and terminal F6 which receives a read-write signal over line RDWR from microprocessing unit 10. Thus, if data is to be transmitted from the microprocessor unit to the data bus 20, tri-state buffers 51 and 52 are conditioned to allow data to pass from data lines D0B–D7B to terminals D0–D7 of ACIA 50. At the same time, the microprocessing unit conditions ACIA 50 to receive this data and transmit it over terminal F8. If data is to be received from the transmission line and routed to the microprocessing unit 10, the microprocessing unit 10 supplies the appropriate address to interface 11 which conditions ACIA 50 to receive the data over line F7 and transmit it to terminals D0–D7. At the same time, tri-state buffers 51 and 52 are conditioned by microprocessing unit 10 to allow the data at terminals D0–D7 of ACIA 50 to be supplied to data bus lines D0B–D7B.

FIG. 5B also shows a bank of switches S1–S7 which establish the address for the particular interface 11 shown in FIG. 4. A closed switch indicates a high level or "one" and an open switch indicates a low level or "zero." These switches are connected through a series of tri-state buffers 60 shown connected to all of the switches S1–S7 plus an additional tri-state buffer 60 shown in FIG. 5C connected to terminal D7 of ACIA 50 and to NMI flip-flop 61. The tri-state buffers 60 are connected to terminals D0–D7 of ACIA 50 and are multiplexed along with ACIA data lines D0–D7 to drive buffers 51 and 52 shown in FIG. 5B. When NMI flip-flop 61 is set, a 1 appears and is read at terminal D7 indicating that the device is requesting an NMI interrupt. The reading of this bit will automatically reset NMI flip-flop 61 as discussed hereinafter. Thus, the microprocessing unit will know when it receives an interrupt and, because of switches S1–S7, the identity of the device which has issued the interrupt.

Buffers 60 are conditioned to transmit the address and NMI interrupts to data terminals D0–D7 by NAND gate 62 shown in FIG. 5B. The output of NAND gate 62 is connected directly to buffers 60 shown in FIG. 5B and through terminal G2 to buffer 60 shown in FIG. 5C. In order for NAND gate 62 to condition buffers 60, NAND gate 62 receives inputs from terminal F2 which is an address decode terminal, terminal F4 which is the PH2T clock terminal and terminal F6 which is the RDWR input terminal.

Figure 5C:
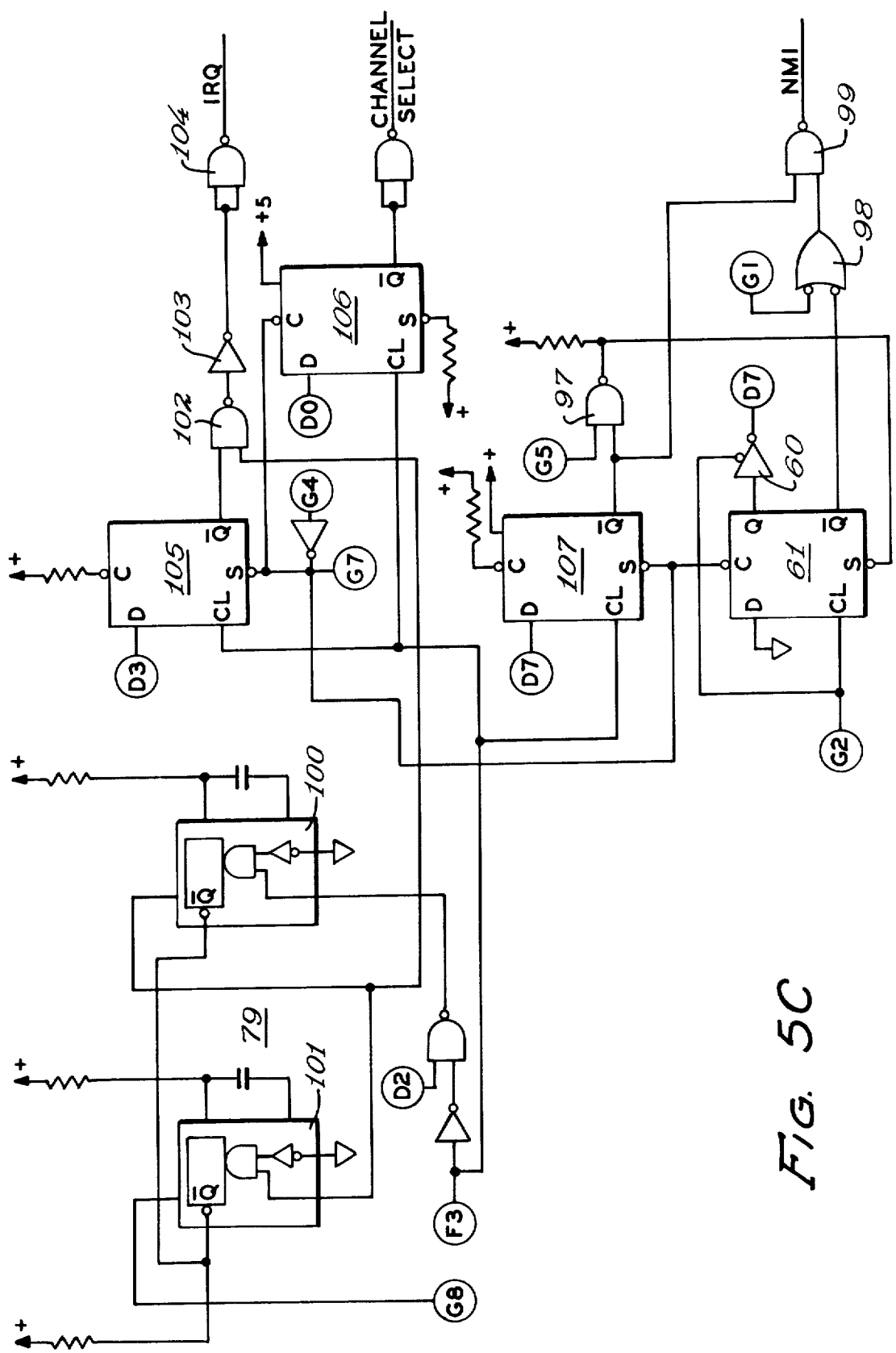

On Line flip-flop 70 shown in FIG. 5D determines whether data can be transmitted between interface 11 and transceiver 12 over RCV DATA and XMIT DATA line. If On Line flip-flop 70 is in its reset state, its Q output is low which precludes the XMIT DATA NAND gate 71 and the RCV DATA NAND gate 72 from allowing the passage of data therethrough. With a zero to the input of NAND gate 72, its output is at a logic level 1 which conditions AND gate 73 to recirculate data from ACIA transmit terminal F8 through AND gate 73 and to universal asynchronous receiver transmitter 74 which may be a Harris 6402 device. Also, with On Line flip-flop 70 in its reset condition, its Q terminal is at a logic level one which conditions NAND gate 75 to allow the data to pass from transmit e terminal F8 of ACIA 50 through NAND gate 75 to the input of NAND gate 76. Since one input of NAND gate 77 is connected to the Q terminal of On Line flip-flop 70, that input terminal will be a logic level 0 which dictates that its output is a logic level 1 which conditions NAND gate 76 to pass the data coming from ACIA output terminal F8 through NAND gate 75 to terminal F7 which is connected back to the input or data receive terminal F7 of ACIA 50. In this way, the software of the microprocessing unit can, at any time, disconnect the station from the data bus and run a diagnostic program to check the transmit and receive functions of the ACIA as well as the function of the Bit Time Interrupt Generator 80 to be discussed hereinafter. Terminal C of On Line flip-flop 70 is the reset terminal for this flip-flop as long as terminal S is connected to a high input which, as can be seen in FIG. 5D, it always is. Thus, with terminal C low, On Line flip-flop 70 is in a condition where its Q output is at a logic level 0 and its $\overline{Q}$ output is at a logic level 1 regardless of the D input and the clock input. When the C terminal goes high, the clock input will set the Q output terminal at whatever logic level happens to be on the D input terminal. On Line flip-flop 70 is reset at terminal C through NAND gate 78 which receives a reset signal from terminal G7 which, as shown in FIG. 5C, is connected to the output of an inverter from terminal G4, the RESET B input terminal shown in FIG. 5B. Thus upon power up, flip-flop 70 is reset. At other times it is allowed to be clocked at terminal F3 except when it receives an input at G8 from WATCHDOG TIMER 79 shown in FIG. 5C to be discussed hereinafter. Thus, the address decode terminal F3 clocks On Line flip-flop 70 to control the Q output terminal at a logic level dependent upon the D1 input terminal which is received from the microprocessing unit. When the microprocessing unit desires that interface 11 should be operated in a non-diagnostic mode such that information can be transferred between the bus 20 and microprocessing unit 10, a logic level 1 is supplied to the D input of On Line flip-flop 70 and then it is clocked by addressing code terminal F3 to force the Q output terminal to a logic level 1 which conditions NAND gate 71 to transmit data and NAND gate 72 to receive data.

On Line flip-flop may be device 74LS74 supplied by Fairchild. When the Q output of On Line flip-flop 70 is high, it conditions NAND gate 81 to supply a REQUEST TO SEND signal from terminal F9 of ACIA 50 to transceiver 12.

Data is received on the RCV DATA line shown in FIG. 5D and is supplied through NAND gate 72 when the input of that NAND gate which is connected to the Q output of On Line flip-flop 70 is high. This data is supplied through AND gate 73 to the input to Universal Asynchronous Receiver Transmitter 74 and is clocked into that device by the clock terminal connected to G6 which, as shown in FIG. 5A, is the transmit clock line XMIT CLK. At the same time, the input of NAND gate 75, which is connected to the $\overline{Q}$ terminal of On Line flip-flop 70, is at a logic level 0 which means its output is at a logic level 1 conditioning NAND gate 76 to supply data from NAND gates 72 and 77 to the input terminal F7 of ACIA 50. This data is clocked into the registers of ACIA 50 by the transmit clock line XMIT CLK. Similarly, when data is to be supplied to the transceiver board over terminal XMIT DATA, On Line flip-flop 70 conditions NAND gate 71 to supply this data from the output terminal F8 of ACIA 50 under control of the transmit clock line XMIT CLK connected to the ACIA 50.

The purpose of the Bit Time Interrupt Generator 80 is to generate NMI interrupt signals in a fixed repeating period when there is no transmission present on the data bus. Specifically, if, because of a failure at a station which is suppose to transmit during a particular time slot, interface 11 receives no message for a predetermined length of time, then all remote stations will receive interrupt signals from their Bit Time Interrupt Generators which are counted by the system software to determine the time slot when each station in its turn will transmit. In this way, the failure of one station to transmit does not terminate the transmission of data by all other stations.

Bit Time Interrupt Generator 80 comprises a divide by 16 counter 91 and a counter 92 both of which may be devices 74LS161. Generator 80 also comprises a Set NMI flip-flop 93 which may be of the same type as the flip-flop 70. Flip-flop 93 is connected such that its S terminal connected from NAND gate 94, connected as an inverter, is normally high such that the input from the XMIT CLK terminal G6 connected to terminal C has no effect on the Q and $\overline{Q}$ outputs. As soon as the input to inverter 94 goes high so that the S terminal flip-flop 93 goes low, the next XMIT CLK signal will change the state of the Q and $\overline{Q}$ outputs.

Counter 91 divides the XMIT CLK signal by 16 which essentially establishes the Baud rate for the system. Thus, a bit width is defined as 16 pulses of the transmit clock. Counter 92 divides the output from counter 91 by 8 to establish a time slice which is defined as 8-bit widths. Counters 91 and 92 are enabled to count clock pulses from the transmit clock terminal G6 through line 95 only when device 74 has received a complete data word. Thus, Bit Time Interrupt Generator 80 begins counting each time a word has been completely received by device 74 over the data bus 20 and from transceiver 12. AND gate 96 clears counters 91 and 92 when a new word is received through AND gate 73. Thus, as long as traffic exists on the data bus, AND gate 96 will prevent counters 91 and 92 and flip-flop 93 from generating an interrupt signal. When data is not on the data line, AND gate 96 will not clear counters 91 and 92 and, when counter 92 reaches a count of 8 (the predetermined length of time discussed above), flip-flop 93 will set upon receipt of the next clock signal from terminal G6 to switch its Q and $\overline{Q}$ outputs. When flip-flop 93 is set, counters 91 and 92 are cleared through AND gate 96 and a signal is supplied to terminal G5 which sets flip-flop 61 through NAND gate 97. When counter 92 is reset, the next clock pulse from terminal G6 will reset flip-flop 93. When NMI flip-flop 91 is set, an NMI interrupt is generated through notted input OR gate 98 of FIG. 5C and NAND gate 99. Line NMI is connected to the microprocessor. This interrupt signal, called a quiet interrupt because it was generated by Bit Time Interrupt Generator 80, is then used by the microprocessor in calculating its own time slot. Counters 91 and 92 will begin counting again and will supply further interrupts until traffic resumes on the data bus. Counters 91 and 92 may also be cleared by the RESET B inverted signal supplied through NAND gate 96 by terminal G7.

Watchdog Timer 79 is comprised of retriggerable one-shot multivibrators 100 and 101. Each device may be a 74LS123 with device 100 producing an output five seconds after it receives its input. Multivibrator 101 produces an output 500 nanoseconds after it receives an input from multivibrator 100. Multivibrator 100 is triggered through a combination of an input from terminal F3, which is a composite of the address decode circuit shown in FIG. 5A, the RDWR terminal and a PH2T clock signal, and a signal from terminal D2 of ACIA 50. Thus, each time the interface is properly addressed by the microprocessing software, multivibrator 100 is retriggered. Should a fault in the system occur such that communication between the microprocessing unit and the interface circuit has ceased, Watchdog Timer 79 times out and provides an output through NAND gate 102, inverter 103 and inverter 104 to the IRQ output which is an interrupt supplied to the microprocessing unit. In addition, an output is supplied by multivibrator 101 to terminal G8 which is connected through AND gate 78 to On Line flip-flop 70 of FIG. 5D for resetting this flip-flop and taking the interface apparatus off line.

The output from multivibrator 100 to NAND gate 102 can be masked by Watchdog Timer Mask flip-flop 105 which may be of the same type as On Line flip-flop 70. When the microprocessor wishes to prevent the Watchdog Timer from supplying an interrupt IRQ signal, it places a logic level 1 on the data bus D3B which is connected through a tri-state buffer to terminal D3 of flip-flop 105. A signal from terminal F3 will clock flip-flop 105 to drive the Q output low which precludes the output from multivibrator 100 from passing through NAND gate 102.

Channel Select flip-flop 106, which may be of the same type as On Line flip-flop 70, is configured such that a clock input will invert the D input on the $\overline{Q}$ output. Thus, the microprocessing unit can select which of two channels it desires to transmit data over by placing the appropriate signal on data bus line DOB which is connected through terminal DO to Channel Select flip-flop 106.

Finally, flip-flop 107, which may be of the same type as On Line flip-flop 70, is configured as an NMI mask flip-flop and can be utilized by the microprocessing unit for prohibiting NMI interrupt signals from being generated by the interface circuit to the microprocessing unit. The $\overline{Q}$ output from NMI mask flip-flop 107 is normally high which conditions NAND gate 99 to pass through to the NMI interrupt line any signal from NMI flip-flop 61. When an interrupt signal is generated by Bit Time Interrupt Generator 80 at terminal G5, it is connected through NAND gate 97 to set NMI flip-flop 61 at terminal S. This causes the $\overline{Q}$ terminal of NMI flip-flop 61 to go low which, because of the notted input terminal of OR gate 98, raises the output of OR gate 98 and produces an NMI interrupt on the NMI line. If the microprocessing unit decides to mask the NMI interrupt line, it provides an appropriate signal over data bus line D7B which is connected through terminal D7 to the input of NMI Mask flip-flop 107. Thus, upon the next clock signal, the $\overline{Q}$ output from flip-flop 107 goes low which prevents any signal passing through either NAND gate 97 or NAND gate 99.

When the microprocessing unit wishes to transmit data out on the data bus, it supplies data on data bus lines D0B-D7B which are entered into ACIA 50. When the ACIA has received a complete word, it generates an IRQ output through notted input OR gate 98 to provide an NMI interrupt, called a transmit interrupt because of the transmit mode, informing the microprocessing unit that the ACIA is now in condition for transmitting data. The microprocessor unit will then address ACIA 50 and supply transmit clock signals to it to transmit the data out of the ACIA line at terminal F8.

When ACIA 50 has received data at its input terminal F7, an interrupt is generated at G1 indicating that a complete word has been received in ACIA 50. This interrupt, called a receive interrupt, is then connected through OR gate 98 to NMI interrupt line which is received by the microprocessing unit to then read the data stored in ACIA 50.

Therefore, three types of interrupts are generated over line NMI. A quiet interrupt which is generated by the Bit Time Interrupt Generator when no messages have been received by the interface for a predetermined length of time or count, a receive interrupt when data is being received and a transmit interrupt when data is to be transmitted from ACIA 50. Microprocessor 10 is capable of deciphering these three interrupts. Thus, if it is transmitting data and receives an interrupt, it knows that the interrupt is a transmit interrupt. To distinguish between a quiet interrupt generated by the Bit Time Interrupt Generator and a receive interrupt generated by ACIA 50, it scans the data bus lines D0B-D7B. If no data appears on the line, the interrupt is a quiet interrupt. If data does appear on the line, the interrupt is a receive interrupt. These interrupts and the ability of the microprocessing unit to distinguish between the types of interrupts it receives become important when considering the way in which the microprocessing unit determines its time slot for transmitting data.

Figure 6B:
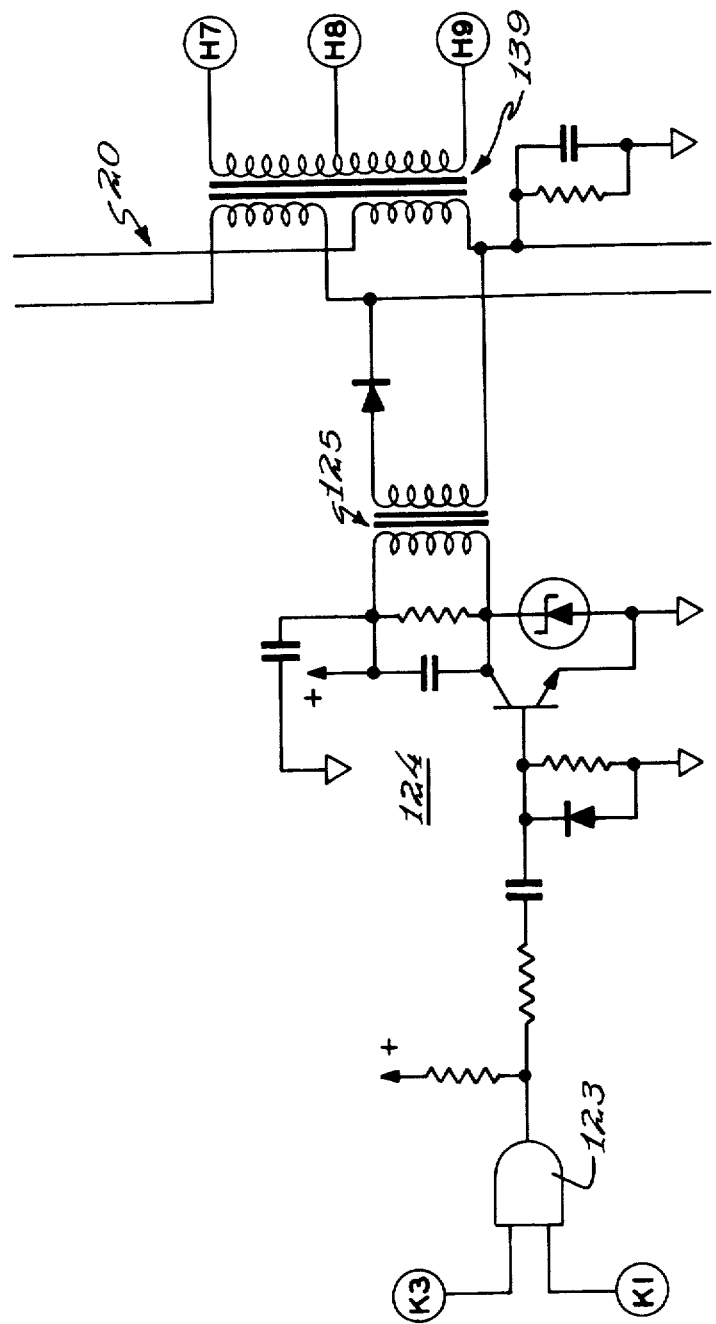

The transceiver circuit which connects interface 11 to data bus 20 is shown in more detail in FIGS. 6A–6E. Again, the interconnection between these figures is shown by circled letter-number reference numerals such as H1 and K3. The connection between the transceiver circuit and the data bus is shown in FIG. 6B and the connection between transceiver circuit 12 and interface circuit 11 is shown by appropriate terminals in FIGS. 6A and 6E.

The primary functions performed by the transceiver circuit are to receive and transmit data in serial form between interface 11 and data bus 20 and to convert the non-return to zero level (NRZ-L) serial data received from the ACIA of the interface circuit to pulse-no pulse (PNP) serial data form which is used on the data line. FIG. 6G shows the difference between the form of the data transmitted between transceiver 12 and interface 11 and the data transmitted between transceiver 12 and data bus 20. The non-return to zero level signal is shown by the NRZ-L diagram of FIG. 6G. A high level indicates a data bit 0 and a low level indicates a data bit 1. This diagram shows a 1 start bit and then 8 data bits having various values. Data bits 1 and 2 are 0 bits, data bit 3 is a 1 data bit, data bit 4 is a 0 data bit, data bits 5 and 6 are 1 data bits, data bit 7 is a 0 data bit, and data bit 8 is a 1 data bit. When the transceiver circuit 12 is transmitting data from microprocessing unit 10 to data bus 20, it receives the NRZ-L data and converts it to PNP data. Thus, pulses are supplied to the data bus for the start bit and data bits 3, 5, 6 and 8. Conversely, as data bits are received on data bus 20 into transceiver 12, transceiver 12 converts the pulse-no pulse data bits into NRZ-L data information.

When the microprocessing unit 10 wishes to transmit data on data bus 20, it supplies data to the interface circuit as discussed above and also transmits a signal out through the interface circuit to be placed upon the channel select input line in FIG. 6A. This signal is supplied through a circuit 110 which comprises an inverter 111, a buffer-inverter 112 and a NAND circuit 113 connected as shown. A pair of straps 114 and 115 are also included in this circuit. If two data buses are used for redundancy, two transceivers are required. One of the straps 114 and 115 is disconnected in the other transceiver board. Thus, if the channel select signal is low, one transceiver board is selected and, if the channel select signal is high, the other transceiver board is selected. When the proper channel select input is received for the transceiver circuit shown in FIGS. 6A–6E, an input will be supplied to the D input of Transmit flip-flop 116 to enable it into operation.

When the data to be transmitted over the data bus has been accepted in ACIA 50, a REQUEST TO SEND signal is generated by the interface circuit and supplied to the transceiver to enable NAND gate 117. When the XMIT DATA line in FIG. 6A falls low due to the start bit as shown in FIG. 6G, Transmit flip-flop 116, which may be of the same type as On Line flip-flop 70, is clocked which drives its Q output terminal high and its $\overline{Q}$ output terminal low. When the Q terminal of Transit flip-flop 116 goes high, Position Counter 118 and Character Counter 119, which may be devices 74LS161, are enabled. The operation of this circuit may be followed with the aid of the timing charts in FIG. 6F.

Position Counter 118 counts transmit clock pulses on line XMIT CLK. Position Counter 118 divides the transmit clock signal by 16 to establish the Baud rate. Therefore, for each 16 transmit clock pulse, an output is placed on its output line CT for clocking Character Counter 119. Once Position Counter 118 has been enabled, the next clock pulse will step its output Q0-Q3 to a 1,0,0,0 condition which, because of the buffer-inverters, will provide an output from NAND gate 120, which enables NAND gate 121. Thus, there is a 1/16 bit delay between the receive of the start bit and the transmission of a PNP bit as shown in FIG. 6G. Once NAND gate 121 has been enabled, a 0 XMIT DATA bit will set PNP flip-flop 122, which may be of the same type as On Line flip-flop 70, to drive output terminal K1 high. As shown in FIG. 6B, terminal K1 is connected to AND gate 123. When AND gate 123 receives a pulse from terminal K1, it transmits the pulse through Bus Line Drive Circuit 124 to supply the bit to pulse transformer 125 and then on data bus 20. Terminal K3 is connected to AND gate 123 and is connected at its other end to the receive portion of the transceiver circuit to inhibit the transmitter part of the transceiver circuit when data is being received. However, when data is not being received, terminal K3 is high allowing the bits on terminal K1 to be transmitted through AND gate 123.

At the same time, when the Q output of PNP flip-flop 122, which may be of the same type as counters 118 and 119, goes high, PNP Counter 126 of FIG. 6A is enabled and begins to count pulses from a 768 KHz supply. PNP Counter 126 divides the 786 KHz signal by 16 and supplies an output through PNP Reset Circuit 127 which is supplied through NAND gate 128 to reset PNP flip-flop 122. Thus, 20 microseconds after PNP flip-flop 122 has been set, it will be reset resulting in an output pulse supplied to data bus 20 of 20 microsecond duration.

After Position Counter 118 has reached a count of 16, it will supply a pulse to Character Counter 119 to step this counter. The next transmit pulse, which is a 0 as shown by FIG. 6G, will inhibit NAND gate 121 from supplying a set signal to PNP flip-flop 122. Therefore, flip-flop 122 will not supply a pulse to the bus drive 124 and no pulse is supplied to the data bus. Since data bit 2 is also a 0, no pulse is applied to the data bus. When data bit 3 is transmitted, the XMIT DATA line drops low which enables NAND gate 121 to supply the next pulse from Position Counter 118 to set PNP flip-flop 122 to provide another 20 microsecond pulse to the data bus. This operation continues until Character Counter 119 has indicated that a complete word is transmitted at which time it supplies an output through NAND gate 129 to the Transmit Flip-Flop Reset Circuit 130. This circuit resets the Transmit flip-flop 116 which clears counters 118 and 119 and the transceiver circuit waits for a new word to be transmitted from the microprocessor through the interface circuit.

Data can be received by the transceiver from either direction on data bus 20. As shown in FIG. 6B, a pickup or pulse transformer 139 is connected to data bus 20 and to terminals H7, H8 and H9. As mentioned hereinabove, when data is being received over the transmission line, terminal K3 to NAND gate 123 in FIG. 6B and to PNP flip-flop 122 of FIG. 6A will prevent any data from being transmitted by the transceiver circuit. Furthermore, the stop bit is always a level 1 such that, when Character Counter 119 reaches a count of 10, which includes the start bit, 8 data bits and the parity bit, it resets Transmit flip-flop 116. As shown in FIG. 6F, the 0 start bit sets the transmit flip-flop which enables the Position and Character Counters to begin counting based upon the transmit clock. The start bit also sets the PNP flip-flop which in turn enables the PNP Counter. When the output of the PNP Counter reaches a count of 16, it provides an output pulse which is used to reset the PNP flip-flop. The Transmit flip-flop is set during the transmission of the entire word so that the Position and Character Counters remain enabled. The next 0 data bit to be supplied from the interface circuit will again set the PNP flip-flop which will be reset through the PNP Counter and Reset Circuit 127. When the parity bit is received from the interface circuit, the PNP flip-flop is set and supplies a 20 microsecond pulse to the Bus Driver. This parity bit is the tenth character and at the end of this character, Position Counter 118 supplies an output over line CT to Character Counter 119 which resets the Transmit flip-flop through Reset Circuit 130.

Figure 6C:
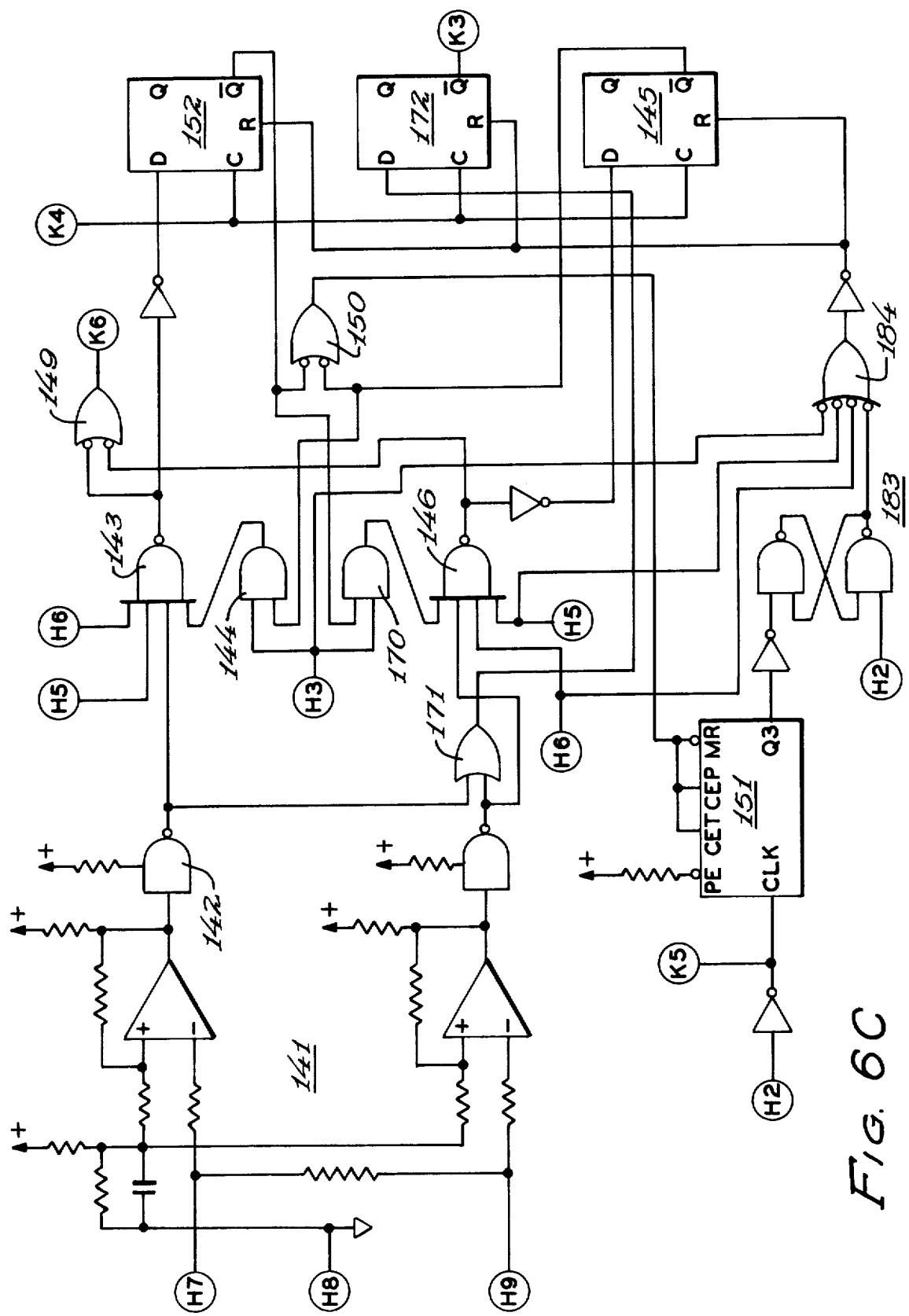

Terminals H7, H8 and H9 are shown in FIG. 6C connected to circuit 141. Circuit 141 receives pulses from the data bus and distinguishes between negative and positive signals. Specifically, data being transmitted in one direction over data bus 20 is considered a positive signal and data transmitted over the other direction on the data bus 20 is considered a negative signal. Circuit 141 responds to each of these signals. The amplifiers in circuit 141 are biased so that on positive pulses the top most amplifier will switch and for negative pulses the bottom most amplifier will switch. Assuming that positive pulses are coming in through terminal H7, these pulses are supplied through NAND gate 142 to the input of NAND gate 143. NAND gate 143 also receives inputs from terminal H6 which is the $\overline{Q}$ output of Transmitted flip-flop 116. Thus, if Transmit flip-flop 116 is in a transmit mode, its $\overline{Q}$ output will be low which will block pulses from being supplied by terminal H7 through NAND gate 143. However, during a receive mode, terminal H6 will be high enabling NAND gate 143. Also, NAND gate 143 receives an input through terminal H5 from the Channel Select circuit which will designate this transceiver circuit to receive data on the line. The fourth input to NAND gate 143 is derived from AND gate 144 which has one input from the $\overline{Q}$ terminal of flip-flop 145, which is normally a high level to enable NAND gate 144, and a second input from terminal H3 which is a normally high RESET B signal. Thus, the fourth input to NAND gate 143 is normally high. Since all of the inputs to NAND gate 143 are normally high except for the input connected from NAND gate 142, it is in a condition to pass through data bits supplied by terminal H7. Likewise, NAND gate 146 will be in a condition to supply negative pulses from terminal H9 through it. Notted input OR gate 149 will produce a positive going pulse at terminal K6 when either a positive pulse is received at terminal H7 or a negative pulse is received at H9. Similarly, notted input OR gate 150 will produce a positive going pulse to enable counter 151 whenever flip-flop 145 or flip-flop 152 has been set.

Figure 6D:
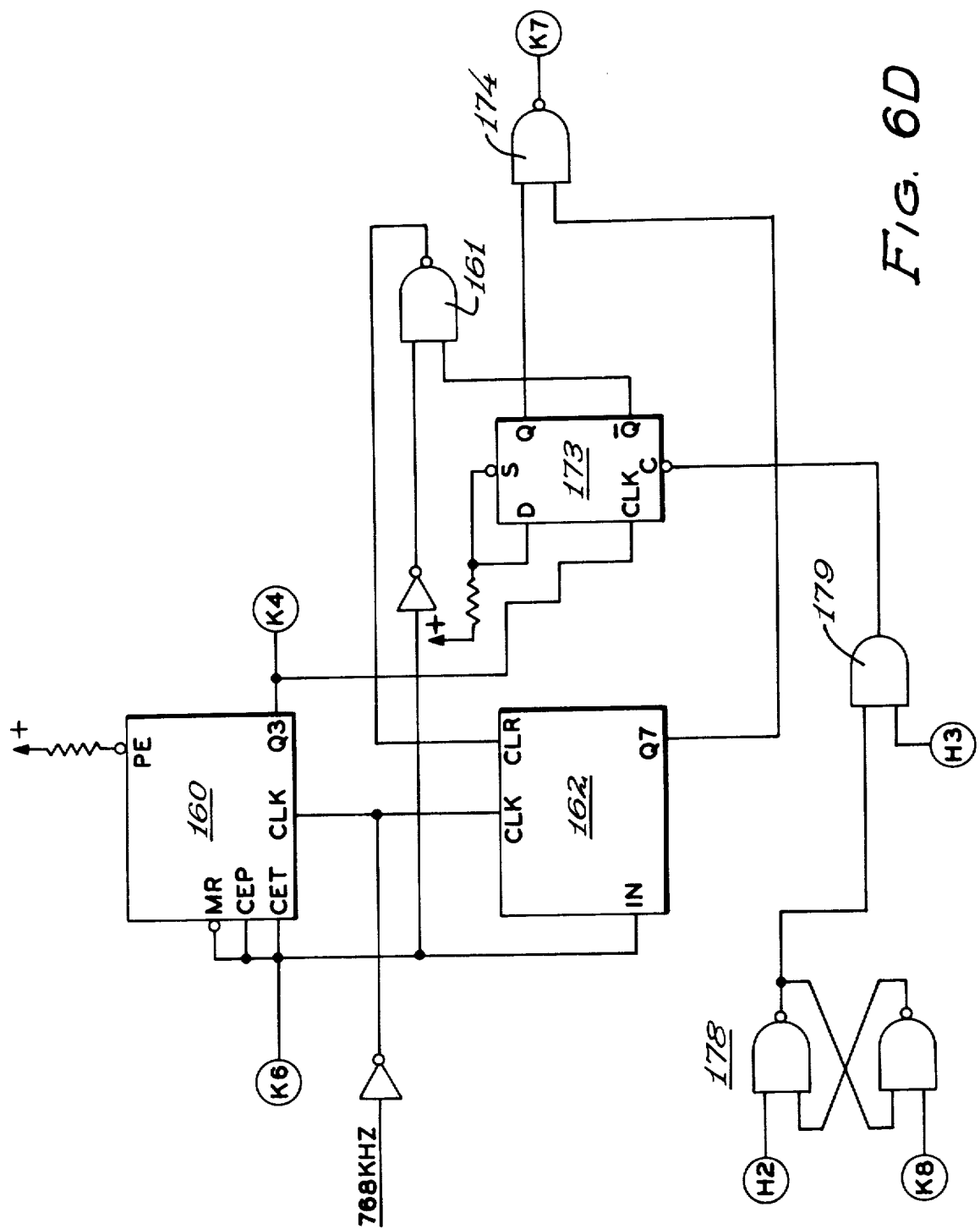
Figure 6E:
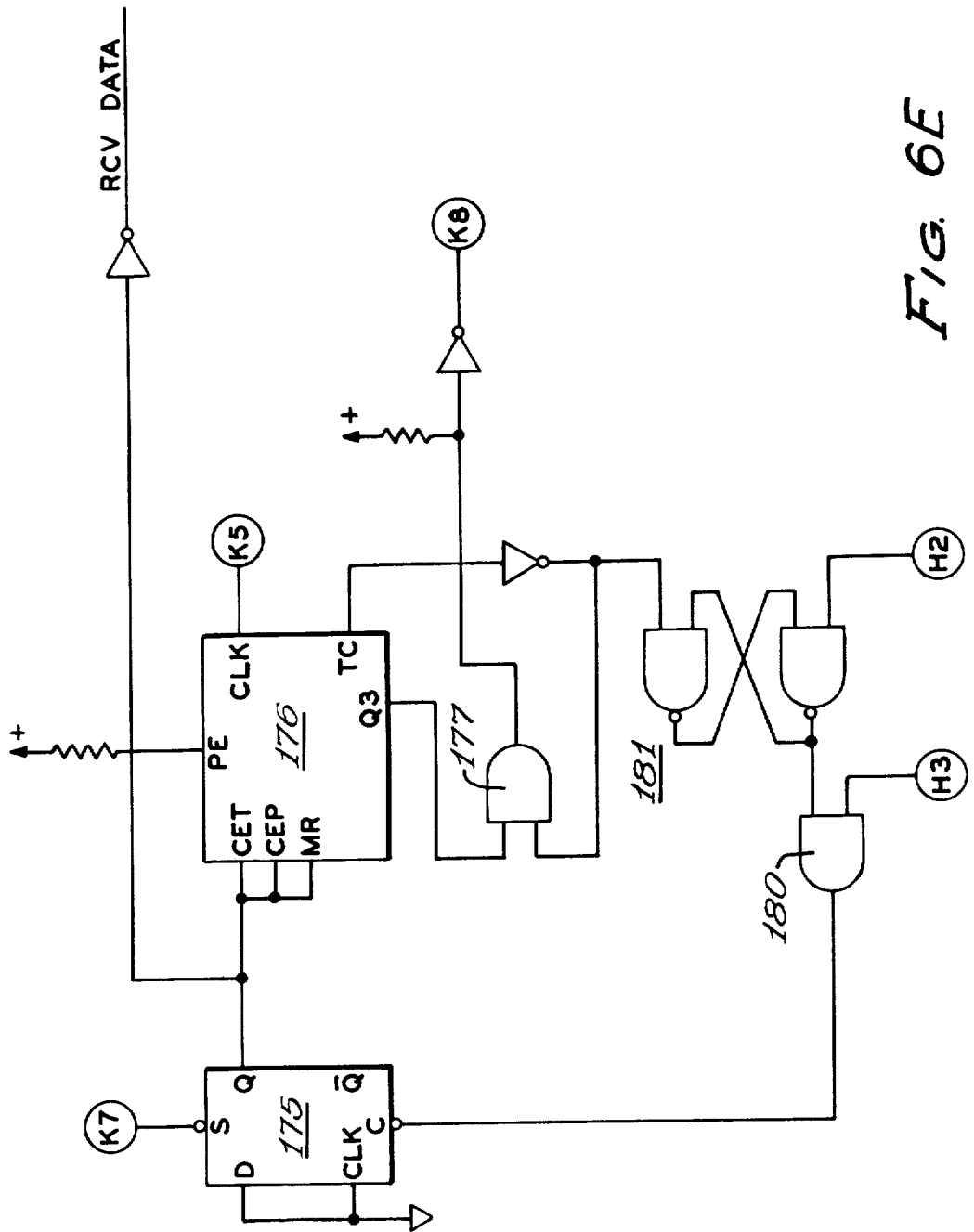
Figure 6F:
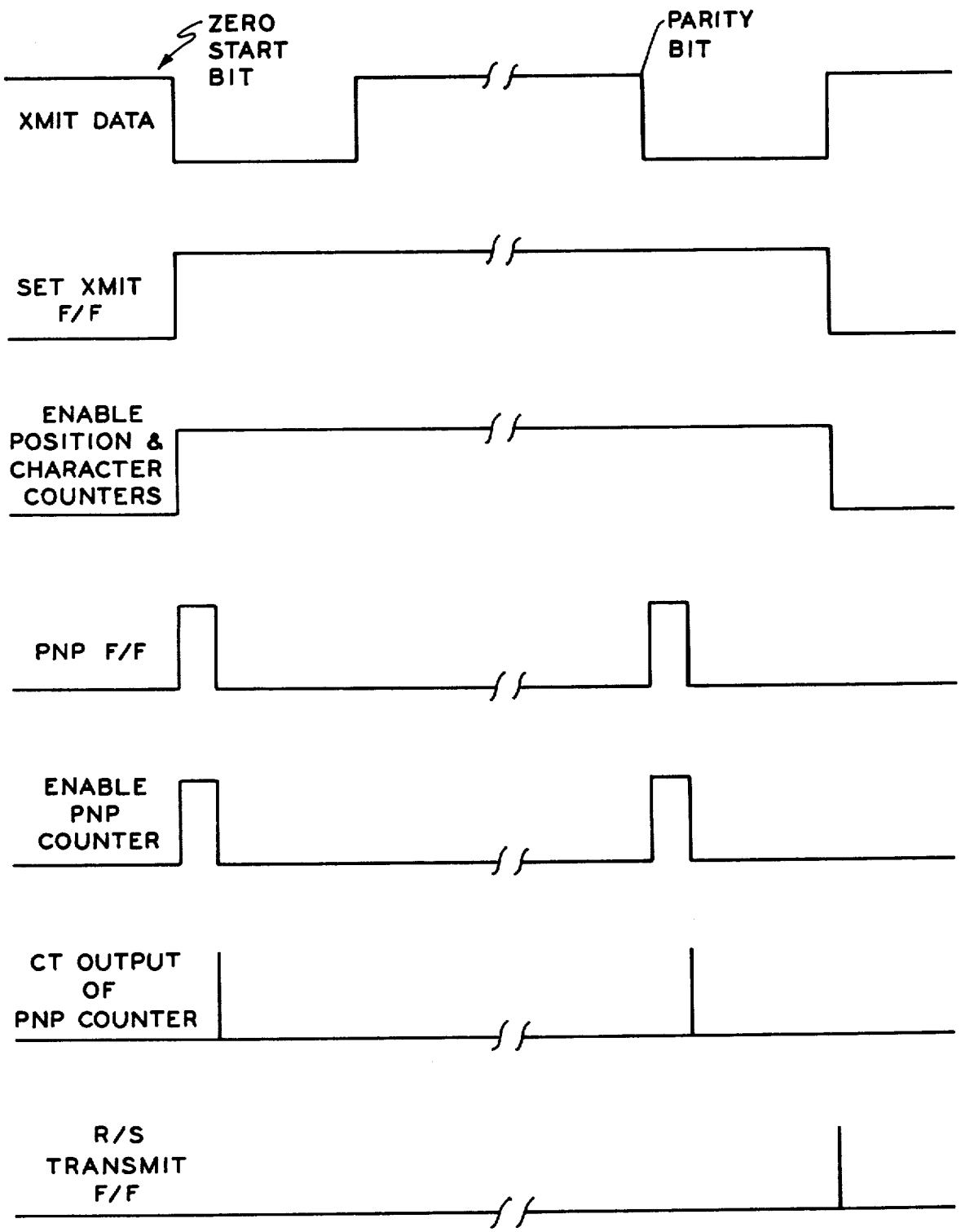
FIGS. 6F–6H show the timing diagrams for the transceiver circuit shown in 6A–6E.
Figure 6G:
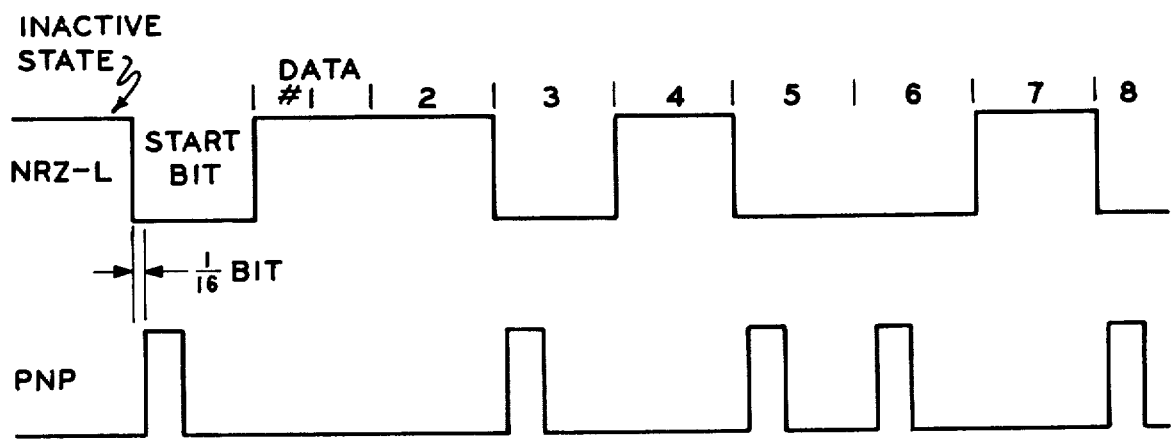

When notted input OR gate 149 has received an input from either the positive pulse detection circuit or the negative pulse detection circuit, it will supply the bit to terminal K6 to enable Half-bit Counter 160, which may be a 74LS161 counter, in FIG. 6D, to enable NAND gate 161 and to supply an input to Delay Shift Register 162, which may be a 74LS164 register. The purpose of the circuit shown in FIG. 6D is to detect that a valid bit has been received by the pulse transformer receiver circuit. The requirement of this circuit is that the bit (or pulses received) must be at least a half bit wide. When the first bit at terminal K6 enables counter 160 and NAND gate 161 and provides an input to register 162, counter 160 and register 162 begin to count the 768 KHz clock. When counter 160 has counted 8 of these clock signals indicating half a PNP pulse, it produces an output at terminal K4 which clocks the valid data bit through flip-flop 152 or flip-flop 145 depending upon whether a positive or negative data bit had been received. When either one of these flip-flop switches, an output is produced by OR gate 150 to enable counter 151, which may be a 74LS161 counter. Also, when a positive bit has been received, flip flop 152 will switch to inhibit NAND gate 146 through AND gate 170 to prevent negative going pulses from going through the circuit. This is a safeguard against noise being generated in the other direction and being accepted by the transceiver as a valid data bit. On the other hand, if a negative data bit had been received, then flip-flop 145 switches to inhibit NAND gate 143 through AND gate 144 from allowing positive pulses being supplied through it. Also, the D input of flip-flop 172 receives the output from OR gate 171. OR gate 171 will pass through either a positive or negative pulse such that, when the output at K4 clocks flip-flop 172, an output is provided at terminal K3 which is used in FIGS. 6A and 6B at flip-flop 122 and AND gate 123, respectively, to prevent the transmission of pulses on the data line.

If a valid data bit has been received, half-bit counter 160 will time out and provide an output at K4. This output essentially then takes two paths. The first path is to the clock input of Valid Bit flip-flop 173 which may be a 74LS74 flip-flop. At the same time, the bit input to delay shift register 162 is being shifted through by the same clock which is driving Half-bit Counter 160 and provides an output at Q7 at the same time Half-bit Counter 160 provides its output to the clock input of Valid Bit flip-flop 173. The Q output of Valid Bit flip-flop 173 and the Q7 output of Delay Shift Register 162 go high at the same time which causes NAND gate 174 to supply a low signal to terminal K7. Terminal K7 is connected to the NRZ-L flip-flop 175, which may be a 74LS74 flip-flop, shown in FIG. 6E which changes its Q output to supply the data bit over line RCV DATA. At the same time that NRZ-L flip-flop 175's Q output goes high, Bit Counter 176, which may be a 74LS161 counter, is enabled to begin counting inverted transmit clock pulses at terminal K5. After it reaches a count of 8, it supplies an output over Q3 to NAND gate 177 for providing a signal to terminal K8 which sets flip-flop 178 for providing an output through AND gate 179 to reset Valid Bit flip-flop 173. After counter 178 of FIG. 6E reaches a count of 16, the equivalent of one bit width for an NRZ-L bit, it provides an output at TC for setting the flip-flop 181 which provides an output through NAND gate 180 to reset NRZ-L flip-flop 175. When flip-flops 178 and 181 receive the next transmit clock signal at terminal H2, they arre reset. In this manner, a 20 microsecond PNP data bit on the data bus is converted to the NRZ-L bit as shown in FIG. 6G.

When Half-bit Counter 160 provides its output at terminal K4, this output is connected to the clock terminals of flip-flops 152, 172 and 145 of FIG. 6C. Thus, the positive signal at terminal H7 will be clocked through flip-flop 152 or the negative signal at terminal H9 will be clocked through flip-flop 145 and either signal will be clocked through flip-flop 172. When flip-flop 145 or flip-flop 152 has been switched, an output is provided through OR gate 150 to enable Inhibit Counter 151. Inhibit Counter 151 begins counting transmit clock pulses and, at the count of 8, will set flip-flop 183. When flip-flop 183 sets, it provides an output through OR gate 184 to reset flip-flops 152, 172 and 145.

If the pulse at K6 does not last for at least 8 counts of the 768 KHz signal, Half-bit Counter 160 will automatically reset at the notted MR terminal. Also, the loss of the signal at terminal K6 provides an output through NAND gate 161 to reset Delay Shift Register 162. Since no output will be provided at terminal K4, flip-flops 152, 172 and 145 are not switched and no signal is supplied by the Valid Bit flip-flop 173 to the NRZ-L flip-flop 175 to prevent the supply of a pulse on the RCV DATA line.

Figure 6H:
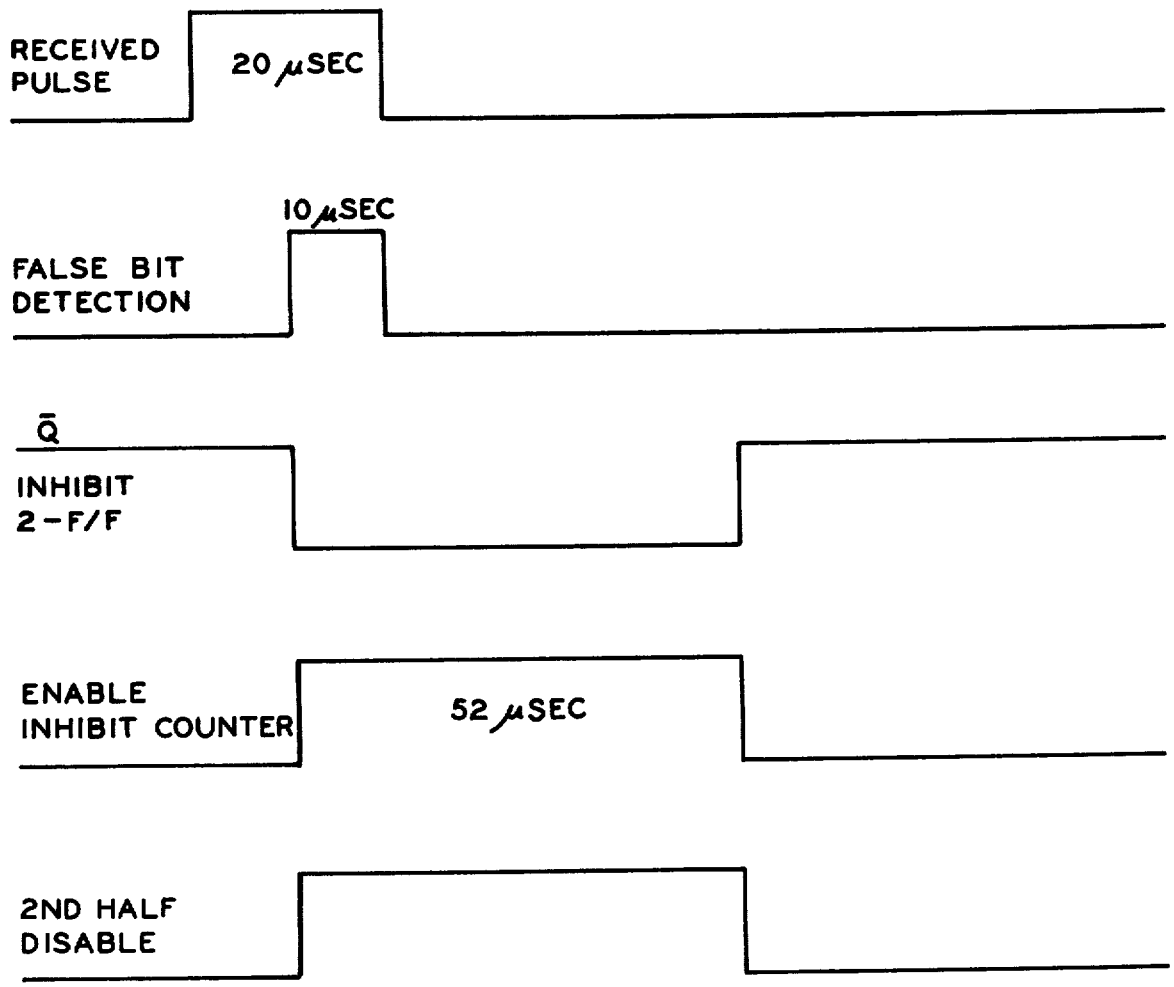

It is to be noted that PNP Counter 126 on the transmitting portion of the circuit shown in FIG. 6A is counting the 768 KHz pulses until a total of 16 is reached to insure that the PNP pulse on the data bus is 20 microseconds wide. Half-bit Counter 160 counts only 8 of the 768 KHz pulses to insure that the PNP pulse received is at least 10 microseconds long. The timing chart for the received pulses is shown in FIG. 6H. When a 20 microsecond PNP pulse is received from the data bus, Half-bit Counter 160 and Delay Shift Register 162 provide their outputs for only 10 microseconds which is the last 10 microseconds of the received pulse. When Valid Bit flip-flop 173 is set, the output from Half-bit counter 160 clocks either flip-flop 152 or flip-flop 145 to provide an output through OR gate 150 to enable Inhibit Counter 151. These two signals last for 52 microseconds due to the output from Inhibit Counter 151 resetting flip-flops 152 and 145. It is to be noted that the signal to the set terminal of NRZ-L flip-flop 175 can only last ten microseconds since Delay Shift Register 162 is reset after ten microseconds to disable NAND gate 174.

Figure 7:
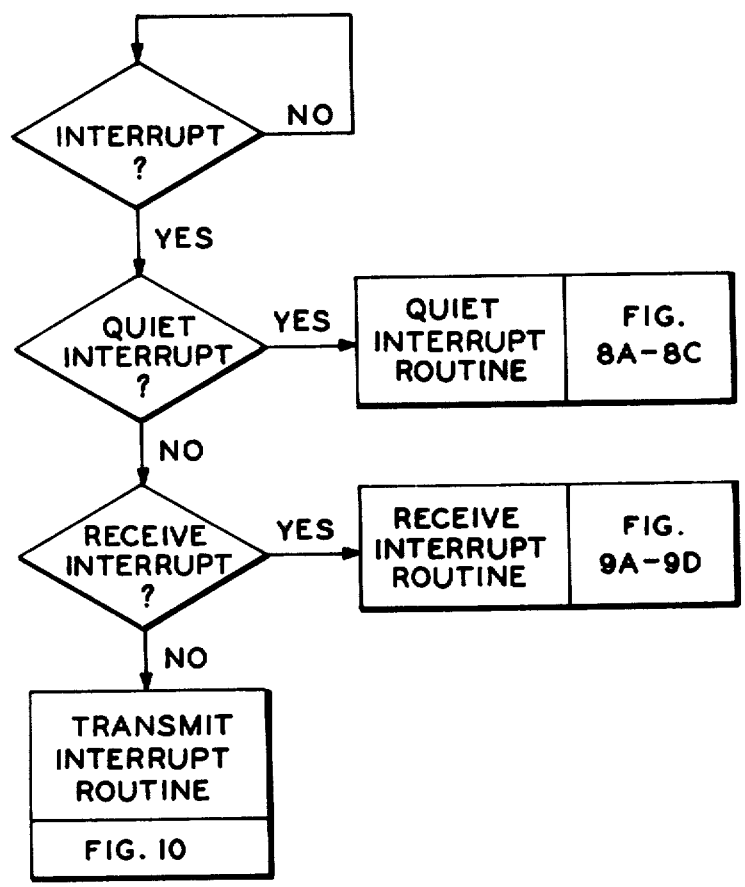
FIG. 7 shows the general software routines which are used by the microprocessor of FIGS. 1 and 4 to control the protocol hardware.

FIG. 7 shows the generalized flow chart for the software which controls microprocessor 10 and a program listing for this flow chart is included as an appendix hereto. According to the flow chart of FIG. 7, the microprocessor waits for an interrupt from the interface circuit. Once it does receive an interrupt, the microprocessor must determine what type of interrupt it has received. As previously discussed the microprocessor can easily determine if the interrupt is a transmit interrupt if it is in the transmit mode. If it is not a transmit interrupt and a look at the data lines indicates that there is no received data, the interrupt must be a quiet interrupt. If there is data, the interrupt must be a receive interrupt.

Figure 8A:
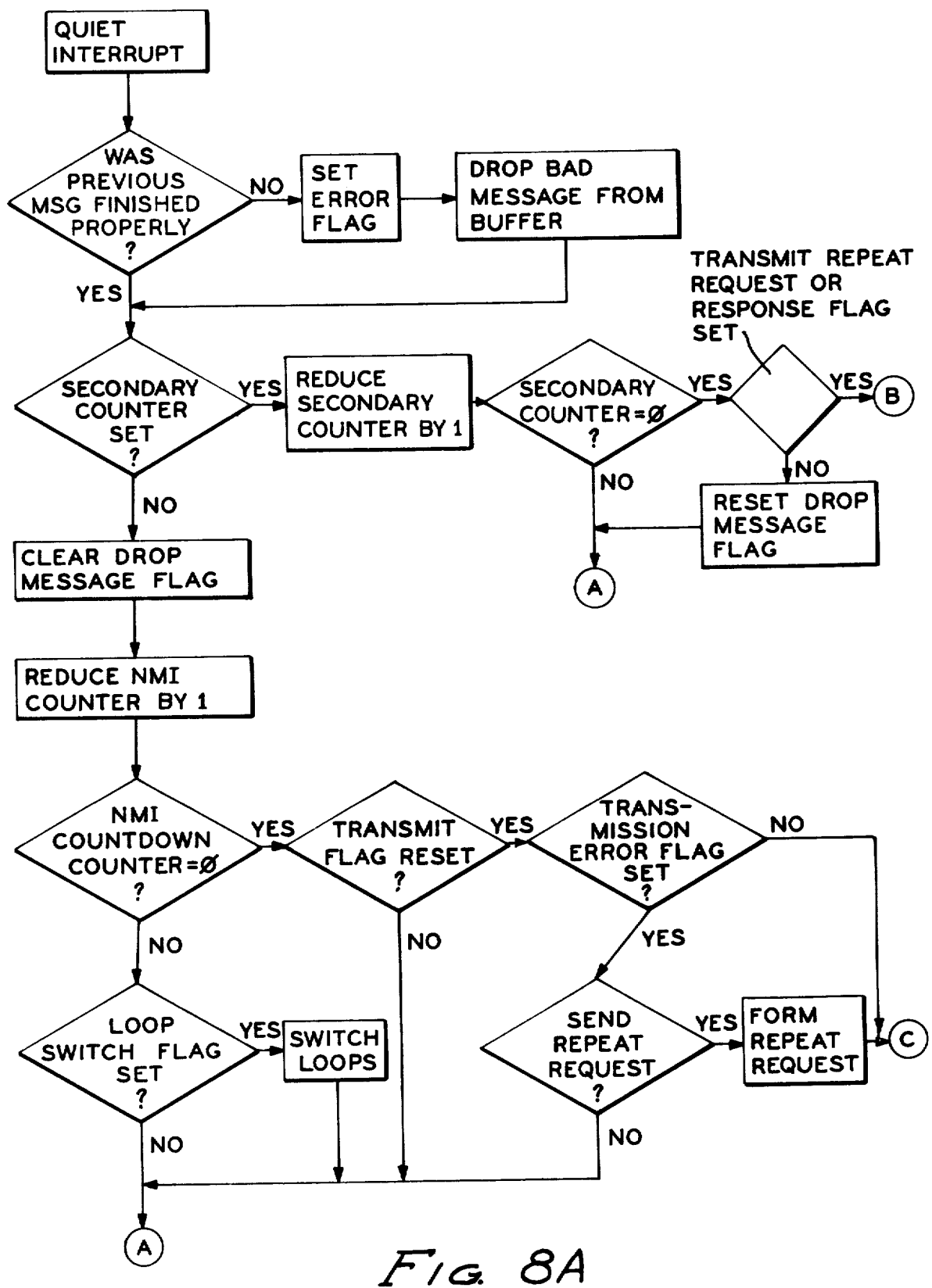
FIGS. 8A–8C show the quiet interrupt routine.
Figure 8B:
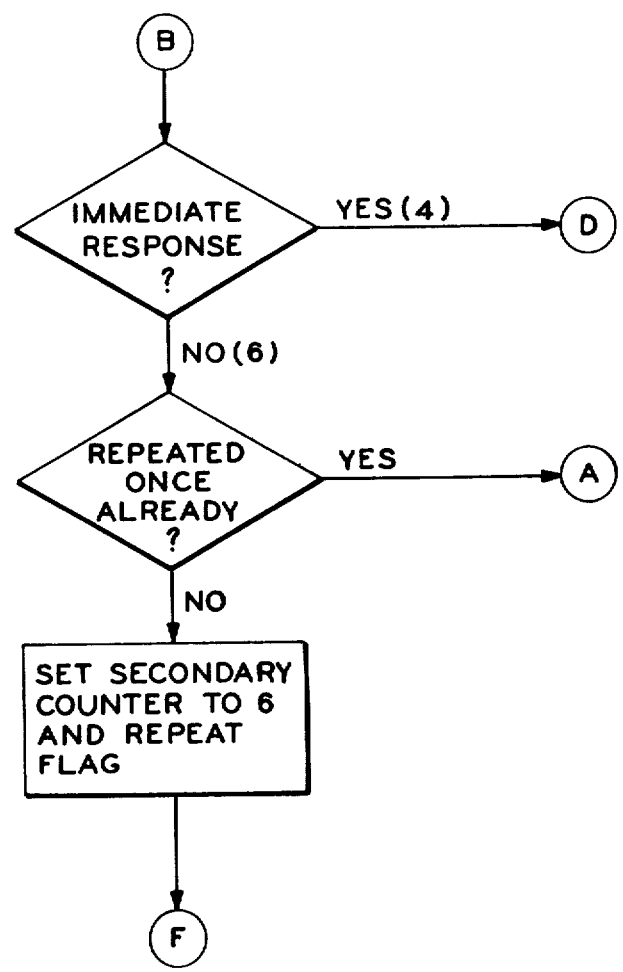
Figure 8C:
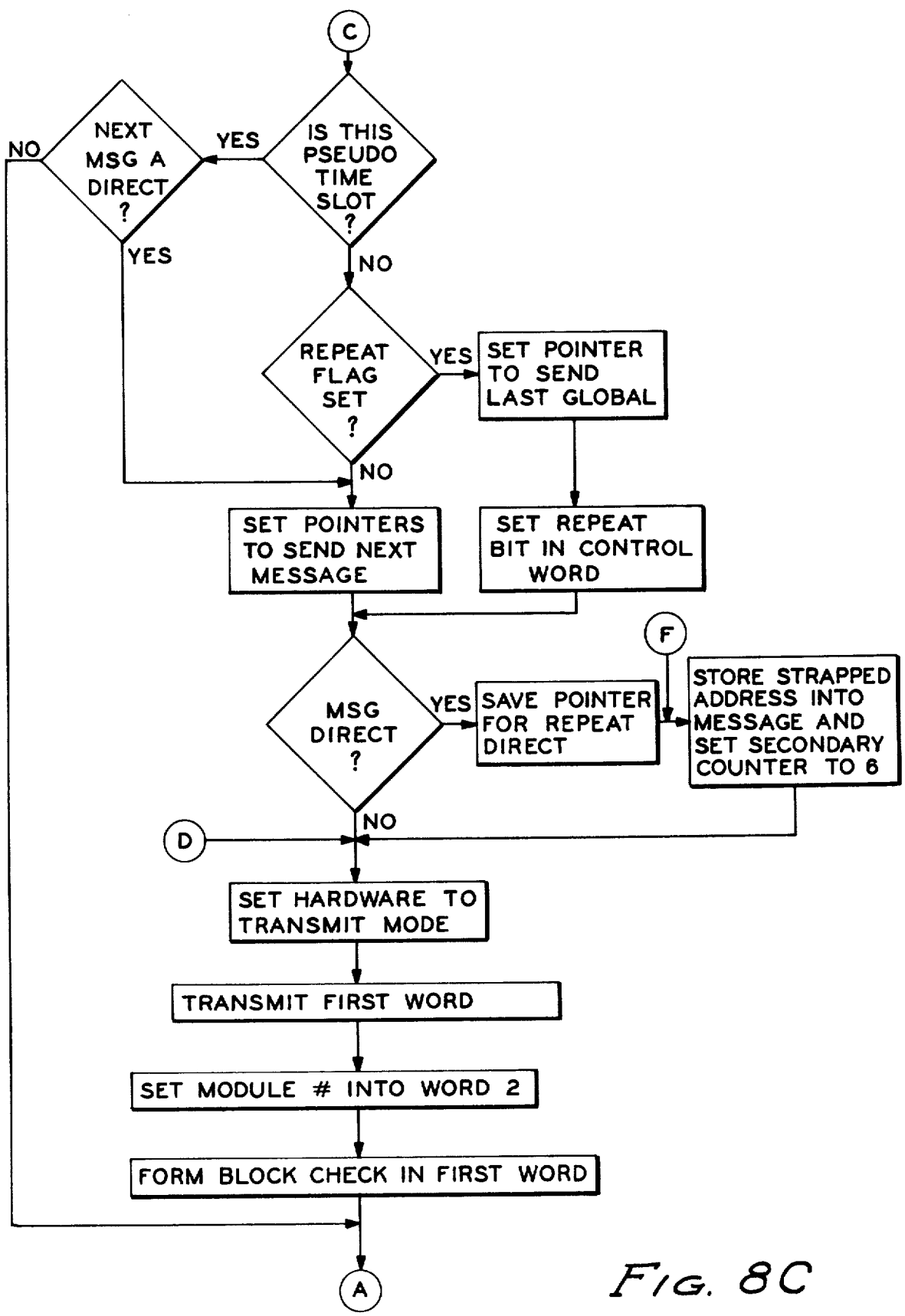

Therefore, according to FIG. 7, if the interrupt is a quiet interrupt, i.e., an interrupt generated by the Bit Time Interrupt Generator of the interface circuit, the program proceeds to the flow chart shown in FIGS. 8A-8C. Upon entering the quiet interrupt routine, a test is made to establish if the previous message was properly completed. It does this by looking at the last word received to see if it has its full complement of bits and that there had been no error in transmission. If the last message was not properly finished, an error flag is set and the bad message is dropped from the storage buffer in the microprocessor. If the message was properly finished or after the bad message had been dropped from the storage buffer, a test is made to determine whether the secondary counter has been set. This counter is a memory location which is set to 6 when this station initiates a direct message and is expecting a response from another remote station, or if a direct message has appeared on the line but is not directed to this station. The secondary counter will be set to four if the direct message was for this station. Thus, this counter will wait for 6 interrupt signals to be generated before it takes action. In FIG. 8A, if the secondary counter has been set, it is reduced by 1 and a test is performed to see if the secondary counter has reached 0 yet. If it has not, we go to point A and wait for another interrupt. If it has reached 0, a test is performed to determine whether the transmit repeat request flag or response flag have been set. If neither flag has been set, the drop message flag is reset and the system waits for another interrupt. If the transmit repeat request flag or response flag has been set, the system proceeds to FIG. 8B where the original setting of the secondary counter is checked. If the original setting was a 4, then a response is expected to be transmitted by this station. If a response is expected to be transmitted by this module, the program enters point D in FIG. 8C to begin transmission, which operation will be discussed hereinafter. If the secondary counter had originally been set to 6, a direct message had previously been transmitted by this remote station and it is awaiting an answer or this station has detected a direct message on the bus but directed to another station. Thus, if the secondary counter had originally been set to 6, and if the direct message had been repeated by this remote station and still no answer had been received back, the program proceeds to point A where it again waits for some type of interrupt. If the message had not been repeated, the secondary counter is set to 6, the repeat flag is set and the program enters FIG. 8C at point F to begin transmitting the direct message again. After the direct message is transmitted, and no message is received, the program again waits for 6 quiet interrupts and then proceeds to point A to wait for some type of interrupt.

Upon receipt of a quiet interrupt, if the secondary counter had not been set, indicating that the secondary counter was equal to zero after the last message was tested to see if it was properly finished, the drop message flag is reset and the NMI counter is reduced by 1. The NMI counter is the transmit turn counter which is a memory location set to the number of time slots in the protocol system. As mentioned before, if the remote station does not have a pseudo time slot, the countdown counter is originally set to 256 after it has transmitted. Each time a subsequent station transmits, the remote station calculates a new count by subtracting the address of the subsequent station from its address and multiplying by 2. This new count is stored in the countdown counter. If no other station transmitted, the countdown counter would be decremented by one for each generated quiet interrupt. When the counter reaches 0, the remote station may transmit again. After available data is again transmitted, the NMI counter is again set to 256. After the NMI counter has been reduced by one, a test is made to determine if the counter has been reduced to zero. If the counter is at zero, this station's transmit time slot is now available. At this point, a test is made to determine whether the transmit flag has been reset. If it has not, the system proceeds to point A where it waits for another interrupt. If it has been reset, the transmission error flag is tested to see if it has been set. If it has, and if a repeat request has been received, the program proceeds to point A and waits for another interrupt. If the transmission error flag has been set and a repeat request has not been received, the repeat request if formed and the station proceeds to point C. The station also proceeds to point C if the error flag has not been set.

Upon arrival at point C in FIG. 8C, several conditions must be ascertained about the nature of the message to be transmitted. First, a test is made to determine whether this is a pseudo time slot. A pseudo time slot is one of the extra time slots discussed above. If this is a pseudo time slot but the next message to be sent is not a direct message, control is passed to point A where an interrupt is awaited. If the message to be sent next is not a direct message, then it must be a global message and global messages cannot be sent during pseudo time slots although direct messages can be sent in either. Therefore, the regular time slot of the remote station must be awaited in order to send this message. However, if there is a pseudo time slot and if the next message to be sent is a direct message or if this is not a pseudo time slot and the repeat flag has not been set, the pointers are set to send the next message. If the repeat flag has been set and this is not a pseudo time slot, then the pointer is set to send the last global message again since this is a non-pseudo time slot. Once the repeat bit in the control word has been set or the pointers have been set to send the next message, another test is made to determine if the message to be sent is a direct message and, if it is, the message buffer address pointer is saved in case of a repeat. Once this pointer has been saved or, looking at FIG. 8B, the secondary counter has been set to 6 and the message has not been repeated, the strapped address in switches S1-S7 of the interface circuit are stored into the message and the secondary counter is set to 6 indicating that this is a direct message and that we will wait six time slots for an answer. If the message to be sent is not a direct message or once the strapped address is stored into the message and the secondary counter is set to 6 or the program has come from point D in FIG. 8B indicating that this message is a response to a direct message received from another station, the hardware is set to the transmit mode, the first word is transmitted (the control word) and the station address number is inserted into the second word. Next, the block check calculation is made according to FIG. 11 for words 1 and w. The program then proceeds to point A where it waits for another interrupt. Thus, when quiet interrupts are received and the secondary counter has not been set, indicating that a response is not expected from this station or a direct message which can be transmitted during the pseudo time slot is not to be sent, the NMI counter or time-to-transmit counter is decremented by 1 for each quiet interrupt produced. When this count has been reduced to zero, this station can transmit. If the secondary count has been set to a 4, a response from this station is expected to a previously sent direct message from another remote station. In this case, the response is transmitted. If the secondary counter had been set to 6 indicating that a direct message is to be sent, and a direct message has not been repeated, the system sets the secondary counter and sends this message. If the message has been repeated, the system proceeds to wait for the next interrupt of any type. If the NMI countdown counter (or the time-to-transmit counter) has reached zero but this is a pseudo time slot such that a global message cannot be sent, the system must now reset its NMI countdown counter and again wait for a time slot during which a global message can be transmitted. If this is a pseudo time slot, a direct message can be sent.

At point A the next interrupt must be investigated to determine what kind of interrupt it is. If this interrupt is not a quiet interrupt but it is a receive interrupt, the receive interrupt routine is entered and is shown in FIGS. 9A–9D. A receive interrupt is generated by the interface and interpreted as such by the microprocessor when transmission has been received over the data bus and is now available in the ACIA 50. The received word is first checked for a hardware error and, if there is a hardware error, the error flag is set and the drop-message flag is set and the program proceeds to point A to wait for another interrupt. If there is no hardware error but the drop-message flag has been set, the secondary counter, which was mentioned in the previous routine, is cleared and the system proceeds to point A to wait for another interrupt. In this way, a message containing any word error is rejected. After the message is ended, a quiet interrupt executes the quiet interrupt routine resetting the drop-message flag. If no hardware errors are detected, the received word is loaded into a character receive buffer. As each correct word is placed in the buffer, a receive word counter is incremented and a block check calculation is performed as shown in FIG. 11. This block check routine determines both whether there is an error and if the last word received is the end of message. Thus, an end-of-message test is performed. If the last word received is the last of the message, the routine proceeds to point E.

Since each word position in a message has a specific meaning, a means of identifying these positions is necessary. If the word received is not an end-of-message, a check is made to determine if it is the first word in a message. To do this, the word counter is examined. If it is the first word, another test is performed to determine if the message is an "I'm OK" message. If the control character word in the receive buffer indicates it is an "I'm OK" message, the routine is told to expect a message length of two characters. If it is an "I'm OK" message and the routine is told to expect a message length of two characters or if it is not an "I'm OK" message, an exit is made to point A where another interrupt is awaited. If this word was not the first word, a test is made to determine whether it is the second word. The second word position of a message is the sender's address. If the character is the second word, a calculation of the transmit turn time is performed, by subtracting the sender's address from this station's address and multiplying by 2, and saved and an exit is made to point A. If the word is the third word, which contains the message length, it is stored in the receive buffer and is also used for comparison to the word counter count at the end of the message.

Word four can be either the control extension word or a receive address word. A control extension word indicates it is a global message. A receiver address word indicates it is a direct message. If it is a global message or a direct response message, an exit is made at A. If the message is a direct request message, the secondary counter is set to either a 4 indicating that it must respond after four quiet interrupts or a 6 for those stations which are not addressed. Thus, only the station which has been required to respond to the direct message on the data bus sets its secondary counter to 4. All other stations will set their secondary counters to 6. At the end of 4 time slices, this station will respond. None of the other stations will respond because their secondary counters have been set to 6. For each word received, an interrupt is generated which causes the program to enter the receive interrupt routine. Each word is checked and the block check is performed. When an end-of-message has been detected, the program proceeds to point E.

Figure 9A:
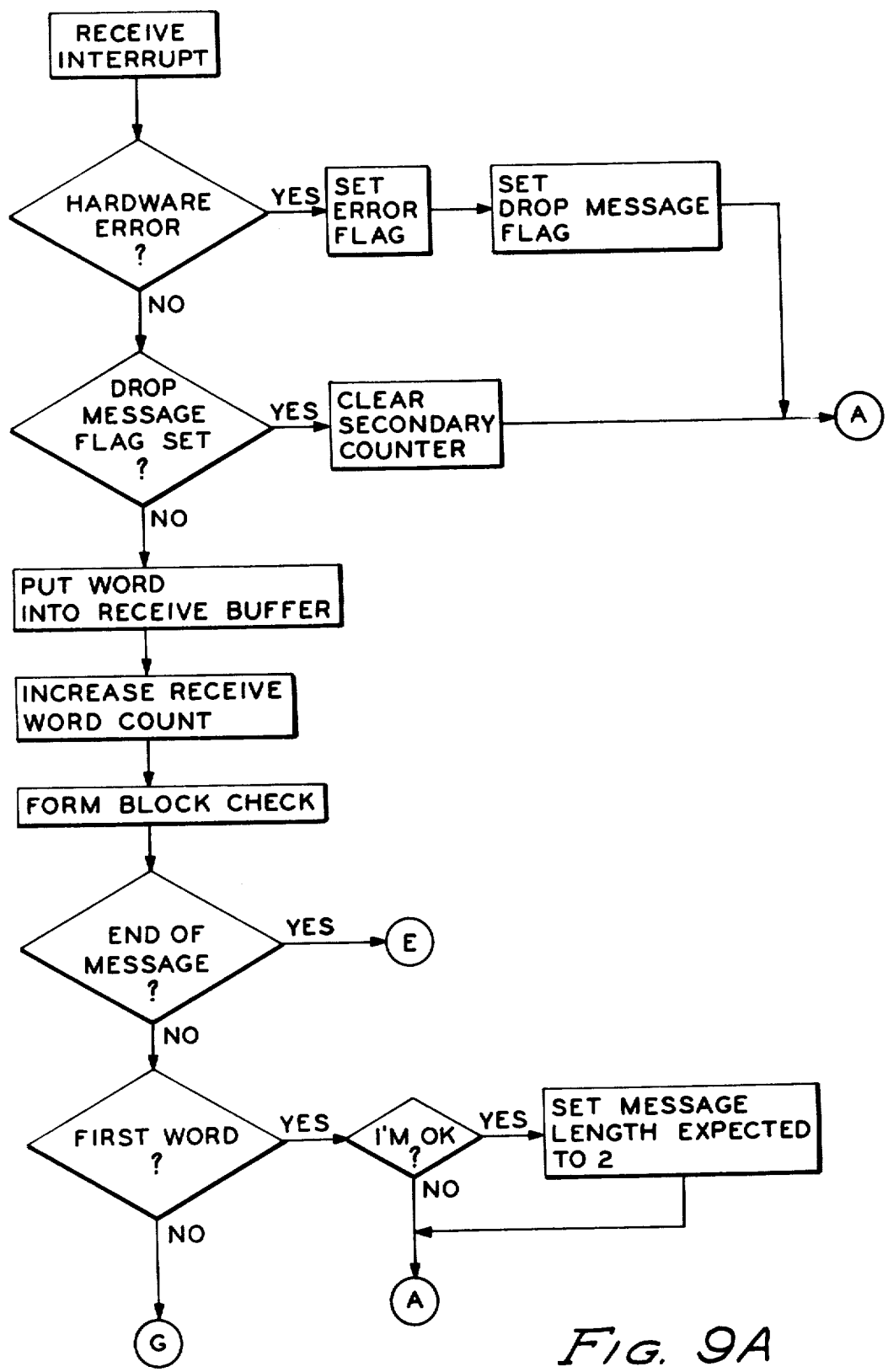
FIGS. 9A–9D show the receive interrupt routine.
Figure 9B:
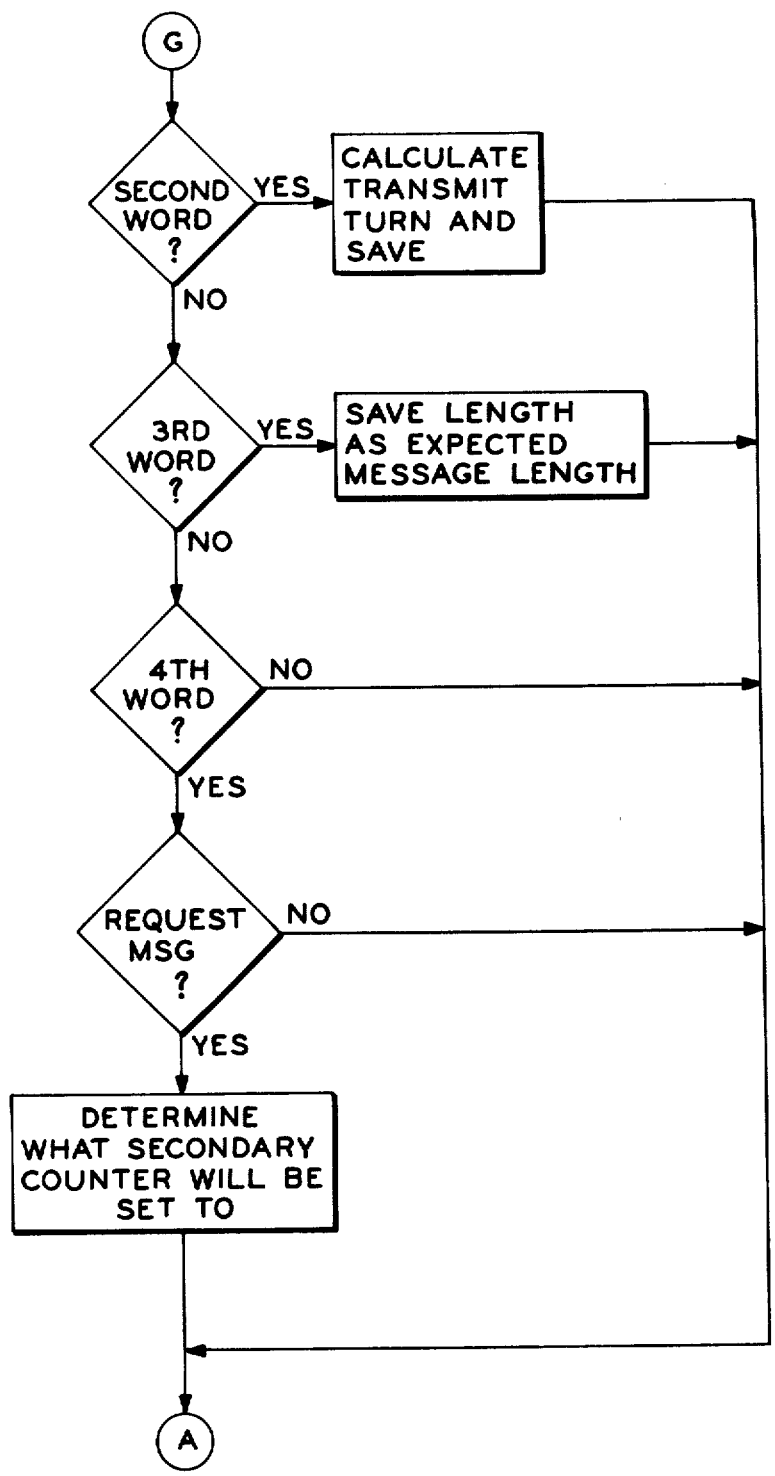
Figure 9C:
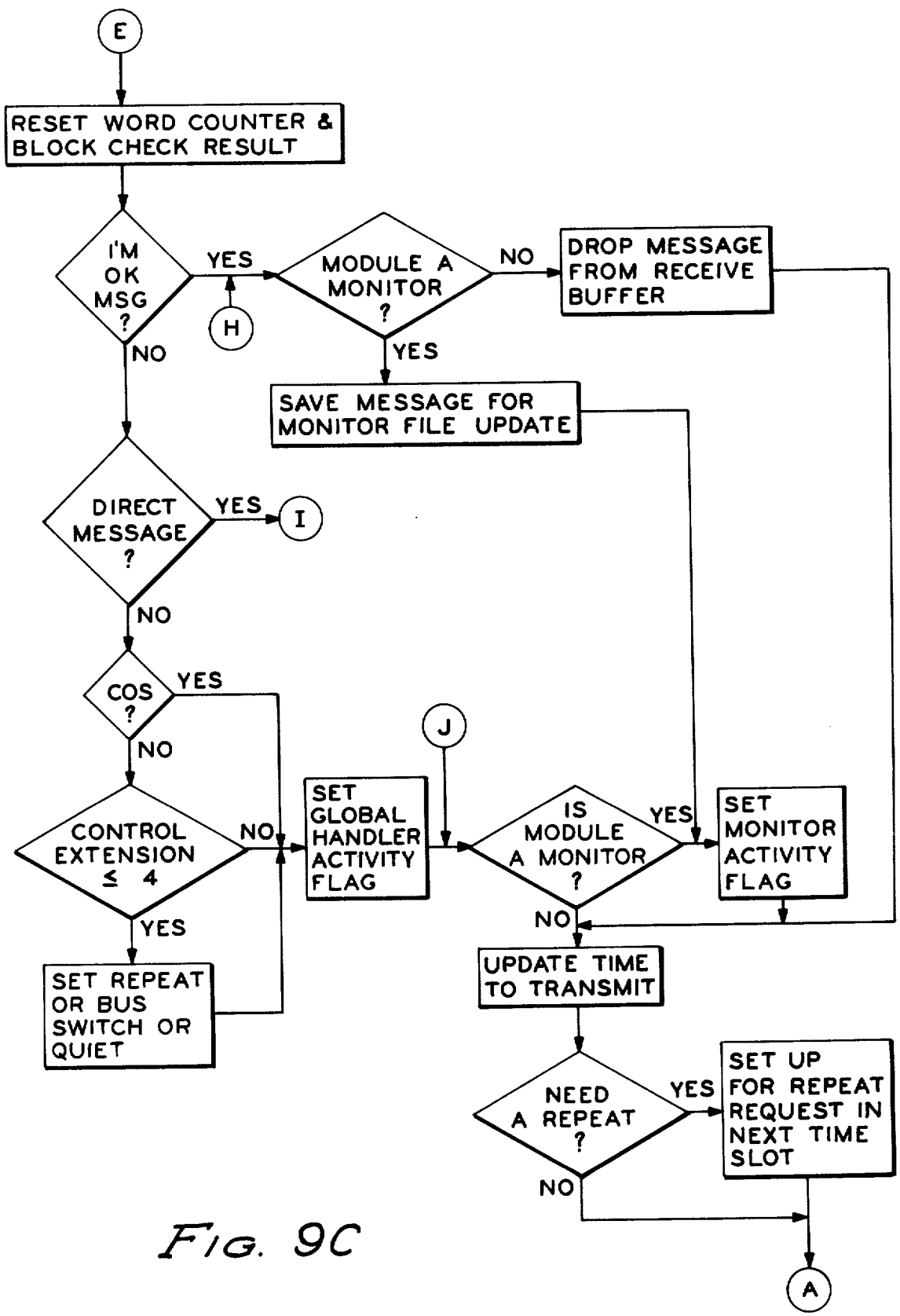
Figure 9D:
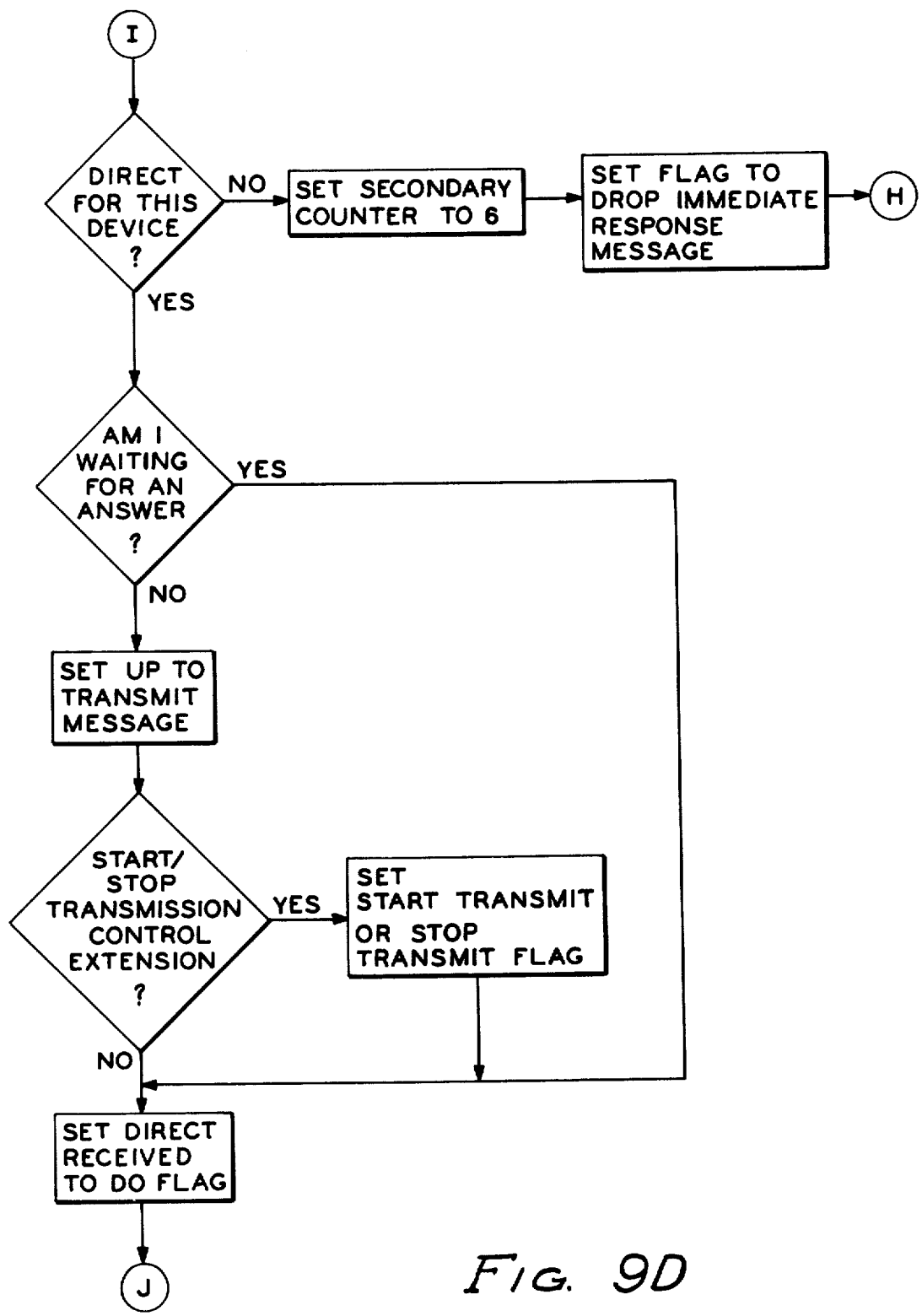

As shown in FIG. 9A, when a message has been received in its entirety, an end-of-message is detected and the program enters point E in FIG. 9C. FIGS. 9C and 9D show the end-of-message routine. The end-of-message routine first resets the word counter and block check result in the main receive routine and then examines the control word in the receive buffer to determine if the message is an "I'm OK". If the message is an "I'm OK" message and if this module is not a bus monitor, the "I'm OK" message is deleted from the receive buffer. If this station is a bus monitor, it saves the "I'm OK" message in order to update the bus monitor data file. The saved calculated transmit turn is now set into countdown counter. A test is made to determine if a repeat request message is needed due to an error flag or other conditions. If a repeat message is necessary, a repeat request is set up for transmission during the next time slot and the program proceeds to point A. If a repeat message is not needed, the program proceeds directly to point A.

If the message is not an "I'm OK" message, the control word in the receive buffer is examined to determine if it is a direct message. If it is, a further test is made to determine if the direct message is intended for this station as shown in FIG. 9D. If the direct message is intended for this station, it is next determined whether the message is a request for which an answer is necessary or a response to a previous request by this station. If it is a response message, the direct received-to-do flag is set and the module is tested to see if it is bus monitor in FIG. 9C. If the direct message is a request, a response message is prepared. The control extension word is checked for a start or stop transmitting directive. In either case, the appropriate transmit flag is set and then the direct received-to-do flag is set and the program is returned to point J in FIG. 9C.

If the message was not a direct message, then it must be a global message and is tested for a change of state. If a change of state has occurred, the global handler activity flag is set and the bus monitor test is performed. If the global message is a monitor directive such that there will be no change of state indication, the control extension word is tested to see if it is a code 1, 2, 3 or 4 message. A code 1 message is a message to switch bus loops, a code 2 message is a message to set a flag to repeat the last global message, a code 3 message is a message to switch loops and repeat the message, and a code 4 message is a message to wait for a repeat directive. From this point, the global handler activity flag is set and the routine proceeds to the bus monitor where the program eventually proceeds to point A to wait for the next interrupt. Thus, the NMI countdown counter is decremented either by a quiet interrupt or reset by receiving a senders address.

Figure 10:
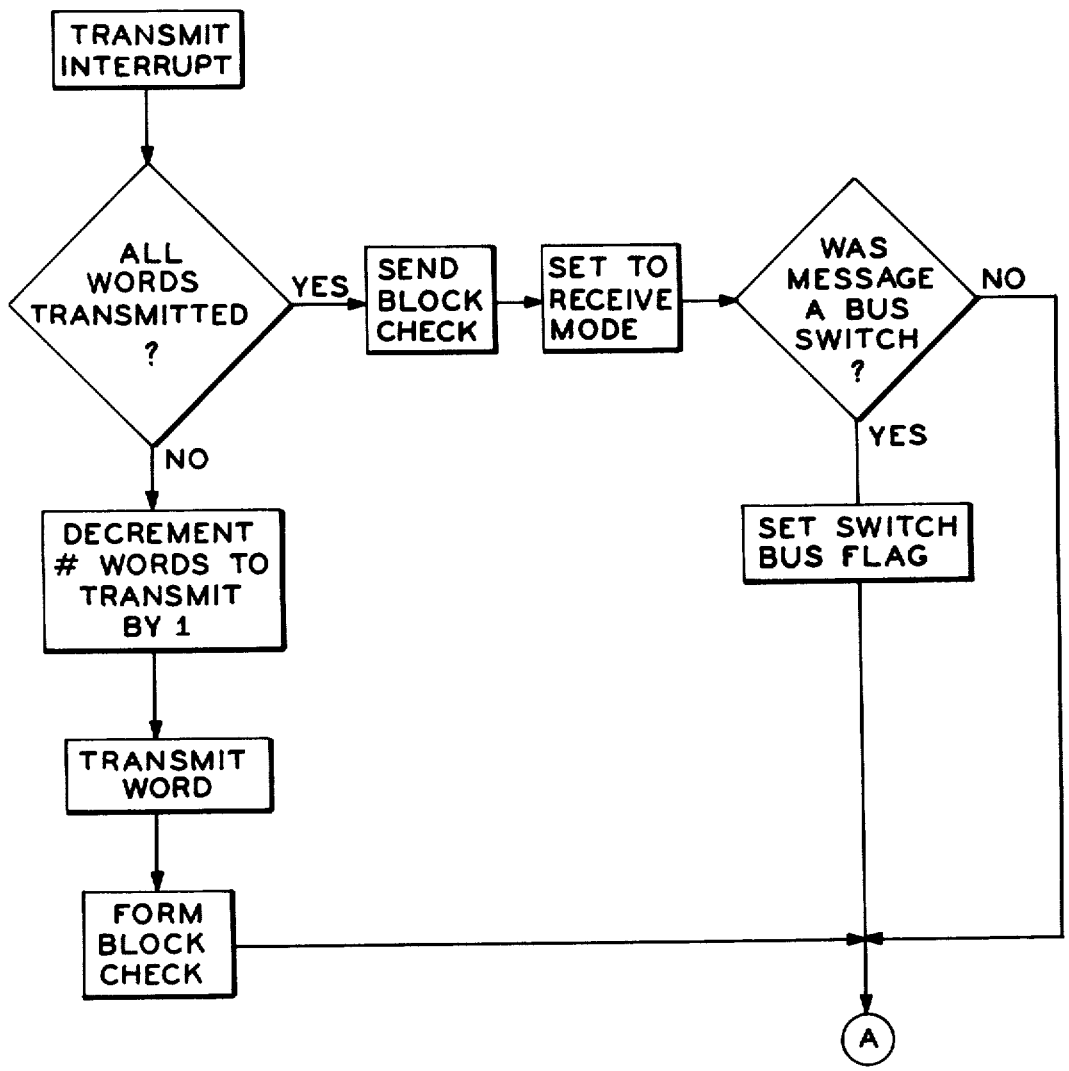
FIG. 10 shows the transmit interrupt routine.

If the interrupt, according to FIG. 7, is neither a quiet interrupt nor a receive interrupt, it must be a transmit interrupt and the transmit interrupt routine in FIG. 10 is entered. Thus, once a message transmission begins, a hardware-generated interrupt is provided by the ACIA when it is ready to receive another word for transmission. The transmit interrupt causes execution of the transmit's second through last word. Immediately upon entering the transmit routine, a test is made of the transmit word counter to determine if all words have been sent. If they have not all been sent, the transmit word counter is decremented by 1, the next word is transmitted, and the block check calculation is updated. The system waits for the next transmit interrupt and this process is repeated.

Once the entire message is sent, i.e., all characters have been transmitted, the result of the last block check calculation is now complemented and then transmitted as the block check word, and the hardware is reset to the receive mode. If this station is a bus monitor, a check is performed to determine if the message was a bus switch directive. If it was, the bus switch flag is set prior to its exit to point A. If not, the program exits directly to point A to await the next interrupt.

The block check word routine, where a block check word is sent with each message having more than two words or where the control word and the sender's address in an "I'm OK" message must satisfy the routine, is shown in FIG. 11. The first word to be transmitted is obtained and rotated one place to the right. The next word is obtained and is added to the first word. A test is made to determine whether or not the sum of these two words results in all ones. If the result is all ones and the least significant bit of the first word before rotation was a one, the algorithm detects a two-word message. Assuming that all ones did not exist after the first two words, the previous result of the addition step is then rotated to the right one bit and the next word is obtained and added to the rotated addition of the first two words. A test is made to determine whether all ones exist. If not, this result is rotated to the right, the next word is obtained and added to it. When all ones are detected in the result, the number of words accumulated to that point is totaled. If the number of words transmitted when all ones exist is equal to the number of words designated for that particular transmission by the third word, an end-of-transmission has been detected. If all ones have been detected but the number of words accumulated to that point is not the same as the number of words designated in the message length third word, the next word is obtained and the process repeats until all of the words have been tested. If all of the words have been tested and the result is still not all ones, a system error has resulted.

In the special case of a two-word message where the two words are the control word and the address word, this check routine still must exist. A two-word message will satisfy this routine by first specifying that the most significant bit of the sender's address must be a zero. When the sender transmits his address, he first rotates the address word to the left by one bit and then complements the word. This result is sent as a first word or control word. By nature of the arithmetic, the least significant bit of the transmitted control word contains a 1. This bit is reserved to be a 1 only for a two-word message. When the check word algorithm is applied to this two-word message, the condition of all ones will exist after the second word is added to the first transmitted word with rotation.

If words 1, 2 and 3 had been transmitted, word 1 is rotated, then word 2 is rotated and added to rotated word 1. This result is added to rotated word 3. The final result is complemented and transmitted as the block check word.

MOTOROLA M685AM CROSS-ASSMBLER

```
00001                              NAM     MGS    EXEC
00002                        *
00003                        *     THIS PROGRAM RESIDES IN PROM MEMORY.
00004                        *     IT IS WRITTEN IN MOTROLA M6800 ASSEMBLY LANGUAGE.
00005                        *     IT EXECUTES IN A HONEYWELL DELTA DCC MODULE WHICH
00006                        *     USES A MOTOROLA M6800 MICROPROCESSOR AS THE CPU.
00007                        *
00008                        *     ****    12/20/77   ****
00009                        *
00010                              EQUATES
00011  00F4                  CASINT EQU    $F4            TEMP CASSETTE VECTOR LOC.
00012  00F6                  NMINT  EQU    $00F6          TEMPORY FOR USE DEBUG
00013  00F8                  IRQINT EQU    $00F8          TEMPORY FOR USE WITH DEBUG
00014                        *
00015  F000                  JBUG   EQU    $F000          JBUG ENTRY
00016  F878                  JCLL   EQU    $F878          CASSETTE ENTRY
00017  4000                  IO     EQU    $4000          I/O INTERFACE LOC.
00018                        *
00019  4070                  ACIAST EQU    $4070          ACIA STATUS REGISTER
00020  4071                  ACIARG EQU    $4071          ACIA DATA REGISTER
00021  4078                  NMICON EQU    $4078          NMI CONTROL REGISTER
00022  4079                  NMIST  EQU    $4079          NMI STATUS REGISTER
00023  40DE                  ITCON  EQU    $40DE          INTERRUPT CONTROLLER ENABLE W
00024  40DF                  SYSWD  EQU    $40DF          SYSTEM WATCHDOG WORD
00025                        *
00026  4400                  PIAAD  EQU    $4400          DATA PIA A
00027  4401                  PIAAC  EQU    $4401          CONTROL PIA A
00028  4402                  PIABD  EQU    $4402          DATA PIA B
00029  4403                  PIABC  EQU    $4403          CONTROL PIA B
00030                        *
00031  40E8                  TIRQ   EQU    $40E8          IRQ INT. FOR D1000 XMIT
00032                        *
00033                        *     TO DO FLAG TABLE
00034  0024                  AWS    ORG    $24
00035  0024 0004             AWS    RMB    4              MEMORY END=AWS  AND MEMORYST
00036  0028 0020             BASL   RMB    32
00037                        *     WORKING STORAGE
00038  0048 000E             BWS    RMB    14             BASE LOOP WORK SPACE
00039  0056 0002             CLCK   RMB    2              NMI INTERRUPT CLOCK
00040  0058 0002             MPTR   RMB    2              LAST MSG PTR OR START OF CURR
00041  005A 0002             CRPTR  RMB    2              CURRENT RECEIVE PTR
00042  005C 0001             RWDCNT RMB    1              RECEIVE WORD CNT
00043  005D 0001             BWORM  RMB    1              IM OR CONTROL WORD
```

```
0004d 0001       DEVNO   RMB   1          DEVICE NO. STRAPPED
0004E 0001               RMB   1          PSEUDO DEVICE NO.
0050  0001               RMB   1          BUS HANDLER FLAGS
0051                     LISTEN RMB  1
0052            * BIT0=DON'T TRANSMIT UNTIL DIRECTED.
0053            * BIT1=ERROR, STOP TRANSMITTING
0054            * BIT2=RECEIVE CHANGE IN TRANSMISSION
0055            * BIT3=LIVE QUIET INTERRUPT
0056            * BIT4=BYPASS INPUT
0057            * BIT5=SPARE
0058            * BIT6=WELL QUIET MSG. OR REPEAT
0059            * BIT7=ACTIVE MONITOR
0059  0001       NMICTR  RMB   1          COUNTER TO XMIT TURN
005A  0001       NMISEC  RMB   1          NMI SECONDARY COUNTER
005B  0001       NMICTA  RMB   1          TURN COUNTER HOLD
005C  0001       NMICTB  RMB   1          SECONDARY-COUNTER-HOLD
0060  0001       PARITY  RMB   1          PARITY WORD
0061  0001       NMICWD  RMB   1          NMI LOOP CONTROL
0062  0001       BMSGLW  RMB   1          EXPECTED MSG LENGTH
0063  0001       BADDRA  RMB   1          NEXT ADDR-HOLD
0064  0009 0001  BADDR   RMB   1          NEXT XMIT ADDRESS
0068  0009       BXWS    RMB   9          WORK SPACE FOR XMIT PTRS
0071  0001       MONFLG  RMB   1          MONITOR-CONTROL-FLAG
0072            * BIT0=REPEAT
0073            * BIT1=SEND NO MORE COS
0074            * BIT2=SEND NO MORE FIRE COS
0075            * BIT3=SPARE
0076            * BIT4=SPARE
0077            * BIT5=BUS SWITCH PREP
0078            * BIT6=SWITCH BUS
0079            * BIT7=DEVICE IS A MONITOR
007A  0001       BXW     RMB   1          SPARE MONITOR FLAG
007B  0001       TFLAG   RMB   1          TRANSLATOR IRQ FLAG
007C            *
0082  0003       BCLOK   RMB   3          NMI CLOCK VARIABLES
0083  0002       JDIR    RMB   2          JBUG DIRECT PTR.
0084            *
0085            * POINTERS AND CONSTANTS
0087  00FF              ORG   $FF
0088  00FF 0001          RMB   1
0089            *
0090            *****
0091            *****
0092            *****
0093            *****
0094            *
0095  0100                RECEIVE BUFFER
0095  0100               ORG   $100              START AT END AND WORK BACKWARD
0096  0100 0100  RLCV    RMB   $100              RESERVE 256 WORDS
```

```
00097   *
00098   *
00099   *
00100              ORG    $200
00101   0200 0040  LPTR   RMB    64         RESERVE 64 BYTES FOR TO DO PO
00102   *
00103   0240 0006  BMRMG  RMB    6          MSG RECVD AND DIRECT REPEAT
00104   0246 0086  SMD1   RMB    134        FIRST SEND BUFFER
00105   02CC 0086  SMD2   RMB    134        SECOND SEND BUFFER
00106   0352 0086  SMD3   RMB    134        THIRD SEND BUFFER
00107   03D8 0060  DSQ    RMB    96         SEND REQ. QUEUE
00108   0438 0020  DRCT   RMB    32         NMI CLOCK TABLE
00109   *
00110   *          THIS IS THE FIRST AVAILABLE DATA
00111   *          FILE SPACE FOR APPLICATION PROGRAMS.
00112   *
00113   *          THIS SPECIFIED AREA WILL BE FOR
00114   *          A TABLE OF POINTERS TO DIRECTORIES OR
00115   *          SUB-DIRECTORIES.
00116   *
00117   0458 0060  BPTRTB RMB    96         GROSS POINTER TABLE
00118   *          BPTRTB+0  JBUG MONITOR
00119   *          BPTRTB+2  MONITOR
00120   *          BPTRTB+8  START OF USER SUBR. GROSS PTR'S.
00121   *
00122   *          CANNED BE QUIET MESSAGE FOR XMISSION ERROR
00123   *          CASE WHERE A GOOD MESSAGE IS RECEIVED
00124   *          AFTER AN ERROR IS RECEIVED AND THIS DEVICE
00125   *          HAS A HIGHER DEVICE NO.
00126   *
00127   04B8 0004  BMSO   RMB    4          DEVICE ERROR, WAIT FOR REPEAT
00128   *
00129   *          REAL TIME CLOCK VARIABLES
00130   *
00131   *          VALUES STORED IN BCD
00132   04BC 0001  MCMS   RMB    1          MILLISECOND COUNTER
00133   04BD 0001  MCSEC  RMB    1          SECONDS
00134   04BE 0001  MCMIN  RMB    1          MINUTES
00135   04BF 0001  MCHRS  RMB    1          HOURS
00136   04C0 0001  MCDAY  RMB    1          DAY
00137   04C1 0001  MCMON  RMB    1          MONTH
00138   04C2 0001  MCYEAR RMB    1          YEAR
00139   04C3 0001  MCDAYW RMB    1          DAY OF WEEK
00140   *
```

```
00147         * LABEL AWS IS AVAILABLE FOR THE
00148         ** WORK STORAGE BEGINNING AND LABEL AWS+4
00149         *** IS THE END OF WORK STORAGE.
00150         *
00151  04C4 0001   MEMST  RMB   1            FIRST USABLE MEMORY LOC FOR F
00152         *
00153  FA00        ORG   $FA00
00154         *
00155         *INITIALIZATION
00156  FA00 86 03  START  LDA A  #3           ACIA CONTROL
00157  FA02 B7 4070        STA A  ACIAST       MASTER RESET
00158  FA05 86 9D          LDA A  #$9D         SET ACIA TO RECEIVE
00159  FA07 B7 4070        STA A  ACIAST
00160  FA0A B7 4071        STA A  ACIARG       SEND ONE CHAR.
00161         *
00162  FA0D CE 0028        LDX   #AWS+4       START OF BASE
00163  FA10 4F            CLR A
00164  FA11 A7 00  BS3    STA A  0,X
00165  FA13 08            INX
00166  FA14 8C 0458       CPX   #BPTRTB
00167  FA17 26 F8         BNE   BS3
00168         *
00169         ***
00170         *MOVE 'TO DO' PTRS.
00171         *
00172  FA19 CE 0200        LDX   #LPTR        PTR. TO PROM TABLE
00173  FA1C DF 4C          STX   BWS+4        SAVE FOR BLOCK MOVE
00174  FA1E CE FA6E        LDX   #LPTR        FROM PTR.
00175  FA21 86 40          LDA A  #64          MOVE 64 BYTES
00176  FA23 BD FFC3        JSR   BBMV         GO DO BLOCK MOVE
00177         *
00178         ** CLEAR MEMORY IF POWER UP ELSE JUST INITIALIZE.
00179         **
00180  FA26 CE 04C4        LDX   #MEMST       WHERE TO START CLEARING
00181  FA29 BC 0458        CPX   BPTRTB       MEMORY INITIALIZED OR POWER_U
00182  FA2C 27 21          BEQ              NOT POWERED UP
00183  FA2E DF 24          STX   BSTK         SAVE MEMSTRT FOR DATA FILES
00184  FA30 5F            CLR B
00185  FA31 CE 0458       LDX   #BPTRTB      START CLEARING FROM HERE
00186  FA34 86 FF  BMC    LDA A  #$FF         ALL ONES TO TEST END
00187  FA36 A7 00          STA A  0,X          STORE ONES
00188  FA38 A1 00          CMP A  0,X          MATCH
00189  FA3A 26 08          BNE              NO, END OF MEMORY
00190  FA3C E7 00          STA B  0,X          CLEAR
00191  FA3E 08            INX
00192  FA3F 8C 4000        CPX   #IO          END OF MEMORY
00193  FA42 26 F2         BNE   BMC          LOOP
00194  FA44 35     BEOM   TXS               FORM STACK AT END
```

```
00195  FA45 86 40           LDA A  #64       DECREASE BY 64
00196  FA47 09              DEX              REDUCE X-REG.
00197  FA48 4A              DEC A            LOOP DEC.
00198  FA49 2E FC           BGT    BDX       NOT DONE
00199  FA4B DF 2B           STX    AWS+2     STORE END OF MEMORY
00200  FA4D 20 0B           BRA    BEOM1     CONTINUE INITIALIZATION
00201  FA4F        BSTK     LDX    AWS+2     END OF MEMORY.
00202  FA4F C6 40           LDA B  #64       LOOP CTR.
00203  FA51 BD              JSR    BADDX1    INCREASE FOR STACK PTR.
00204  FA54 35              TXS              TRANSFER TO STACK
00205  *
00206  *
00207  FA57        BEOM1    EQU    *
00208  *
00209           BEOM2
00210  FA57 86 01           LDA A  #1        SET QUIET BIT
00211  FA59 97 60           STA A  LISTEN
00212  FA5B 97 5B           STA A  MPTR      RECEIVE MESSAGE PTR
00213  FA5D 97 59           STA A  MPTR+1
00214  FA5F 97 5A           STA A  CRPTR     WORD 0 INVALID
00215  FA61 97 5E           STA A  CRPTR+1
00216  *
00217  *****
00218  *             INITIALIZE FOR CASSETTE CARD.
00219  *
00220  FA63 86 12           LDA A  #$12      SELECT DATA DIRECTION
00221  FA65 B7 4401         STA A  PIANAC    ON PIA A
00222  FA68 86 1F           LDA A  #$1F      O/P= B(0,4)
00223  FA6A B7 4400         STA A  PIANAD
00224  FA6D 86 1C           LDA A  #$1C      ENABLE INT. FOR 60HZ CLOCK
00225  FA6F B7 4401         STA A  PIANAC
00226  FA72 7F 4403         CLR    PIANAD    RESET A DATA
00227  FA75 7F 4403         CLR    PIANBC    SELECT DATA DIR. ON B
00228  FA78 86 FC           LDA A  #$FC      O/P= B(2,7)
00229  FA7A B7 4402         STA A  PIANBD
00230  FA7D 86 05           LDA A  #5        ENABLE POWER FAILURE INT.
00231  FA7F B7 4403         STA A  PIANBC
00232  FA82 80 E0           LDA A  #$E0      TURN OFF CASSETTE LITES
00233  FA84 B7 4402         STA A  PIANBD
00234  *
00235  *****
00236  *         ENABLE INTERRUPTS
00237  *
00238  FA87 B6 4079         LDA A  NMIST     DEVICE NO.
00239  FA8A 84 7F           AND A  #$7F      MASK D7
00240  FA8C 97 5L           STA A  DEVNO     SAVE STRAPPED DEVICE NO.
00241  FA8E B7 0409         STA A  BMSU+1    SET ERROR MESG.
00242  FA91 B7 0244         STA A  BMRMG+4   STORE DEVICE NO
00243  FA94 48              ASL A
00244  FA95 43              COM A
```

```
00246  FA96 97 5D         STA  A   BIMOKM         STORE CONTROL WORD
00247  FA98 CE 005D       LDX      #BIMOKM        IM OK PTR
00248  FA9B DF 6E         STX      BXWS+4         INTO NEXT
00249  FA9D 86 04         LDA  A   #4             ERROR CONTROL EXTENSION
00250  FA9F B7 024A       STA  A   BMSU+2         INTO MESSAGE.
00251  FAA2 B7 0240       STA  A   BMRMG          MSG. REC. CONTROL WORD
00252  FAA5 B7 0245       STA  A   BMRMG+5        MSG. REC. CONTROL EXT.
00253  FAA8 86 06         LDA  A   #6             CHANNEL0/ON-LINE/WATCH DOG
00254  FAAA B7 0242       STA  A   BMRMG+2        MSG. REC. LENGTH
00255  FAAD B7 04B8       STA  A   BMSU           ALSO CONTROL WORD FOR ERROR M
00256  FAB0 B7 4078       STA  A   NMICON         SET NMI CONTROL
00257  FAB3 97 66         STA  A   NMICWD         SAVE FOR LATER MOD.
00258  FAB5 CE 0005       LDX      #5             RESART LOOP
00259  FAB8 A7 28    BIL  STA  A   BASE,X         SET RESTART FLAG
00260  FABA 08            INX
00261  FABB 8C 0020       CPX      #32            DONE
00262  FABE 26 FB         BNE      BIL            NO
00263  FAC0 B6 4071       LDA  A   ACIARG         READ ONE WORD TO CLEAR
00264  FAC3 B6 4070       LDA  A   ACIAST         ACIA STATUS WORD
00265  FAC6 7F 400E       CLR      INTCON         CLEAR INTERRUPT CONTROL MASK
00266
00267  *    *BASE LOOP
00268  *
00269  FAC9 DE           AL2  LDX      BWS            LOOP CNTR
00270  FACB 08           AL1  INX                     TO NEXT FLAG
00271  FACC A6 28        AL1  LDA  A   BASE,X         GET FLAG
00272  FACE 27 FB             BEQ      AL2            NO HIT?GO TO NEXT FLAG
00273  FAD0 DF 48             CLR      BASE,X         CLEAR FLAG BUT LEAVE IN A
00274  FAD2 DF 48             STX      BWS            SAVE LOOP PTR
00275  FAD4 DF 4A             STX      BWS+2          FORM PTR
00276  FAD6 C6 02             LDA  B   #2             LEFT HALF OF ADDR
00277  FAD8 D7 4A             STA  B   BWS+3          INTO POINTER
00278  FADA 78 004B          ASL       BWS+2          TIMES 2
00279  FADD EE 00             LDX      0,X            GET ROUTINE PTR
00280  FADF EE 00             LDX      0,X            RESET X
00281  FAE1 6E 00             JMP      0,X            TO ROUTINE
00282
00283  *    * RESTART LOOP ROUTINE
00284  *
00285  FAE3 DE           RS   LDX      BWS            GET LOOP PTR
00286  FAE5 A7 28        RS1  STA  A   BASE,X         RESET FLAG
00287  FAE7 CE 0000      RS2  LDX      #$0            TO TOP
00288  FAEA DF 48             STX      BWS            TO LOOP PTR
00289  FAEC 20 DE             BRA      AL1
00290
00291  * "TO DO" TABLE PTRS
00292  *
00293
00294  FAEE FAC9    LTPR FDB      AL             +0 MONITOR REAL TIME CLOCK
00295  FAF0 FE18         FDB      NCLOCK         +1 NMI CLOCK
```

```
          FDB  AL         +2  GLOBAL HANDLER
          FDB  AL         +3  MONITOR HANDLER
          FDB  AL         +4  DIRECT HANDLER
          FDB  JBUG       +5  JBUG ON-LINE ENTRY
          FDB  BXSCH      +6  MESSAGE SCHEDULER
          FDB  RS         +7  SPARE
          FDB  RS         +8  SPARE
          FDB  RS         +9  SPARE
          FDB  RS         +10 SPARE
          FDB  RS         +11 SPARE
          FDB  RS         +12 SPARE
          FDB  RS         +13 SPARE
          FDB  RS         +14 SPARE
          FDB  RS         +15 SPARE
          FDB  RS         +16 SPARE
          FDB  RS         +17 SPARE
          FDB  RS         +18 SPARE
          FDB  RS         +19 SPARE
          FDB  RS         +20 SPARE
          FDB  RS         +21 SPARE
          FDB  RS         +22 SPARE
          FDB  RS         +23 SPARE
          FDB  RS         +24 SPARE
          FDB  RS         +25 SPARE
          FDB  RS         +26 SPARE
          FDB  RS         +27 SPARE
          FDB  RS         +28 SPARE
          FDB  RS         +29 SPARE
          FDB  RS         +30 SPARE
          FDB  RS         +31 RESTART FLAG
*
*** SEND REPEAT REQUEST TO BUS
*
BMSSR     LDX  *BMSU       BUFFER PTR.
          STX  BXWS+6      TO WORKING
          BIT A *$20       ACTIVE MONITOR
          BEQ  BMSSR2      NO,SEND REQ REPEAT.
          LDA B *1         SET NMI COUNTER TO ONE.
          STA B NMICTR     FOR IMMEDIATE REPEAT.
          ORA B MONFLG     SET REPEAT BIT
          STA B MONFLG
BMSSR1    LDA A *$BD       CLEAR REPEAT AND ERROR
          AND A LISTEN     MASK OUT
          STA B LISTEN
          LDA B 0,X
          JMP  BXM         FIRST WORD
BMSSR2    LDA A *4         GO XMIT
          STA A 3,X        SET QUIET REQ. TO
          LDA A *$BF       CONTROL EXTENSION
          BRA  BMSSR1      CLEAR REQ;QUIET BIT.
                           GO MASK LISTEN
```

```
                * COUNTDOWN SECONDARY COUNTER
                ** COUNT IN B  LISTEN IN A
00346           BDSEC
00347  FB52 5A         DEC B                    COUNTDOWN
00348  FB53 D7 62      STA B   NMSEC            RESAVE
00349  FB55 26 50      BNE     *$11             NOT ZERO, CONTINUE
00350  FB57 85 11      BIT A   #$11             REPEAT DIR. OR IMM. RESP.
00351  FB59 27 06      BEQ     BTIR             YES,GO SEND REPEAT IF NECASSA
00352
00353
00354  FB5B 84 EF      AND A   #$EF             CLEAR BYPASS FLAG
00355  FB5D 97 60      STA A   LISTEN
00356  FB5F 20 46      BRA     BQC              RESUME NORMAL COUNTDOWN
00357          *
00358          BTIR
00359  FB61 DE 6C      LDX     BXWS+2           IMM. RESP. BUFFER PTR
00360  FB63 E6 00      LDA B   0,X              FIRST WORD
00361  FB65 96 64      LDA A   NMICTB           TEST IF IMM. RESP.
00362  FB67 81 04      CMP A   #4
00363  FB69 27 70      BEQ     BNTP2            YES, SEND IMM. RESP.
00364  FB6B C5 20      BIT B   #$20             REPEAT BIT SET.
00365  FB6D 26 38      BNE     BQC              YES ALREADY REPEATED.
00366  FB6F CA 20      ORA B   #$20             SET REPEAT BIT
00367  FB71 E7 00      STA B   0,X              SAVE FOR TEST OF DOUBLE REPEA
00368  FB73 DF 70      STX     BXWS+6           WORKING
00369  FB75 7E FC50    JMP     BSDIR+2          GO SET FOR REPEAT CNT.
00370          *
00371          *** NMI INTERRUPT
00372          NMI
00373  FB78 B6 4079    LDA A   NMIST            CLEAR NMI INT. MASK
00374  FB7B B6 4070    LDA A   ACIAST           GET ACIA STATUS REG.
00375  FB7E 2A 03      BPL     NMIA             QUIET INTERRUPT
00376  FB80 7E FC63    JMP     BNGSDT           DATA INTERRUPT
00377          NMIA
00378  FB83 96 5C      LDA A   RWDCNT           READ WORD COUNT
00379  FB85 27 0F      BEQ     BNRE             ZERO, NO FALSE START
00380  FB87 5F         CLR B
00381  FB88 D7 5C      STA B   RWDCNT           CLEAR COUNT
00382  FB8A D7 65      STA B   PARITY           AND PARITY
00383  FB8C 80 01      SUB A   #1               FALSE START IF = ONE
00384  FB8E 27 06      BEQ     BNRE             YES, OK TO GO AHEAD
00385  FB90 96 59      LDA A   NPTR+1           ERROR, RESET MSG. PTR.
00386  FB92 97 5B      STA A   CRPTR+1
00387  FB94 86 02      LDA A   #2               SET ERROR BIT
00388          BNRE
00389  FB96 9A 60      ORA A   LISTEN           ERROR WORD
00390  FB98 8A 08      ORA A   #*8              SET QUIET INT. FLAG
00391  FB9A 97 60      STA A   NMISEC           SECONDARY COUNTER SET
00392  FB9C 26 04      BNE     BDSEC            YES
00393  FB9E 84 EF      AND A   #$EF             CLEAR BYPASS FLAG
00394  FBA0 97 60      STA A   LISTEN           SAVE
00395          *
00396  FBA2 7A 0061    DEC     NMICIR           COUNTDOWN TO SEND
00397  FBA5 27 1B      BEQ     BTQ              TEST QUIET
```

```
*
**    TEST IF LOOP SWITCH SET
*
00395                                  
00396                                  
00397                                  
00398  FBA7  7F 400E  BGC               
00399  FBAA  96 73         CLR   INTCON       ALLOW INTERRUPTS
00400  FBAC  85 40         LDA A MONFLG       TEST LOOP SWITCH BIT SET
00401  FBAE  27 0B         BIT A #$40
00402  FBB0  88 40         BEQ   BQC1
00403  FBB2  97 73         EOR A #$40         NOT SET
00404  FBB4  96 00         STA A MONFLG       CLEAR BIT
00405  FBB6  88 01         LDA A NMICWD       RESAVE
00406  FBB8  97 66         EOR A #1           CONTROL WORD
00407  FBBA  B7 4078       STA A NMICWD       SET FOR OTHER LOOP
00408                      STA A NMICON       RESAVE
00409                                         SWITCH LOOPS
00410  FBBD  86 08   BQC1  LDA A #8           HAVE NINE BIT TIMES UNDER INT
00411  FBBF  16            TAB                8 IN B FOR QUIET BIT
00412  FBC0  20 5C         BRA   BCLOCK       GO TO CLOCK
00413  FBC2  44      B10   LSR A              QUIET BIT TO CARRY
00414  FBC3  25 L2         BCS   BQC          YES,SET DON'T XMIT
00415  FBC5  44            LSR A              ERROR BIT TO CARRY
00416  FBC6  24 07         BCC   BSEND        ZERO, XMIT
00417  FBC8  85 10         BIT A #$10         REPEAT OR REQ. REPEAT
00418  FBCA  27 0B         BEQ   BQC          NO, DON'T SEND REPEAT REQ.
00419  FBCC  7E FL2E       JMP   BMSSK        YES, SEND REPEAT REQ.
00420                                         
00421  *
00422  **    TIME TO SEND
00423  *                   BSEND
00424  FBCF  96 69         LDA A BADDR        CURRENT SENDING ADDRESS
00425  FBD1  91 5E         CMP A DEVNO        COMPARE TO STRAPPED ADDRESS
00426  FBD3  26 6C         BNE   BPSEUD       SEND PSEUDO ADDRESS
00427  FBD5  96 73         LDA A MONFLG
00428  FBD7  44 12         LSR A              REPEAT FLAG SET
00429  FBD9  24 12         BCC   BNTP         NO, NEXT INTO PREVIOUS
00430  FBDA  48            ASL A              CLEAR REPEAT FLAG
00431  FBDB  97 73         STA A MONFLG       STORE
00432  FBDD  DE 6A         LDX   BXWS         PREVIOUS INTO WORKING
00433  FBDF  8C 005D       CPX   *BIMOKM      WAS PREV. AN I'M OK
00434  FBE2  27 08         BEQ   BNTP         YES, SEND NEXT
00435  FBE4  A6 00         LDA A 0,X          FIRST WORD
00436  FBE6  CA 70         ORA B #$20         SET REPEAT BIT
00437  FBE8  DF 70         STX   BXM          
00438  FBEA  20 0C         BRA   BXWS+6       GO XMIT
00439  FBEC  DE 6L   BNTP  LDX   BXWS+4       NEXT
00440  FBEE  DF 70         STX   BXM          TO WORKING
00441  FBF0  E6 00   BNTP1 LDA B 0,X          TEST IF DIRECT
00442  FBF2  C5 03         BIT B #3           DO-DI=0
00443  FBF4  27 5B         BEQ   BSDIR        YES, DIRECT
00444  FBF6  DF 6A         STX   BXWS         WORKING TO PREVIOUS
00445                                         
00446                                         
*
**    XMIT FIRST WORD
*
```

```
                              BXM     LDA A  *$3D       SET ACIA TO XMIT
00447  FBF8 86 3D                     STA A  ACIAST     INTO TRANSFER DATA REG.
00448  FBFA B7 4070                   STA B  ACIARG
00449  FBFD F7 4071                   LDA A  2,X        GET MSG.LENGTH
00450  FC00 A6 02                     LSR B             TEST FOR I'M OK
00451  FC02 54                        BCC    BXPC       IF NOT,STORE FOR PARITY
00452  FC03 24 05                     LDA A  #1         MSG. LENGTH IS 2
00453  FC05 86 01                     LDA B  DEVNO      ELSE STORE DEVNO INTO PARITY
00454  FC07 D6 5E            BXPC     COM B
00455  FC09 53                        STA B  PARITY     STORE MSG. LENGTH
00456  FC0A D7 65                     STA A  BXWS+8     SENDING ADDRESS
00457  FC0C 97 72                     LDA A  BADDR      TO BUFFER AND MSG.
00458  FC0E 96 69                     STA A  1,X        RESET NEXT FOR
00459  FC10 A7 01                     LDX    #BIMOKM    ANOTHER MSG.
00460  FC12 CE 005D                   STX    BXWS+4
00461  FC15 DF 6E
00462                         *
00463  FC17 7F 40DE          *        CLR    INTCON     ALLOW INTERRUPTS
00464
00465  FC1A 86 0E                     LDA A  #14        TIME ADJUSTMENT FOR XMISSION
00466  FC1C C6 08                     LDA B  #8         SET QUIET BIT
00467
00468                        ** TIME CLOCK FROM BIT TIME COUNTS
00469                         *
00470  FC1E 0A 60            BCLOCK   ORA B  LISTEN     SET BIT FOR CHANGE IN COUNT
00471  FC20 D7 60                     STA B  LISTEN
00472  FC22 9B 56                     ADD A  CLCK       ADD IN PREVIOUS COUNT
00473  FC24 97 56                     STA A  CLCK       SAVE COUNT
00474  FC26 2A 18                     BPL    BEXIT      PLUS, NOT 12.5 MS.
00475  FC28 84 7F                     AND A  #$7F       MASK POS.
00476  FC2A 97 56                     STA A  CLCK       YES, SAVE OVERFLOW
00477  FC2C 7A 0057                   DEC    CLCK+1     100 MILLISECOND CLCK
00478  FC2F 96 68                     LDA A  NMICWD     XMIT CONTROL WORD
00479  FC31 B7 4078                   STA A  NMICON     BUMP BUMP TIMER
00480  FC34 7C 0029                   INC    BASE+1     SET TO DO FLAG
00481  FC37 96 75                     LDA A  TFLAG      IRQ REQ.
00482  FC39 27 05                     BEQ    *+7        NO
00483  FC3B 86 3D                     LDA A  #$3D       YES , SET IRQ
00484  FC3D B7 40E8                   STA A  TIRQ
00485  FC40 3B               BEXIT    RTI
00486
00487                        ** LOGIC TO SEND ON PSEUDO ADDRESS
00488                         *
00489  FC41 DE 6E            BPSEUD   LDX    BXWS+4     NEXT MESSAGE PTR.
00490  FC43 DF 70                     STX    BXWS+6     NEXT TO WORKING
00491  FC45 E6 00                     LDA B  0,X        FIRST WORD
00492  FC47 C5 03                     BIT B  #3         MASK FOR DIRECT
00493  FC49 27 01                     BEQ    BSDIR1     DIRECT, GO XMIT
00494  FC4B 7E FBA7                   JMP    BGC        NOT A DIRECT, GO TO CLOCK
```

```
                *
                *  *   LOGIC TO HANDLE DIRECT MESSAGES
                *
00495
00496
00497
00498           BSDIR   STX     BXWS+2          MESG. PTR TO TR/DIR SAVE SLOT
00499   FC4E DF 6C      CLR     A
00500   FC50 4F         STA     A       BXWS            SET LAST GLOBAL TO I'M OK
00501   FC51 97 6A      LDA     A       *BIMOKM         SINCE THIS IS A DIRECT.
00502   FC53 86 5D      STA     A       BXWS+1
00503   FC55 97 6B      BSDIR1  LDA     A       #6              NO. SIX CNTS TO NMI SEC. COUN
00504   FC57 86 06      STA     A       NMISEC          FOR REPEAT
00505   FC59 97 62      STA     A       NMICTB          CLEAR IMM. RESP. COUNT.
00506   FC5B 97 64      LDA     A       DEVNO           STORE REAL ADDRESS INTO
00507   FC5D 96 5L      STA     A       4,X             DIRECT MESSAGE
00508   FC5F A7 04      BRA     BXM             GO SET UP TO XMIT
00509   FC61 20 95
00510
00511           *
00512           *  *   NGSTI DATA INTERRUPT
00513           *
00514   FC63 44         BNGSDT  LSR     A               RECEIVE BIT TO C BIT
00515   FC64 25 5F      BCS     BNGSR           GO TO RECEIVE
00516   FC66 7A 0072    DEC     BXWS+8          A SEND INT. REDUCE SEND WORD
00517   FC69 27 19      BEQ     BSPAK           SEND PARITY BYTE
00518   FC6B DE 70      LDX     BXWS+6          SEND BUFFER TO X
00519   FC6D 08         INX                     BUMP INDEX TO NEXT WORD
00520   FC6E A6 00      LDA     A       0,X             NEXT BYTE TO A
00521   FC70 B7 4071    STA     A       ACIARG          XMIT THIS BYTE
00522   FC73 7F 40DE    CLR     INTCON          ALLOW INTERRUPTS
00523   FC76 DF 70      STX     BXWS+6          SAVE SEND BUFFER POINTER
00524   FC78 9B 65      ADD     A       PARITY          FORM PARITY
00525   FC7A 44         LSR     A
00526   FC7B 24 02      BCC     BNKARY          NO CARRY
00527   FC7D 8B 80      ADD     A       *$80            COMPLETE ROTATE
00528   FC7F 97 65      BNKARY  STA     A       PARITY          SAVE
00529   FC81 7E FD1A    JMP     BSCLCK          EXIT
00530
00531   FC84 96 65      BSPAK   LDA     A       PARITY          COMPLEMENT BEFORE XMISSION
00532   FC86 43         COM     A
00533   FC87 B7 4071    STA     A       ACIARG          XMIT
00534   FC8A 86 9D      LDA     A       *$9D            SET RECEIVE
00535   FC8C B7 4070    STA     A       ACIAST
00536   FC8F 4F         CLR     A
00537   FC90 B7 40DE    STA     A       INTCON          ALLOW INTERRUPTS
00538   FC93 B7 40DE    STA     A       INTCON          ALLOW INTERRUPTS
00539   FC96 97 65      STA     A       PARITY          CLEAR FOR NEXT RECEIVE.
00540
00541           *
00542           *  *   TEST IF BUS SWITCH PREPPED
00543   FC98 96 73      LDA     A       MONFLG          FLAG WORD
```

```
00544  FC9A 85 20           BIT  A  #$20            PREP FLAG
00545  FC9C 27 7C           BEQ     BSCLCK          NOT SET
00546  FC9E 6A              LDX     BXWS            LAST GLOBAL
00547  FCA0 E6 00            LDA  B  0,X            CONTROL WORD
00548  FCA2 C4 07           AND  B  #7              MASK
00549  FCA4 C1 06           CMP  B  #6              MONITOR DIRECTIVE
00550  FCA6 26 72           BNE     BSCLCK          NO, GET OUT
00551  FCA8 E6 03           LDA  B  3,X             CONTROL EXTENSION
00552  FCAA C1 01           CMP  B  #1              IS IT BUS SWITCH
00553  FCAC 26 6C           BNE     BSCLCK          NO
00554  FCAE 88 60           EOR  A  #$60            SET BUS SWITCH AND CLEAR
00555  FCB0 97 73           STA  A  MONFLG          BUS SWITCH PREP FLAG
00556  FCB2 20 66           BRA     BSCLCK          CLOCK AND EXIT
00557       * HARDWARE ERROR RECEIVED              SET HARDWARE ERROR, BYPASS
00558  FCB4 86 12    BHDWE  LDA  A  #$12            MASK IN
00559  FCB6 9A 60           ORA  A  LISTEN          SAVE
00560  FCB8 97 60           STA  A  LISTEN
00561  FCBA 96 59           LDA  A  MPTR+1          RESET CURRENT PTR.
00562  FCBC 97 5B           STA  A  CRPTR+1         TO BEGINNING
00563  FCBE 20 5A           BRA     BSCLCK          GO UPDATE TIME OUT COUNTER
00564       *
00565  FCC0 7F 0062  BYPASS CLR     NMISEC          CLEAR SECONDARY COUNTER
00566  FCC3 20 55           BRA     BSCLCK          UPDATE CLOCK
00567       *
00568       ** RECEIVE ROUTINE
00569  FCC5 F6 4071  BNGSR  LDA  B  ACIARG          GET BYTE TO CLEAR REC DATA RE
00570  FCC8 7E 40DE         CLR     INICON          ALLOW INTERRUPTS
00571  FCCB 84 38           AND  A  #$38            TEST HARDWARE ERROR
00572  FCCD 26 E5           BNE     BHDWE           HARDWARE ERROR
00573  FCCF 96 60           LDA  A  LISTEN          FLAGS
00574  FCD1 85 10           BIT  A  #$10            IF SET BYPASS RECEIVE
00575  FCD3 26 EB           BNE     BYPASS          FORGET BYTE
00576  FCD5 DE 5A           LDX     CRPTR           CURRENT RECEIVE PTR
00577  FCD7 96 5C           LDA  A  RWDCNT          RECEIVE WORD CNT
00578  FCD9 4C              INC  A
00579  FCDA 97 5C           STA  A  RWDCNT          SAVE
00580  FCDC 7C 005B  BRIP   INC     CRPTR+1         BUMP MESSAGE PTR.
00581  FCDF 27 FB           BEQ     BRIP            CAN'T USE WORD 0
00582  FCE1 E7 00           STA  B  0,X             STOKE INTO BUFFER
00583  FCE3 DB 65           ADD  B  PARITY          ADD PREVIOUS PARITY WORD
00584  FCE5 54              LSR  B                  SHIFT RIGHT
00585  FCE6 24 02           BCC     BNCARY          SKIP IF CARRY
00586  FCE8 CB 80           ADD  B  #$80            ADD CARRY TO LEFT BIT
00587  FCEA D7 65   BNCARY  STA  B  PARITY          SAVE PARITY
00588  FCEC 5C              INC  B                  TEST IF LAST
00589  FCED 26 04           BNE     BNTLST          NOT LAST
00590       *
00591       ** TEST EXPECTED MESSAGE LENGTH
00592  FCEF 91 67           CMP  A  BMSGLW          MESSAGE LENGTH EXPECTED
00593  FCF1 27 65           BEQ     BME             END OF MESSAGE
```

```
           *     -RECEIVED BUT NOT LAST BYTE
           **
           ***
00594
00595  FCF3 E6 00      BNTLST  LDA B  0,X         WORD RECEIVED.
00596  FCF5 81 01              CMP A  #1          IS IT FIRST WORD
00597  FCF7 26 28              BNE    BMFL        NO
00598  FCF9 54                 COM B              DEVICE NO.
00599  FCFA 54                 LSR B
00600  FCFB 25 1D              BCS    BSCLCK      IM OK
00601  FCFD 4C                 INC A              NO, EXIT
00602  FCFE 97 67              STA A  BMSGLW      SET EXPECTED MESSAGE LENGTH.
00603  FD00 96 5E              LDA A  DEVNO       CALC XMIT TURN.
00604  FD02 97 68              STA A  BADDRA      XMIT ADDR. HOLD
00605  FD04 10         BCNCTR  SBA
00606  FD05 48                 ASL A              NMI COUNTDOWN CTR.
00607  FD06 97 63              STA A  NMICTA      SAVE FOR END OF MSG.
00608  FD08 96 5E              LDA A  DEVNO+1     PSEUDO NO.
00609  FD0A 27 0E              BEQ    BSCLCK      NONE, QUIT
00610  FD0C 10                 SBA
00611  FD0D 28                 BMI    BSCLCK      AFTER, QUIT
00612  FD0E 48                 ASL A              USE PSEUDO OR REAL
00613  FD0F 91 63              CMP A  NMICTA      REAL.
00614  FD11 22 00              BHI    BSCLCK      PSEUDO COUNTDOWN.
00615  FD13 97 63              STA A  NMICTA
00616  FD15 96 5E              LDA A  DEVNO+1
00617  FD17 97 68              STA A  BADDRA      SET FOR PSEUDO O/P
00618  FD19 86 0B              LDA A  #11         11 BIT TIMES TO CLOCK
00619  FD1B 97 04              STA A  BCLOCK      RECIVE BIT
00620  FD1D 7E FC1E             JMP   BCLOCK      GO TO CLOCK
00621  FD20 81 02      BMFL    CMP A  #2          SECOND WORD
00622  FD22 26 05              BNE    BMFL1       NO TEST THIRD
00623  FD24 F7 0243            STA B  BMRMG+3     SET IF DIRECT
00624  FD27 20 0E              BRA    BCNCTR      GO CALC NMICTR
00625  FD29 81 03      BMFL1   CMP A  #3          THIRD WORD
00626  FD2B 26 05              BNE    BMDB        NO TEST FOURTH
00627  FD2D 7C 05              INC    BMDB        BUMP TO INCLUDE PARITY WORD.
00628  FD2F 97 67              STA A  BMSGLW      EXPECTED MESSAGE LENGTH
00629  FD31 20 E7              BRA    BSCLCK
00630  FD33 81 04      BMDB    CMP A  #4          FOURTH WORD
00631  FD35 26 E3              BNE    BSCLCK      NO, EXIT
00632  FD37 DE 5B              LDX    MPTR        FIRST WORD PIR.
00633  FD39 A6 00              LDA A  0,X         FIRST WORD
00634  FD3B 85 03              BIT A  #3          TEST IF DIRECT
00635  FD3D 26 DB              BNE    BSCLCK      NO, EXIT IF DIRECT
00636  FD3F 96 5E              LDA A  DEVNO       CURRENT DEVNO
00637  FD41 10                 SBA                MATCH
00638  FD42 27 OB              BEQ    BDMCH
00639  FD44 96 5F              LDA A  DEVNO+1     PSEUDO MATCH
00640  FD46 10                 SBA
00641  FD47 27 06              BEQ    BDMCH       YES.
```

```
00644 FD49 86 06          LDA A  #6         SET UP SECONDARY CTR.
00645 FD4B 97 64          STA A  NMICTB
00646 FD4D 20 CB          BRA    BSCLCK     SECONDARY SET UP
00647 FD4F 86 04          LDA A  #4
00648 FD51 97 64          STA A  NMICTB     SENDER OF MSG RECEIVED
00649 FD53 F7 0241        STA B  BMKMG+1
00650 FD56 20 C2          BRA    BSCLCK     EXIT
00651 *
00652 ** END OF MESSAGE RECEIVED
00653 *
00654 FD58 D7 5C   BNE    STA B  RWDCNT     CLEAR AFTER GOOD REC.
00655 FD5A D7 65          STA B  PARITY
00656 *
00657 *** TEST MESSAGE TYPE AT END OF RECEIVED MESSAGE
00658 *
00659 FD5C DE 58          LDX    MPTR       START OF MESSAGE
00660 FD5E A6 00          LDA A  0,X        FIRST WORD
00661 FD60 44             LSR A             BIT 0 TO CARRY
00662 FD61 25 16          BCS    BIMOK      I'M OK MSG
00663 FD63 44             LSR A             BIT 1 TO CARRY
00664 FD64 24 6F          BCC    BDIRM      DIRECT MESSAGE
00665 FD66 44             LSR A
00666 FD67 24 31          BCC    BCOS       CHANGE OF STATE MESSAGE
00667 *
00668 *** DEFAULT TO MONITOR DIRECTIVE MESSAGE
00669 *
00670 *
00671 FD69 E6 03          LDA B  3,X        GET CONTROL WORD
00672 FD6B C1 04          CMP B  #4         ONE OR 2
00673 FD6D 2D 14          BLT    BSWIT      SWITCH BUSSES
00674 FD6F 26 29          BNL    BCOS       SET GLOBAL FLAG
00675 *
00676 *** GO QUIET AND WAIT FOR MONITOR REPEAT.
00677 *
00678 FD71 96 60          LDA A  LISTEN     QUIET FLAG WORD.
00679 FD73 8A 02          ORA A  #2         SET ERROR BIT
00680 FD75 97 60          STA A  LISTEN     SAVE
00681 FD77 20 21          BRA    BCOS
00682 *
00683 *** I'M OK MESSAGE
00684 *
00685 FD79 96 59   BIMOK  LDA A  MPTR+1     MESSAGE POINTER.
00686 FD7B D6 73          LDA B  MONFLG     MONITOR DEVICE
00687 FD7D 2B 27          BMI    BMONT1     YES, SET FLAG
00688 FD7F 97 5B          STA A  CRPTR+1    BY OVERLAYING NEW WITH OLD
00689 FD81 20 29          BRA    BMONST     CALC NEW NMICTR
00690 *
00691 *** SWITCH LOOPS OR REPEAT OR BOTH
00692 *
00693 FD83 54      BSWIT  LSR B             TEST IF SWIT
```

```
006v4  FD84  24 0A              BCC    BSRPT       NO, REPEAT
006v5  FD86  86 01              LDA A  #1          SWITCH LOOPS
006v6  FD88  9B 66              ORA A  NMICWD      CONTROL WORD
006v7  FDBA  97 66              STA A  NMICWD
006v8  FDBC  C5 01              BIT B  #1
006v9  FDBE  27 0A        BSRPT BEQ    BCUS        REPEAT ALSO
00700  FD90  DA 73              ORA B  MONFLG      NO
00702  FD92  D7 73              STA B  MONFLG      SET RPT. BIT.
00702  FD94  96 80              LDA A  LISTEN
00703  FD96  84 FD              AND A  #$FD
00704  FD98  97 80              STA A  LISTEN      MASK OUT ERROR BIT
00705
00706  *  CHANGE OF STATE OR MONITOR DIRECTIVE
00707
00708  FD9A  96 59        BCUS  LDA A  MPTR+1      CURRENT MSG START
00709  FD9C  D6 2A              LDA B  BASE+2      GLOBAL TO DO FLAG
00710  FD9E  26 2A              BNE    BMONT       ALREADY SET
00711  FDA0  97 2A              STA A  BASE+2      SET GLOBAL TO DO FLAG
00712  FDA2  D6 73        BMONT LDA B  MONFLG      MONITOR FLAG
00713  FDA4  2A 06              BPL    BMONT1      NOT A MONITOR
00714  FDA6  D6 2B              LDA B  BASE+3      MONITOR FLAG
00715  FDA8  26 02              BNE    BMONST      FLAG SET
00716  FDAA  97 2B              STA A  BASE+3      SET MONITOR FLAG
00717
00718  *  CALCULATE NMI COUNTER
00719
00720  FDAC  96 63        BMONST LDA A  NMICTA      NMICTR FROM HOLD
00721  FDAE  97 61              STA A  NMICTR
00722  FDB0  96 68              LDA A  BAUDRA      ADDRESS FORM HOLD
00723  FDB2  97 69              STA A  BADDR
00724
00725  *  SEND MONITOR QUIET IF GOOD REC. AFTER ERROR.
00726  FDB4  96 60              LDA A  LISTEN      TEST ERROR CONDITION
00727  FDB6  85 02              BIT A  #2
00728  FDB8  27 0C              BEQ    BUPTR       NO ERROR
00729  FDBA  DE 58              LDX    MPTR        BUFFER PTR.
00730  FDBC  D6 5E              LDA B  DEVNO       THIS DEVICE NO.
00731  FDBE  E1 01              CMP B  1,X         REC. = ADDR.
00732  FDC0  23 04              BLS    BUPTR       ADDR. REC NOT LOWER
00733  FDC2  8A 40              ORA A  #$40        SET SEND QUIET MSG. BIT
00734  FDC4  97 60              STA A  LISTEN
00735  FDC6  96 FA        BUPTR LDA A  CRPTR+1     CURRENT PTR
00736  FDC8  81 FA              CMP A  #$FA        DONT START A REC. AFTER HERE
00737  FDCA  23 04              BLS    BUPTRA      LESS THAN OR SAME IS OK
00738  FDCC  86 01              LDA A  #1          GO BACK TO START
00739  FDCE  97 5B              STA A  CRPTR+1     INTO CURRENT
00740  FDD0  97 59        BUPTRA STA A  MPTR+1      UPDATE MESSAGE PTR TO NEXT RE
00741  FDD2  7E FD1A            JMP    BSCLCK
00742
00743  *  RECEIVE DIRECT MSG
00744
```

```
                BLIRM   LDA  A   NMICTB          SECONDARY HOLD
                        CMP  A   #4              MATCH
00745  FDD5 96 64        BEQ      BDMTCH          YES
00746  FDD7 81 04        STA  A   NMISEC          INTO SECONDARY
00747  FDD9 27 0B        LDA  A   #$10            SET BYPASS FLAG
00748  FDDB 97 62        ORA  A   LISTEN          MASK IN
00749  FDDD 86 10        STA  A   LISTEN          SAVE
00750  FDDF 9A 00        JMP      BIMOK           GO CHECK IF MONITOR
00751  FDE1 97 60 BDMTCH LDA  B   NMISEC          SECONDARY CTR. NON-ZERO
00752  FDE3 7E FD79      BEQ      BDSW            GO SET WAIT MSG
00753  FDE6 D6 82        CLR  A                   HANDSHAKE COMING BACK.
00754  FDE8 27 0D        STA  A   NMISEC          CLEAR SECONDARY CTR.
00755  FDEA 4F           LDA  A   MPTR+1          MSG PTR
00756  FDEB 97 62        LDA  B   BASE+4          DIRECT REC.
00757  FDED 96 59        LDA  B                   DIRECT SET
00758  FDEF D6 20        BNE      BDRS            SET TO DO FLAG
00759  FDF1 26 02        STA  A   BASE+4          UPDATE POINTER
00760  FDF3 97 20        BRA      BUPTR
00761  FDF5 20 CF BDRS
*
* SET UP MESSAGE RECEIVED.
*
00762  FDF7 CE 0240 BDSW LDX      #BMRMG          RECEIVED ANS. MESSAGE PTR
00764  FDFA 97 62        STA  A   NMISEC          SET SECONDARY
00765  FDFC DF 6C        LDX      EXWS+2          SET SEND I.R. BUFFER
00766  FDFE DF 79        STX      MPTR            POINTER TO X FOR JBUG
00767  FE00 A6 05        LDA  A   JDIR            SET JBUG FOR DOWNLINE LOAD
00768  FE02 44           LSR  A   5,X             CONTROL EXTENSION
00769  FE03 27 05        BEQ      DSTX            START OR STOP XMITTING
00770  FE05 44           LSR  A
00771  FE06 26 01        BNE      DCHKA
00772  FE08 86 01 DSTX   LDA  A   #1              BIT 1 FOR SHUT UP.
00773  FE0A 97 60 DCHKA  STA  A   LISTEN          SET CONTROL WORD.
00774  FE0C 96 59        LDA  A   MPTR+1          MSG PTR
00775  FE0E D6 2C        LDA  B   BASE+4          SET DIRECT RECEIVED FLAG
00776  FE10 26 02        BNE      BDFS
00777  FE12 97 20        STA  A   BASE+4          SET DIRECT REC. TO DO FLAG
00778  FE14 20 8A BDFS   BRA      BMONT           GO CHECK IF MONITOR
*
* ROUTINE TO SCHEDULE TIMED APPLICATION PROGRAMS
*
00783  FE16 5F   NCLOCK  CLR  B                   NMI DRIVEN CLOCK
00784  FE17 7F 400F      CLR  B   SYSWD           CLEAR SYSTEM WATCHDOG
00785  FE1C D7 4B        STA  B   BWS+4           INITIALIZATION
00786  FE1E D7 4E        STA  B   BWS+5
00787  FE20 D7 52        STA  B   BWS+6
00788  FE22 97 76        STA  A   BWS+10          SAVE 10 MS. COUNTER
00789  FE24 96 76        ADD  A   BCLOK           TEN TEN MILLISECOND CTR.
00790  FE26 97 78        STA  A   BCLOK           SAVE
00791  FE28 80 50        SUB  A   #80             ONE SECOND
```

```
00795  FE2A  25 25              BCS    BSCLKL         NO
00796  FE2C  97 76              STA  A BCLOK          YES SET SECOND FLAG
00797  FE2E  7C 004C             INC    BWS+4         SET SWITCH BUS BIT.
00798  FE31  D6 73              LDA  B MONFLG         CHECK XMIT BITS
00799  FE33  84 60              AND  A #$60
00800  FE35  81 60              CMP  A #$60           BOTH TRANSITIONS SET
00801  FE37  27 04              BEQ    BNCEX1         YES
00802  FE39  CA 40              ORA  B #$40           SET BUS SWITCH.
00803  FE3B  D7 73              STA  B MONFLG         RESAVE
00804  FE3D  7F 004D            CLR    LISTEN         CLEAR XMITS BITS
00805  FE40  60                 
00806  FE41  97 77       BNCEX1 STA  A BCLOK+1
00807  FE43  7C 004D            INC    LISTEN         SECONDS CTR
00808  FE45  60                                       BUMP
00809  FE46  77                 
00810  FE47  7C              STA  A BCLOK+1
00811  FE48  80 3C              SUB  A #$60           MINUTE
00812  FE4A  25 05              BCS    BSCLKL         NO; START CLOCK FLAG TEST
00813  FE4C  7C 004D            INC    BWS+5          SET MINUTE FLAG
00814  FE4F  77                 STA    BCLOK+1
00815  FE51  CE 0437     BSCLKL LDX    #BNCT-1        GET CLOCK TABLE PTR.
00816  FE54  08          BCLCKL INX                   TO NEXT WORD
00817  FE55  8C 0448            CPX    #BNCT+16       DONE
00818  FE58  27 3A              BEQ    BCLKL1         YES
00819  FE5A  A6 00              LDA  A 0,X            CONTROL WORD ACTIVE
00820  FE5C  27 F6              BEQ    BCLCKL         NO; GET NEXT
00821  FE5E  44                 LSR  A                TEST IF MILLISECD FLAG
00822  FE5F  25 08              BCS    BCMSC          SECOND FLAG
00823  FE61  44                 LSR  A                YES
00824  FE62  25 11              BCS    BCSSC          DEC. MINUTE FLAG
00825  FE64  90 45              SUB  A BWS+5          TIME TO SET FLAG
00826  FE66  27 12              BEQ    BCSTDF         RESET TABLE WORD
00827  FE68  49                 ROL  A                RESET LAST BIT
00828  FE69  A7 00              STA  A 0,X            RESTORE INTO TABLE
00829  FE6B  20 E6              BRA    BCLCKL         LOOP
00830  
00831  FE6D  90 52       BCMSC  SUB  A BWS+10         MILLISECOND COUNT
00832  FE6F  08                 BLS                   SET FLAG
00833  FE70  23 00              BRA    BCSTDF         RESET TABLE WORD
00834  FE72  90 4C       BCSSC  SUB  A BWS+4          SECOND COUNT
00835  FE74  0D                 SEC                   SET C-BIT
00836  FE75  26 00              BNE    BCSTDF         NOT TIME , RESET TABLE WORD
00837  FE77  6F 00       BCSTDF CLR    0,X            CLEAR CNTR.
00838  FE79  C6 1F              LDA  B #$1F           FLAG
00839  FE7B  C4              AND  B #$1F              ISOLATE FLAG
00840  FE7C  D7 4F              STA  B BWS+7          SET UP PTR.
00841  FE7E  DF 50              STX    BWS+8
00842  FE80  CE 10              LDA  B 16,X
00843  FE82  DE 4E              LDX    BWS+6          GET TYPE FOR FLAG STORE
00844  FE84               LDX                          GET PTR
```

```
00845  FE88 C4 E0           AND B  #$E0        ISOLATE TYPE TO SET FLAG
00846  FE8A 26 02           BNE    BCSTD1      STORE VALUE
00847  FE8C 16              TAB
00848  FE8D 5A              DEC B
00849  FE8E E7 28    BCSTD1 STA B  BASE,X      SET A TO FF
00850  FE90 DE 50           LDX    UWS+8       SET FLAG
00851  FE92 20 C0           BRA    BCLCKL      RELOAD X-REG.
00852                                          LOOP
00853  FE94 7E BCLKL1 JMP   JXC4              BACK TO 'TO DO'
00854  FE97 FF       FCB    $FF,$FF,$FF,$FF,$FF,$FF,$FF,$FF,$FF,$FF,$FF,$F
       FE98 FF
       FE99 FF
       FE9A FF
       FE9B FF
       FE9C FF
       FE9D FF
       FE9E FF
       FE9F FF
       FEA0 FF
       FEA1 FF
       FEA2 FF
00855  FEA3 FF       FCB    $FF,$FF,$FF
       FEA4 FF
       FEA5 FF
00856  FEA6 FF       FCB    $FF,$FF,$FF,$FF,$FF,$FF,$FF,$FF,$FF,$FF,$FF,$F
       FEA7 FF
       FEA8 FF
       FEA9 FF
       FEAA FF
       FEAB FF
       FEAC FF
       FEAD FF
       FEAE FF
00857  FEAF FF       FCB    $FF,$FF,$FF,$FF,$FF,$FF,$FF,$FF,$FF,$FF,$FF,$F
       FEB0 FF
       FEB1 FF
       FEB2 FF
       FEB3 FF
       FEB4 FF
       FEB5 FF
       FEB6 FF
       FEB7 FF
00858  FEB8 FF       FCB    $FF,$FF,$FF,$FF,$FF,$FF,$FF,$FF,$FF,$FF,$FF,$F
       FEB9 FF
       FEBA FF
       FEBB FF
       FEBC FF
       FEBD FF
       FEBE FF
       FEBF FF
```

```
00859  FEC0 FF            FCB    $FF,$FF,$FF,$FF,$FF,$FF,$FF,$FF,$FF,$FF,$FF,$FF
       FEC1 FF
       FEC2 FF
       FEC3 FF
       FEC4 FF
       FEC5 FF
       FEC6 FF
       FEC7 FF
       FEC8 FF
       FEC9 FF
       FECA FF
       FECB FF

00860  FECC               *
00861                     ORG    $FECC
00862                     *
00863                     *** SET ACTIVITY FLAG AFTER XMIT OF MSG.
00864                     *
00865  FECC 84 1F  BSBF   AND A  #$1F           MASK FLAG
00866  FECE 27 09         BEQ    BSBFX          NONE SET, EXIT.
00867  FED0 97 51         STA A  BWS+9          BUILD X PTR.
00868  FED2 7F 0050       CLR    BWS+8
00869  FED5 DE 50         LDX    BWS+8          PTR. TO X
00870  FED7 6C 28         INC    BASE,X         SET ACTIVITY FLAG
00871  FED9 39     BSBFX  RTS                   RETURN
00872                     *
00873                     ****** ADD VALUE IN REG. A TO REG. X --
00874                     *      IF ENTRY TO BADDX1 ADD VALUE IN B.
00875                     *
00876  FEDA 16     BADDX  TAB                   DO NOT DESTROY A REG
00877  FEDB DF 4C  BADDX1 STX    BWS+4          SAVE X-REG.
00878  FEDD 37           PSH B                  SAVE B-REG.
00879  FEDE DB 4D         ADD B  BWS+5
00880  FEE0 24 03         BCC    BADDXA         OVERFLOW
00881  FEE2 7C 004C       INC    BWS+4          YES, INC MSB
00882  FEE5 D7 4D  BADDXA STA B  BWS+5          STORE LSB
00883  FEE7 DE 4C         LDX    BWS+4
00884  FEE9 33            PUL B                 RESTORE B-REG.
00885  FEEA 39            RTS
00886                     *
00887                     **** EXIT TO TO DO BUT SET NEXT ENTRY
00888                     *    A-REG.=TO DO FLAG TO CHECK NEXT
00889  FEEB 84 1F  JXC1   AND A  #$1F           MASK FOR LARGEST VALUE
```

```
00897  FEED 97 49              STA A  BWS+1       SET NEXT PTR.
00898  FEEF 20 10              BRA    JXC4        EXIT TO DO
00899
00900  *     SET TO DO FLAG FOR REENTRY
00901  *
00902  FEF1 DE 48       JXC3B  LDX    BWS         BASE FLAG PTR.
00903  FEF3 86 01              LDA A  *1
00904  FEF5 AA 28              ORA A  BASE,X      SET FLAG
00905  FEF7 A7 28              STA A  BASE,X
00906
00907  *     SET NEXT TO DO ENTRY TO N+1
00908  *          LOC. ON STACK
00909  *
00910  FEF9 DE 4A       JXC3   LDX    BWS+2
00911  FEFB 32                 PUL A              UPPER HALF OF ENTRY
00912  FEFC A7 00              STA A  0,X         INTO TABLE
00913  FEFE 32                 PUL A              LOWER HALF
00914  FFFF A7 01              STA A  1,X         TO TABLE
00915  *     ALL APPLICATION EXITS MUST GO THROUGH HERE
00916  FF01 96 57       JXC4   LDA A  CLCK+1      100 MILLISECOND CLOCK
00917  FF03 2A 07              BPL    JXC4A       NOT TIME
00918  FF05 86 0A              LDA A  *10         RESET
00919  FF07 97 57              STA A  CLCK+1
00920  FF09 7E FAE9            JMP    RS2         RESTART TO DO
00921  FF0C 7E FAC9     JXC4A  JMP    AL          GO BACK TO LOOP.
00922
00923  ************************************
00924  *     ROUTINE TO ENTER TIMES AND FLAG WHICH SCHEDULE
00925  *     TO DO EVENTS. THE LIMIT IS 16, IF EXCEEDED
00926  *     YOUR FLAG WILL NOT BE SCHEDULED.
00927  *
00928  *     A-REG=TO DO FLAG IN D0-D4  FLAG CODE IN D5-D7
00929  *     B-REG=CLOCK PARAMETERS
00930  *          IF D0=1 THEN 10 MILLISECOND CLOCK D1-D7
00931  *          IS THE COUNTDOWN.
00932  *          IF D0-D1=10 THEN SECOND CLOCK D2-D7=COUNTDOWN
00933  *          IF D0-L1=00 THEN MINUTE CLOCK D2-D7=COUNTDOWN
00934  FF0F 97 4C       JXC2   STA A  BWS+4       SAVE
00935  FF11 CE 0,37            LDX    *BNCT-1     CLOCK TABLE POINTER
00936  FF14 08          BJC3L  INX                TO NEXT SLOT
00937  FF15 BC 0448            CPX    *BNCT+16    DONE
00938  FF18 27 0A              BEQ    JXC2R       YES, RET.
00939  FF1A A6 00              LDA A  0,X         SLOT OPEN
00940  FF1C 26 F6              BNE    BJC3L       GET NEXT ONE
00941  FF1E E7 00              STA B  0,X         SET CLOCK VAR.
00942  FF20 96 4C              LDA A  BWS+4
00943  FF22 A7 10              STA A  16,X        SET FLAG VAR.
```

```
00947  FF24 39              JXC2R   RTS                     EXIT
00948         *
00949         *       SUBROUTINE TO QUEUE A MESSAGE FOR XMISSION.
00950         *
00951         *       X-REG.=PTR. TO MSG.; BUFFER MAX. LENGTH 133 BYTE.
00952         *       A-REG.=TYPE(D0-D4);PRIORITY(D5-D7) 7-HIGHEST.
00953         *
00954  FF25 97 4C           BSREQ   STA  A    BWS+6          SAVE REG.
00955  FF27 DF 4C                   STX       BWS+4          SAVE X
00956  FF29 CE 04 05                LDX       #BSQ+45        MID-POINT OF QUEUE TABLE
00957  FF2C A6 00                   LDA  A    0,X            BUSY
00958  FF2E 27 09                   BEQ       BSREQ1         NO
00959  FF30 CE 04 35                LDX       #BSQ+93        YES, START AT END
00960  FF33 A6 00                   LDA  A    0,X            LAST BUSY
00961  FF35 27 02                   BEQ       BSREQ1         NO
00962  FF37 0D                      SEC                      TELL APPL. MSG. DIDNT GO
00963  FF38 39                      RTS                      YES,CAN'T ACCEPT ANY MESSAGES
00964         *
00965  FF39 09              BSREQ1  DEX                      DECREASE X BY 3 FOR NEXT TABL
00966  FF3A 09                      DEX
00967  FF3B 09                      DEX
00968  FF3C 8C 03 D5                CPX       #BSQ-3         DONE
00969  FF3F 27 14                   BEQ       BSTRQ          YES,STORE MSG.
00970  FF41 A6 00                   LDA  A    0,X            PRIORITY WORD;
00971  FF43 27 F4                   BEQ       BSREQ1         ZERO; GET NEXT ENTRY
00972  FF45 91 4C                   CMP  A    BWS+4          HIGHER THAN CURRENT MOV
00973  FF47 24 00                   BCC       BSTRQ          MEMORY LOWER THAN CURRENT MOV
00974  FF49 A7 03                   STA  A    3,X            MOVE MEMORY DOWN ONE SLOT.
00975  FF4B A6 01                   LDA  A    1,X
00976  FF4D A7 04                   STA  A    4,X
00977  FF4F A7 02                   STA  A    2,X
00978  FF51 A7 05                   STA  A    5,X
00979  FF53 20 E4                   BRA       BSREQ1         TRY NEXT
00980         *
00981  FF55 96 4C           BSTRQ   LDA  A    BWS+4          SET CURRENT INTO THIS SLOT.
00982  FF57 A7 03                   STA  A    3,X
00983  FF59 96 4D                   LDA  A    BWS+5
00984  FF5B A7 04                   STA  A    4,X
00985  FF5D 96 4E                   LDA  A    BWS+6
00986  FF5F A7 05                   STA  A    5,X
00987  FF61 BD 0C                   BSR       BSCH           CHECK IF TOP CAN BE MOVED TO
00988  FF63 0C                      CLC                      TELL APLL. MSG. WENT INTO MSG
00989  FF64 39                      RTS
00990         *
00991         *       TO DO PROGRAM WHICH PULLS MESSAGES OUT OF
00992         *       QUEUE FOR XMIT.
00993         *
00994         ****
00995         *
00996  FF65 BD 00           BXSCH   BSR       BSCH           CHECK IF ANOTHER MSG. CAN BE
```

```
00997  FF67 B6 0429          LDA A  BSQ+81        SLOT 28
00998  FF6A 27 03            BEQ    *+5           IF FREE, CONTINUE.
00999  FF6C 7E FAE7          JMP    RS2           RESTART LOOP.
01000  FF6F 7E FF01          JMP    JXC4          BACK TO TO DO
01001
01002  ****SET XMIT
01003  ***
01004  **
01005  FF72 CE 03D8   BSCH   LDX    #BSQ          TOP OF QUEUE
01006  FF75 A6 00            LDA A  0,X           FIRST WORD
01007  FF77 27 0B            BEQ    BSCHE         NO MESSAGE, GET OUT
01008  FF79 97 2E            STA A  BASE+6        RESCHEDULE SELF
01009  FF7B A6 02            LDA A  2,X           PRIORITY AND TO DO FLAG
01010  FF7D DE 6E            LDX    BXWS+4        NEXT TO SEND
01011  FF7F BC 005D          CPX    #BIMQKM
01012  FF82 27 01            BEQ    BMQTN
01013  FF84 39               RTS
01014
01015                 BSCHE
01016  *
01017  FF85 CE 0246   BMQTN  LDX    #SEND1        FIRST SEND BUFFER.
01018  FF88 9C 6A            CPX    BXWS          BUSY
01019  FF8A 27 04            BEQ    BTS2          YES
01020  FF8C 9C 6C            CPX    BXWS+2        BUSY AS DIRECT
01021  FF8E 20 0E      BTS2  BNE    BSNDF         NO
01022  FF90 CE 02CC          LDX    #SEND2        CHECK SECOND BUFFER FREE
01023  FF93 9C 6A            CPX    BXWS
01024  FF95 27 04            BEQ    BTS3          NOT FREE, TRY BUFFER 3
01025  FF97 9C 6C            CPX    BXWS+2        DIRECT
01026  FF99 26 03            BNE    BSNDF         FREE
01027  FF9B CE 0352   BTS3   LDX    #SEND3        USE SEND3
01028  FF9E DF 4C     BSNDF  STX    BWS+4         NOT BUSY
01029  FFA0 FE 03D8          LDX    BSQ           BUFFER PTR.
01030  FFA3 DF 4E            STX    BWS+6         SAVE FOR LOOP
01031  FFA5 E6 00            LDA B  0,X           FIRST WORD
01032  FFA7 6F 00            CLR    0,X           CLEAR USER FIRST WORD.
01033  FFA9 BD FLCC          JSR    BSBF          SET PROPER ACTIVITY FLAG.
01034  FFAC DE 4C            LDX    BWS+4         SEND BUFFER PTR.
01035  FFAE E7 00            STA B  0,X           FIRST WORD TO BUFFER
01036  FFB0 DF 6E            STX    BXWS+4        BUFFER PTR. TO NEXT
01037  FFB2 DE 4E            LDX    BWS+6         FROM BUFFER PTR.
01038  FFB4 A6 02            LDA A  2,X           GET NO. OF WORDS
01039  FFB6 8D 0D            BSR    BBMV+2        BLOCK MOVE SUBR.
01040  *
01041  FFB8 CE 03D7   BSCHDL LDX    *BSQ-1        DONE , DO PULL UP
01042  FFBB 08               INX                  BUMP FOR LOOP
01043  FFBC A6 03            LDA A  3,X
01044  FFBE A7 00            STA A  0,X           PULL UP
01045  FFC0 26 F9            BNE    BSCHDL        NOT DONE LOOP
```

```
01046 FFC2 39              RTS
01047
01048              *   BLOCK MOVE SUBROUTINE.
01049              *   A= NO. OF BYTES TO MOVE.
01050              *   X= FROM BUFFER PTR. SAVED IN BWS+6
01051              *   BWS+4 = TO BUFFER
01052              *
01053 FFC3 E6 00   BBMV    LDA B  0,X       GET FROM BYTE
01054 FFC5 08              INX
01055 FFC6 DF 4E           STX    BWS+6     SAVE FOR LOOP
01056 FFC8 DE 4C           LDX    BWS+4     GET 'TO' PTR.
01057 FFCA E7 00           STA B  0,X       STORE BYTE
01058 FFCC 08              INX
01059 FFCD DF 4C           STX    BWS+4     SAVE
01060 FFCF DE 4E           LDX    BWS+6
01061 FFD1 4A              DEC A            DONE
01062 FFD2 26 EF           BNE    BBMV      NO
01063 FFD4 39              RTS              YES, EXIT
01064
01065              ***********
01066              *   ROUTINE TO ALLOCATE AVAILABLE WORK SPACE.
01067              *      INPUT= A-REG MOST SIGNIFICANT NO. WORDS WANTED.
01068              *      INPUT= B-REG LEAST SIGNIFICANT NO. OF WORDS WAN
01069              *
01070              *   OUTPUT= X-REG STARTING LOCATION OF WORK SPACE.
01071              *        = X-REG=0 IF INSUFFICIENT SPACE.
01072              *
01073 FFD5 CE 0000 BGWS    LDX    #0        CLEAR X-REG IF NO ROOM
01074 FFD8 DB 25           ADD B  AWS+1     LOW ORDER
01075 FFDA 24 01           BCC    *+3       OVERFLOW
01076 FFDC 4C              INC A            YES
01077 FFDD 9B 24           ADD A  AWS       HIGH ORDER
01078 FFDF 91 26           CMP A  AWS+2     HIGH ORDER OF END.
01079 FFE1 2B 0A           BMI    BGWSOK    ROOM LEFT
01080 FFE3 26 0A           BNE    BGWSNO    NO ROOM LEFT
01081 FFE5 D1 27           CMP B  AWS+3     LOW ORDER
01082 FFE7 2A 06           BPL    BGWSNO    NOT ENOUGH SPACE
01083 FFE9 DE 24   BGWSOK  LDX    AWS       HERE IS WHERE SIT STARTS.
01084 FFEB 97 24           STA A  AWS       SET NEW HIGH ORDER.
01085 FFED D7 25           STA B  AWS+1     SET NEW LOW ORDER.
01086 FFEF 39     BGWSNO   RTS              EXIT
01087
01088              *   INTERRUPT POINTERS
01089
01090 FFF0 EFF0            FDB    $EFF0     NMIP-4 VECTOR
01091 FFF2 EFF0            FDB    $EFF0     NMIP-3 VECTOR
01092 FFF4 F878            FDB    $F878     NMIP-2 VECTOR
01093 FFF6 F878            FDB    $F878     NMIP-1 VECTOR
01094 FFF8 NMI             FDB    NMI
01095 FFFA EFF0            FDB    $EFF0     IRQ
```

```
01096  FFFA EFFO                    FDB   $EFFO
01097  FFFC EFIO                    FDB   $EFFO   NMI FOR CONTROL PANEL
01098  FFFE FA00                    FDB   $START  POWER UP INTERRUPT
01099                         *
01100                               END
```

CROSS-REFERENCE TABLE

169 LABELS    489 REFERENCES

| Label | | | | | | |
|---|---|---|---|---|---|---|
| ACIAK0 | 22* | 161 | 263 | 449 | 521 | 533 | 569 |
| ACIAS1 | 21* | 156 | 160 | 264 | 374 | 448 | 535 |
| AL | 269* | 294 | 296 | 297 | 298 | 922 | |
| AL1 | 271* | 288 | | | | | |
| AL2 | 270* | 272 | | | | | |
| ANS | 38* | 163 | 184 | 200 | 202 | 1075 | 1078 1079 1082 1084 |
| | 1085 | 1086 | | | | | |
| BADDK | 67* | 423 | 458 | 723 | | | |
| BADDRA | 66* | 606 | 619 | 722 | | | |
| BADDX | 881* | | | | | | |
| BADDXL | 882* | 204 | | | | | |
| BADDXA | 887* | 885 | | | | | |
| BASE | 39* | 259 | 271 | 273 | 285 | 480 | 709 711 714 716 |
| | 758 | 760 | 778 | 1062 | 849 | 871 | 904 905 1009 |
| BBMV | 1053* | 177 | 1039 | 851 | | | |
| BCLCRL | 815* | 819 | 829 | | | | |
| BCLKL1 | 853* | 817 | | | | | |
| BCLOCK | 470* | 412 | 622 | 796 | 807 | 809 | 813 |
| BCLOR | 83* | 792 | 793 | | | | |
| BCNSC | 831* | 821 | | | | | |
| BCNCTK | 805* | 826 | | | | | |
| BCOS | 708* | 666 | 674 | 681 | 699 | | |
| BCSSC | 835* | 823 | | | | | |
| BCSTD1 | 849* | 846 | 832 | | | | |
| BCSTDF | 833* | 825 | | | | | |
| BDFS | 781* | 779 | | | | | |
| BDIRN | 745* | 664 | | | | | |
| BDRCH | 647* | 640 | 643 | | | | |
| BDATCH | 753* | 747 | | | | | |
| BDKS | 701* | 759 | | | | | |
| BDSEC | 349* | 390 | | | | | |
| BDSW | 765* | 754 | | | | | |
| BDX | 197* | 199 | | | | | |
| BEOM | 195* | 190 | | | | | |
| BEOM1 | 207* | 201 | | | | | |
| BEOM2 | 209* | | | | | | |
| BEXIT | 485* | 474 | | | | | |
| BGWS | 1074* | | | | | | |

| | | | | | | | |
|---|---|---|---|---|---|---|---|
| BOWSMO | 1087* | 1081 | 1083 | | | | |
| BOWSOK | 1064** | 1080 | | | | | |
| BHDWL | 558* | 572 | | | | | |
| BIL | 259* | 262 | | | | | |
| BIMOR | 655* | 662 | 752 | 432 | 460 | 502 | 1012 |
| BIMONM | 777* | 246 | 247 | | | | |
| BJC3L | 939* | 943 | | | | | |
| BMC | 188** | 194 | | | | | |
| BMDB | 632* | 628 | | | | | |
| BME | 654** | 593 | | | | | |
| BMFL | 623* | 599 | | | | | |
| BMFL1 | 627* | 624 | | | | | |
| BMONST | 720* | 689 | 713 | 715 | | | |
| BMONT | 712* | 710 | 781 | | | | |
| BMONT1 | 714** | 687 | | | | | |
| BMQTA | 1016* | 1013 | | | | | |
| BMKAG | 105* | 243 | 251 | 252 | 254 | 625 | 649 | 765 |
| BMSGLW | 65* | 592 | 604 | 630 | | | |
| BMSSR | 329* | 419 | | | | | |
| BMSSR1 | 338* | 345 | | | | | |
| BMSSR2 | 342* | 352 | | | | | |
| BMSU | 131* | 242 | 250 | 255 | 329 | | |
| BMCARY | 587* | 585 | | | | | |
| BMFX1 | 605* | 802 | 816 | 938 | 940 | | |
| BMC1 | 110* | 814 | | | | | |
| BNGOUT | 514* | 378 | | | | | |
| BNGSK | 569* | 515 | | | | | |
| BNKARY | 528* | 520 | | | | | |
| HNRE | 387** | 378 | 383 | | | | |
| BNTLST | 597** | 589 | | | | | |
| BNTP | 438** | 428 | 433 | | | | |
| BNTP1 | 439** | | | | | | |
| BNTP2 | 436** | 363 | | | | | |
| BPSEUL | 489** | 425 | | | | | |
| BPTRTE | 120** | 167 | 182 | 186 | 414 | 418 | 494 |
| BQC | 399** | 351 | 357 | 365 | | | |
| BQC1 | 410** | 402 | | | | | |
| BRIP | 580** | 581 | | | | | |
| BRSTCW | 827** | 834 | 837 | | | | |
| BS3 | 165** | 168 | | | | | |
| BSBF | 866** | 1033 | | | | | |
| BSBFX | 872** | 867 | | | | | |
| BSCH | 1006** | 987 | 996 | | | | |
| BSCHDL | 1042** | 1045 | | | | | |
| BSCHE | 1014** | 1008 | | | | | |
| BSCLCK | 820** | 616 | 545 | 550 | 553 | 556 | 563 | 566 | 602 | 611 |
| BSCLKL | 613* | 629 | 631 | 633 | 637 | 646 | 650 | 740 |
| BSCLK | 814* | 795 | 811 | | | | |
| BSDIR | 499** | 369 | 442 | | | | |

| | | | | | | | | |
|---|---|---|---|---|---|---|---|---|
| BSDIR1 | 504** | 493 | | | | | | |
| BSEND | 423** | 416 | | | | | | |
| BSNDF | 1028** | 1020 | 1025 | | | | | |
| BSPAR | 531** | 517 | | | | | | |
| BSQ | 109** | 956 | 959 | 968 | 997 | 1006 | 1029 | 1041 |
| BSREQ1 | 954** | 958 | 961 | 971 | 979 | | | |
| BSRPT | 965** | 694 | | | | | | |
| BSTK | 700** | 183 | 973 | | | | | |
| BSTRQ | 202** | 909 | | | | | | |
| BSWIT | 981** | 673 | | | | | | |
| BTIR | 093** | 353 | | | | | | |
| BTQ | 359** | 395 | | | | | | |
| BTS2 | 413** | 1018 | | | | | | |
| BTS3 | 1021** | 1023 | | | | | | |
| BUPTR | 1027** | 727 | 731 | 761 | | | | |
| BUPTRA | 734** | 736 | | | | | | |
| BWS | 739** | 174 | 269 | 274 | 275 | 277 | 278 | 279 | 284 | 287 |
| | 42** | 789 | 790 | 791 | 797 | 812 | 824 | 831 | 835 | 841 |
| | 788 | 844 | 850 | 868 | 869 | 870 | 882 | 884 | 886 | 887 |
| | 842 | 897 | 902 | 910 | 937 | 945 | 954 | 955 | 972 | 981 |
| | 888 | 985 | 1028 | 1030 | 1034 | 1037 | 1055 | 1056 | 1059 | 1060 |
| | 983 | 341 | 437 | 509 | | | | | |
| BXM | 447* | 452 | | | | | | |
| BXPC | 456** | 300 | | | | | | |
| BXSCH | 996** | | | | | | | |
| BXW | 80** | 248 | 330 | 359 | 368 | 431 | 436 | 438 | 439 | 443 |
| BXWS | 69** | 461 | 489 | 490 | 499 | 501 | 503 | 516 | 518 | 523 |
| | 457 | 767 | 1011 | 1017 | 1019 | 1022 | 1024 | 1036 | | |
| | 546 | 575 | | | | | | |
| BYPASS | 565** | 472 | 473 | 476 | 477 | 917 | 920 | | |
| CASINT | 13** | 213 | 214 | 385 | 562 | 576 | 580 | 688 | 734 | 738 |
| CLCK | 43** | 774 | 424 | 454 | 507 | 605 | 610 | 618 | 638 | 641 |
| CRPTR | 45** | 241 | | | | | | |
| DCHKA | 777** | | | | | | | |
| DEVNO | 48** | 772 | | | | | | |
| DSTX | 729** | 265 | 399 | 463 | 522 | 537 | 538 | 570 | | |
| INTCON | 776** | 193 | | | | | | |
| IO | 25** | | | | | | | |
| IROINT | 19** | | | | | | | |
| JBUG | 15** | 299 | | | | | | |
| JCLL | 17** | 769 | | | | | | |
| JDIR | 18** | | | | | | | |
| JXC1 | 84** | | | | | | | |
| JXC2 | 896** | 941 | | | | | | |
| JXC2R | 937** | | | | | | | |
| JXC3 | 947** | | | | | | | |
| JXC3R | 910** | | | | | | | |
| JXC4 | 902** | 853 | 898 | 1000 | | | | |
| JXC4R | 917** | 918 | | | | | | |
| | 922** | | | | | | | |

| Symbol | | | | | | | | | | |
|---|---|---|---|---|---|---|---|---|---|---|
| LISTEN | 50* | 210 | 338 | 339 | 356 | 387 | 392 | 470 | 471 | 559 |
| | | 573 | 678 | 680 | 702 | 704 | 725 | 733 | 750 | 751 |
| | | 799 | 805 | 806 | | | | | | |
| LPTR | 776 | 173 | | | | | | | | |
| LTPR | 103* | 175 | | | | | | | | |
| MCDAY | 294* | | | | | | | | | |
| MCDAYW | 141* | | | | | | | | | |
| MCHRS | 144* | | | | | | | | | |
| MCM14 | 140* | | | | | | | | | |
| MCMON | 139* | | | | | | | | | |
| MCMS | 142* | | | | | | | | | |
| MCSEC | 137* | | | | | | | | | |
| MCYEAR | 138* | | | | | | | | | |
| MEMST | 143* | 181 | 336 | 400 | 404 | 426 | 430 | 543 | 555 | 686 |
| | 152* | 335 | 712 | 798 | 804 | 634 | 659 | 685 | 708 | 728 |
| MONFLG | 700 | 701 | 212 | 384 | 561 | | | | | |
| MPTR | 44* | 211 | 768 | 777 | | | | | | |
| MCLOCK | 739 | 757 | | | | | | | | |
| MN1 | 786* | 295 | | | | | | | | |
| MN1A | 373* | 1094 | | | | | | | | |
| MN1CON | 377* | 375 | | | | | | | | |
| MN1CTA | 23* | 256 | 408 | 479 | 720 | | | | | |
| | 61* | 609 | 615 | 617 | 648 | 745 | | | | |
| MN1CTB | 62* | 361 | 506 | 645 | | | | | | |
| MN1CTR | 59* | 334 | 394 | 721 | | | | | | |
| MN1CWD | 64* | 257 | 405 | 407 | 478 | 696 | 753 | 756 | 766 | |
| MN1INT | 14* | | | | 565 | 748 | | | | |
| MN1SEC | 60* | 350 | 389 | 505 | 565 | | | | | |
| MN1ST | 24* | 239 | 373 | | 528 | 531 | 539 | 583 | 587 | 655 |
| PA1TY | 63* | 381 | 456 | 524 | | | | | | |
| PIANOA | 29* | 221 | 225 | | | | | | | |
| PIANOB | 28* | 243 | 226 | | | | | | | |
| PIANOC | 31* | 227 | 231 | | | | | | | |
| PIANOD | 30* | 229 | 233 | | | | | | | |
| RCV | 96* | | | | | | | | | |
| RS | 284* | 301 | 302 | 303 | 304 | 305 | 306 | 307 | 308 | 309 |
| | 310 | 311 | 312 | 313 | 314 | 315 | 316 | 317 | 318 | 319 |
| | 320 | 321 | 322 | 323 | 324 | 325 | | | | |
| RS1 | 285* | 921 | 999 | 577 | 579 | 654 | | | | |
| RS2 | 286* | 377 | 380 | | | | | | | |
| RWDCNT | 46* | | | | | | | | | |
| SEND1 | 106* | 1016 | | | | | | | | |
| SEND2 | 107* | 1021 | | | | | | | | |
| SEND3 | 108* | 1027 | | | | | | | | |
| START | 157* | 1098 | | | | | | | | |
| SYSWD | 26* | 787 | | | | | | | | |
| TFLAG | 81* | 481 | | | | | | | | |
| T1RJ | 33* | 484 | | | | | | | | |

| | | | | |
|---|---|---|---|---|
| 0001 | $ | SNUMB | 2069T | |
| 0002 | $ | COMMENT | TSS_CARDIN | |
| 0003 | $$ | USERID | C00109 | |
| 0004 | $$ | IDENT | C00109$########### ASM6800 | |
| 0005 | $$ | USERID | C00109,BEKARDI | |
| 0006 | $$ | SELECT | C00109/MOTOROLA/ASM68 | |
| 0007* | $ | OPTION | FORTRAN,NONAP | 00000010 |
| 0008 | $ | USE | .GTLIT | 00000020 |
| 0009* | $ | SELECT | C00109/M680BJ | 00000030 |
| 0010* | $ | OBJECT | MAIN PROGRAM FOR M68ASM | 00000010 |
| 0011* | $ | DKEND | CONTINUE | 00000020 |
| 0012* | $ | OBJECT | | 00000030 |
| 0013* | $ | DKEND | CONTINUE | Y08.72311677MPAM0000 |
| 0014* | $ | OBJECT | | MPAM0013 |
| 0015* | $ | DKEND | CONTINUE | Y08.72311677 00000026 |
| 0016* | $ | OBJECT | | Y08.72411677MPAM0000 |
| 0017* | $ | DKEND | CONTINUE | Y08.72411677MPAM0005 |
| 0018* | $ | OBJECT | | Y08.72411677MPAPAG08 |
| 0019* | $ | DKEND | CONTINUE | Y08.72411677MPAPA100 |
| 0020* | $ | OBJECT | | MPAPA105 |
| 0021* | $ | DKEND | CONTINUE | Y08.72411677MPUBSM00 |
| 0022* | $ | OBJECT | | MPUBSM04 |
| 0023* | $ | DKEND | CONTINUE | Y08.72411677MPUCNA00 |
| 0024* | $ | OBJECT | | MPUCNA07 |
| 0025* | $ | DKEND | CONTINUE | Y08.72511677MPUSNC00 |
| 0026* | $ | OBJECT | | MPUSNC03 |
| 0027* | $ | DKEND | CONTINUE | Y08.72511677MPUXBS00 |
| 0028* | $ | OBJECT | | MPUXBS05 |
| 0029* | $ | DKEND | CONTINUE | Y08.72511677MPUCA100 |
| 0030* | $ | OBJECT | | MPUCA104 |
| 0031* | $ | DKEND | CONTINUE | Y08.72511677MPAM1000 |
| 0032* | $ | OBJECT | | MPAM1024 |
| 0033* | $ | DKEND | CONTINUE | Y08.72611677MPAERR00 |
| 0034* | $ | OBJECT | | MPAERR07 |
| 0035* | $ | DKEND | CONTINUE | Y08.72611677MPAFOP00 |
| 0036* | $ | OBJECT | | MPAFOP05 |
| 0037* | $ | DKEND | CONTINUE | Y08.72611677MPAFSY00 |
| 0038* | $ | OBJECT | | MPAFSY06 |
| 0039* | $ | DKEND | CONTINUE | Y08.72611677MPAGAM00 |
| 0040* | $ | OBJECT | | MPAGAM08 |
| 0041* | $ | DKEND | CONTINUE | Y08.72611677MPAOPR00 |
| 0042* | $ | OBJECT | | MPAOPR15 |
| 0043* | $ | DKEND | CONTINUE | Y08.72711677MPAOPT00 |
| 0044* | $ | OBJECT | | MPAOPT10 |
| 0045* | $ | DKEND | CONTINUE | Y08.72711677MPAPRL00 |
| 0046* | $ | OBJECT | | MPAPRL26 |
| 0047* | $ | DKEND | CONTINUE | Y08.72711677MPAPSC00 |
| 0048* | $ | OBJECT | | MPAPSC23 |
| 0049* | $ | DKEND | CONTINUE | Y08.72711677MPASSY00 |
| 0050* | $ | OBJECT | | MPASSY09 |
| | $ | | | Y08.72711677MPUADR00 |

```
0051*   DKEND    CONTINUE
0052*   OBJECT   CONTINUE              Y08.72811677MPUADR06
0053*   DKEND    CONTINUE                           MPUBNM00
0054*   OBJECT   CONTINUE              Y08.72811677MPUBNM07
0055*   DKEND    CONTINUE                           MPUFN000
0056*   OBJECT   CONTINUE              Y08.72811677MPUFN015
0057*   DKEND    CONTINUE                           MPUGNC00
0058*   OBJECT   CONTINUE              Y08.72811677MPUGNC08
0059*   DKEND    CONTINUE                           MPUPIB00
0060*   OBJECT   CONTINUE              Y08.72811677MPUPIB10
0061*   DKEND    CONTINUE                           MPUPTS00
0062*   OBJECT   CONTINUE              Y08.72811677MPUPTS09
0063*   DKEND    CONTINUE                           MPUPTW00
0064*   OBJECT   CONTINUE              Y08.72911677MPUPTW10
0065*   DKEND    CONTINUE                           MPUXBY00
0066*   OBJECT   CONTINUE              Y08.72911677MPUXBY04
0067*   DKEND    CONTINUE                           MPUCA200
0068*   OBJECT   CONTINUE              Y08.72911677MPUCA205
0069*   DKEND    CONTINUE                           MPUCVC00
0070*   OBJECT   CONTINUE              Y08.72911677MPUCVC04
0071*   DKEND    CONTINUE                           MPUNEG04
0072*   OBJECT   CONTINUE              Y08.73011677MPUNEG04
0073*   DKEND    CONTINUE                           MPUOVF00
0074*   OBJECT   CONTINUE              Y08.73011677MPUOVF05
0075*   DKEND    CONTINUE                           MPAM2000
0076*   OBJECT   CONTINUE              Y08.73011677MPAM2029
0077*   DKEND    CONTINUE                           MPXRSV00
0078*   OBJECT   CONTINUE              Y08.73011677MPXRSV08
0079*   DKEND    CONTINUE                           MPXRTB00
0080*AS OBJECT   CONTINUE              Y08.73111677MPXRTB31
0081*   EXECUTE                                     000000040
0082*   LIMITS   .33K                               000000050
0083*   FILE     02,M1S                             000000060
0084    FILE     07,,10L                            000000040
0085    PRMFL    05,R,S,C00109/JBUGTEMP             000000060
0086    PRMFL    06,R/W,S,C00109/JLIST              000000060
0087    PRMFL    02,R/W,S,C00109/JBUGO              000000070
        ENDJOB
TOTAL CARD COUNT THIS JOB = 000420
```

* ACTY-01 $CARD #0080* GELOAD   12/21/77  SW=00000000000000
* NORMAL TERMINATION     AT 034263 I=5020  SW=00000000000000

```
START 10:349        LINES   28        PROC  0.0203      I/O  0.002       IU  5    MEMORY  33K
STOP  10:373        LIMIT  5000        LIMIT 0.0500      LIMIT            CU  5             3066
SWAP  0.000
LAPSE 0.024   FC D  TYPE    BUSY    IP/AT   FP/RT   IS/#C  MS/#E   ADDRESS    T#/PK#

R*R   D450     530      0       0       34      34    0-08-05
              07R   D450     821      0      16     120     120    0-08-01
              05R   D450    1223      0      33     109     109    0-08-08
              06R   D450    1426      0      99      13      13    0-08-14
              P*    SYOUT    142      0       7                    0-08-18
              L*R   D450     991      0       0    1100    1100R   0-08-08
              *LR   D450      38      0       0     850     850R   0-08-07

LIST    28 LINES AT STA.  9C

SNUMB = 2069T, ACTIVITY # = 01, , REPORT CODE = 74, RECORD COUNT = 000028

ORIGIN  DATE MODULE ENTRY LOCATION.  ENTRY LOCATION   ENTRY LOCATION   ENTRY LOCATION   ENTRY LOCATION

SUBPROGRAMS INCLUDED IN DECK.
 $       OPTION  FORTRAN,NOMAP                                                              00000010
 $       USE    .GTLIT                                                                      00000020

SUBPROGRAMS OBTAINED FROM SYSTEM LIBRARY

ALLOCATED CORE   000000 RANGE THRU 101777          SIZE
   RELOCATABLE      025070 THRU 101777              102000
   COMMON           000100 THRU 020676              054710
                                                    020577
 $      FILE     02..MIS                                                                    00000060
 $      FILE     07..IOL                                                                    00000060
 $      PRKFL    05.R.S.C00109/JBUGTEMP                                                     00000040
 $      PRKFL    06.R/W.S.C00109/JLIST                                                      00000060
 $      PRKFL    02.R/W.S.C00109/JBUGO                                                      00000060
*** NON FATAL ERROR * FILE CODE USED MORE THAN ONCE

FCB AND BUFFER SPACE
       AVAILABLE            020700 THRU 025067       004170
       FILE CTRL BLKS       024610 THRU 025070       000261
       MAXIMUM BUFFER SPACE REQUIRED                 003606

33K, IS THE MINIMUM MEMORY NEEDED TO LOAD THIS ACTIVITY WITH ALL FILES OPEN
   001754 LOCATIONS REQUIRED FOR LOAD TABLE
   EXECUTION PROGRAM ENTERED AT 101502 THROUGH .FSETU
   THERE WERE 000001 WARNING FLAGS IN THE ABOVE LOAD 740808  2/H
```

The embodiments of the invention in which an exclusive property or right is claimed are defined as follows:

1. A protocol system for a data processing system comprising:
    a communication bus; and,
    at least first and second remote stations connected to said communication bus, each remote station comprising:
        receive means for receiving messages transmitted on said communication bus,
        receive interrupt means for generating a receive interrupt for each message received on said communication bus,
        quiet interrupt means for generating a quiet interrupt whenever data is not on said communication bus for a predetermined length of time, and
        calculation means responsive to said receive and quiet interrupts for calculating the time slot during which said remote station can transmit.

2. The protocol system of claim 1 wherein said quiet interrupt means comprises a timer providing said quiet interrupt whenever data is not on said communication bus for a predetermined length of time, said timer being reset if data is received prior to expiration of said predetermined length of time.

3. The protocol system of claim 2 wherein each remote station comprises means for transmitting its own address as a sender's address and said calculation means of each remote station comprises means for calculating its time slot from the sender's address of a received message upon receipt of a receive interrupt.

4. The protocol system of claim 3 wherein said calculation means comprises a counter for storing said time slot as a count, said count being adjusted by said quiet interrupt toward a predetermined count at which said remote station may transmit.

5. The protocol system of claim 4 wherein each remote station further comprises secondary means for causing said remote station to respond to a direct request message from a sending station in the time slot of said sending station.

6. The protocol system of claim 5 wherein said secondary means comprises a secondary counter, first means for storing a first predetermined count if said station receives said direct request message to which it must respond directly and a second means for storing a second predetermined count if said station receives said direct request message directed to another remote station.

7. The protocol system of claim 6 wherein said first count is closer to a predetermined count than said second count and said first and second counts are adjusted by said quiet interrupt toward said predetermined count which, when reached, permits said remote station to transmit.

8. The protocol system of claim 1 wherein each remote station comprises means for transmitting its own address as a sender's address and said calculation means of each remote station comprises means for calculating its time slot from the sender's address of a received message upon receipt of a receive interrupt.

9. The protocol system of claim 8 wherein said calculation means comprises a counter for storing said time slot as a count, said count being adjusted by said quiet interrupt toward a predetermined count at which said remote station may transmit.

10. The protocol system of claim 9 wherein each remote station further comprises secondary means for causing said remote station to respond to a direct request message from a sending station in the time slot of said sending station.

11. The protocol system of claim 10 wherein said secondary means comprises a secondary counter, first means for storing a first predetermined count if said station receives said direct request message to which it must respond directly and a second means for storing a second predetermined count if said station receives said direct request message directed to another remote station.

12. The protocol system of claim 11 wherein said first count is closer to a predetermined count than said second count and said first and second counts are adjusted by said quiet interrupt toward said predetermined count which, when reached, permits said remote station to transmit.

13. The protocol system of claim 1 wherein each remote station further comprises secondary means for causing said remote station to respond to a direct request message from a sending station in the time slot of said sending station.

14. The protocol system of claim 13 wherein said secondary means comprises a secondary counter, first means for storing a first predetermined count if said station receives said direct request message to which it must respond directly and a second means for storing a second predetermined count if said station receives said direct request message directed to another remote station.

15. The protocol system of claim 14 wherein said first count is closer to a predetermined count than said second count and said first and second counts are adjusted by said quiet interrupt toward said predetermined count which, when reached, permits said remote station to transmit.

* * * * *